United States Patent
Birchfield et al.

(10) Patent No.: US 12,403,483 B2
(45) Date of Patent: Sep. 2, 2025

(54) SMART SOLIDS CONTROL SYSTEM

(71) Applicant: Derrick Corporation, Buffalo, NY (US)

(72) Inventors: Robert Charles Mason Birchfield, Coldspring, TX (US); Charles Stocker, Spring, TX (US); Mitchell J. Derrick, Houston, TX (US); Brian J. Rooney, Amherst, NY (US); Michael J. Schwec, Boston, NY (US); Christian Newman, Cheektowaga, NY (US); Raymond Kirsch, Strykersville, NY (US)

(73) Assignee: Derrick Corporation, Buffalo, NY (US)

( * ) Notice: Subject to any disclaimer, the term of this patent is extended or adjusted under 35 U.S.C. 154(b) by 648 days.

(21) Appl. No.: 16/931,242

(22) Filed: Jul. 16, 2020

(65) Prior Publication Data
US 2021/0016297 A1    Jan. 21, 2021

Related U.S. Application Data

(60) Provisional application No. 62/874,853, filed on Jul. 16, 2019.

(51) Int. Cl.
*B04B 11/02* (2006.01)
*B01D 21/30* (2006.01)
(Continued)

(52) U.S. Cl.
CPC .............. *B04B 11/02* (2013.01); *B01D 21/30* (2013.01); *B01D 36/045* (2013.01); *B04B 1/10* (2013.01);
(Continued)

(58) Field of Classification Search
CPC .......... B04B 11/02; B04B 11/06; B04B 1/10; B04B 1/20; B04B 7/08; B04B 13/00;
(Continued)

(56) References Cited

U.S. PATENT DOCUMENTS 3,766,997 A * 10/1973 Heilhecker ........... E21B 21/065
175/66
4,809,791 A * 3/1989 Hayatdavoudi ......... E21B 44/00
175/206
(Continued)

FOREIGN PATENT DOCUMENTS

CN    101070755    11/2007
CN    101362135    2/2009
(Continued)

OTHER PUBLICATIONS

Macmillan Dictionary-recommendation (Year: None) (Year: None).*
International Search Report and Written Opinion issued in App. No. PCT/US24/13466, dated May 8, 2024, 12 pages.

*Primary Examiner* — Liam Royce
(74) *Attorney, Agent, or Firm* — FisherBroyles, LLP; Jason P. Mueller

(57) ABSTRACT

A material separation system is disclosed that may include a vibratory shaker, a centrifuge, a sensor, and/or a processor circuit. The vibratory shaker may be configured to separate a solid-liquid mixture into a first solids-containing component and a shaker effluent. The sensor may be configured to measure a property of one or more of the solid-liquid mixture, the first solids-containing component, the shaker effluent, and the second solids-containing. A well-performance analysis system may be configured to analyze mud reports of drilling rigs within a geographic basin to determine which rigs are performing inefficiently. The system may allow recommendations and send control signals to improve the efficiency of the solid-liquid separation system.

(Continued)

The system may allow an operator to view agglomerated well performance data to identify which rigs are performing below a geographic basin baseline and make informed decisions to improve the functioning of a solid-liquid separation system associated with one or more drilling rigs.

18 Claims, 33 Drawing Sheets

(51) Int. Cl.
    *B01D 36/04*     (2006.01)
    *B04B 1/10*     (2006.01)
    *B04B 7/08*     (2006.01)
    *B04B 11/06*     (2006.01)
    *B04B 13/00*     (2006.01)
    *E21B 21/06*     (2006.01)

(52) U.S. Cl.
    CPC ............... *B04B 7/08* (2013.01); *B04B 13/00* (2013.01); *E21B 21/065* (2013.01); *B01D 2201/54* (2013.01); *B04B 11/06* (2013.01); *B04B 2013/006* (2013.01); *E21B 2200/22* (2020.05)

(58) Field of Classification Search
    CPC ..... B04B 2013/006; B04B 5/10; B01D 21/30; B01D 21/0012; B01D 21/24; B01D 21/262; B01D 21/28; B01D 36/045; B01D 2201/54; E21B 21/065; E21B 2200/22; E21B 43/35; B07B 15/00; B07B 13/18; B07B 1/42; B07B 2230/01
    See application file for complete search history.

(56) References Cited

U.S. PATENT DOCUMENTS

| | | | |
|---|---|---|---|
| 5,190,645 A * | 3/1993 | Burgess | B01D 33/804 209/416 |
| 6,002,985 A * | 12/1999 | Stephenson | E21B 43/00 706/929 |
| 7,540,837 B2 | 6/2009 | Scott | |
| 8,812,236 B1 * | 8/2014 | Freeman | E21B 21/065 73/152.43 |
| 8,869,986 B2 | 10/2014 | Bailey | |
| 10,871,762 B2 * | 12/2020 | Elyas | G06N 20/00 |
| 2005/0242003 A1 | 11/2005 | Scott | |
| 2007/0087927 A1 | 4/2007 | Scott | |
| 2008/0230448 A1 | 9/2008 | Wojciechowski et al. | |
| 2009/0134102 A1 | 5/2009 | Cousins | |
| 2011/0210083 A1 | 9/2011 | Scott | |
| 2012/0118798 A1 | 5/2012 | Scott | |
| 2013/0074360 A1 * | 3/2013 | Pomerleau | E21B 21/065 34/79 |
| 2014/0116776 A1 | 5/2014 | Marx | |
| 2016/0130889 A1 | 5/2016 | Torrione | |
| 2016/0130928 A1 | 5/2016 | Torrione | |
| 2017/0089153 A1 | 3/2017 | Teodorescu | |
| 2018/0043287 A1 | 2/2018 | Teodorescu | |
| 2018/0135401 A1 | 5/2018 | Dykstra | |
| 2018/0156023 A1 | 6/2018 | Dykstra | |
| 2019/0055799 A1 * | 2/2019 | Aguirre | G06Q 10/0639 |
| 2020/0018160 A1 | 1/2020 | Albahrani | |
| 2020/0080410 A1 | 3/2020 | Kjosmoen | |

FOREIGN PATENT DOCUMENTS

| | | |
|---|---|---|
| CN | 103488139 | 1/2014 |
| CN | 106014306 | 10/2016 |
| CN | 108296266 | 7/2018 |
| CN | 207974784 | 10/2018 |
| CO | 2017005204 | 10/2017 |
| EP | 1937934 | 7/2008 |
| EP | 2548660 A2 | 1/2013 |
| EP | 2544830 B1 | 6/2017 |
| EP | 3292269 A2 | 3/2018 |
| GB | 201307386 | 6/2013 |
| GB | 2513358 | 10/2014 |
| WO | 2013071371 A1 | 5/2013 |
| WO | 2022241238 A1 | 11/2022 |

* cited by examiner

|  | discard rate (512) | % solids discard (514) | screen utilization and tracking (516) | % vol LGS (518) | % vol HGS (520) | % vol oil / % vol brine (522) | particle size (524) | power consumption (526) |
|---|---|---|---|---|---|---|---|---|
| dilution cost savings (502) | automated | manual retort | manual | manual | manual | mud report | manual |  |
| disposal cost savings (504) | automated | manual retort | manual | manual | manual | mud report | manual |  |
| energy cost savings (506) | automated | manual retort |  | manual | manual | mud report |  | automated |
| maintenance cost savings (508) | automated | manual retort | manual |  |  |  | manual |  |
| NPT savings (510) |  |  | manual |  |  |  | manual |  |

FIG. 5

| | discard rate 512 | % solids discard 514 | screen utilization and tracking 516 | % vol LGS 518 | % vol HGS 520 | % vol oil % vol brine 522 | particle size 524 | power consumption 526 |
|---|---|---|---|---|---|---|---|---|
| dilution cost savings 502 | automated | calculated mass balance | auto RFID | automated | automated | mud report | manual | |
| disposal cost savings 504 | automated | calculated mass balance | auto RFID | automated | automated | mud report | manual | |
| energy cost savings 506 | automated | calculated mass balance | | automated | automated | mud report | | automated |
| maintenance cost savings 508 | automated | calculated mass balance | auto RFID | | | | manual | |
| NPT savings 510 | | | auto RFID | | | | manual | |

FIG. 6

| | mud cost | disposal cost | generator fuel cost | day rate | barite cost | screen panel cost | centrifuge maintenance cost | hole size | hole depth | salinity from mud report | rig circulating rate (kick detection) | maintaining ECD | active system volume |
|---|---|---|---|---|---|---|---|---|---|---|---|---|---|
| dilution cost savings | X | | | | X | | | X | X | X | | | X |
| disposal cost savings | X | X | | | X | | | X | X | X | | | |
| energy cost savings | | | X | | | | | | | X | | | |
| maintenance cost savings | | | | | | X | X | | | | | | |
| NPT savings | | | | X | | X | X | | | | X | | |
| value added | | | | | | | | | | | | X | |

FIG. 7

SMART SOLIDS CONTROL SYSTEM

CROSS-REFERENCE TO RELATED APPLICATIONS

This application claims the benefit of U.S. Provisional Patent Application No. 62/874,853, filed Jul. 16, 2019, the contents of which are incorporated herein by reference in its entirety.

BACKGROUND

In some cases, it is desirable to separate materials. Materials to be separated may include solid-liquid mixtures that include liquid materials having various particulates dispersed therein. Materials to be separated may also include dry materials, with different methods and means used to separate large dry materials from small dry materials. Vibratory screening machines and centrifuges are used in the mining and oil and gas industries, for example, to separate such materials. When drilling an oil well, for example, a slurry material (also known as "drilling mud") may be used to lubricate drill bits and to remove cuttings. One or more shaker machines may be used to remove cuttings and sediment that may accumulate in the slurry. As material flows over a screen of a vibratory screening machine, particles that are smaller than screening openings may pass through the screen along with liquid contained in the slurry. As such, a vibratory screening machine may be used to alter a particle size distribution in a slurry.

There may be many operating parameters that may control the efficiency and/or efficacy of material separation systems. In many cases, the operating parameters may be determined by trial and error, which may be inefficient and may not result in an optimized material separation system. There is therefore a need for systems and methods that are able to quantify the effects of operating parameter changes in material separation systems. It would also be advantageous to be able to compare numerous drilling rigs within a given geographic region to determine an optimized set of material separation system operating parameters based on geography. These, and other features, will become readily apparent from the description that follows.

SUMMARY

According to some embodiments, a separation system may include one or more vibratory shaker devices and one or more centrifuges. Each device may be used to remove a specific component of a slurry. A multi-component system has a number of parameters that may be controlled to produce desired results in terms of a quality of separated material, operating costs, etc. According to embodiments, a control system for a separation system is provided. The control system identifies and measures a plurality of operating parameters and adjusts control parameters to optimize operation of the system according to various operation metrics. Operation metrics may include overall cost in terms of power consumption, material costs, waste removal costs, labor costs, repair costs, and the like.

A system may be configured to generate data and visual representations associated with drilling mud quality and efficiency. The system may provide important feedback, statistics, and efficiency, which may be used to inform business decisions regarding operation of drilling equipment, such as the material separation system. In some instances, a system may agglomerate information over time and from a multitude of drilling sites and/or drilling rigs. The information can be used to make recommendations, or even send control signals to material separation systems, based upon baseline metrics and/or optimal machine operating parameters across one or more rigs within a geographic basin.

According to some embodiments, a solid-liquid separation system may include a vibratory shaker configured to separate a solid-liquid mixture into a first solids-containing component and a shaker effluent; a centrifuge configured to separate the shaker effluent into a second solids-containing component and a centrifuge effluent; a sensor configured to measure a property of one or more of the solid-liquid mixture, the first solids-containing component, the shaker effluent, the second solids-containing component, and the centrifuge effluent; a processor circuit configured to perform operations, which may include receiving a sensor signal, representing the measured property, from the sensor; generating a control signal based on the measured property; and providing the control signal to the vibratory shaker and/or to the centrifuge to thereby cause a change in an operational parameter of the vibratory shaker and/or the centrifuge.

In some cases, the sensor is a flow meter or a density meter. The sensor may be configured to measure a particle size distribution, one or more properties of the first solids-containing component and/or the shaker effluent. The measured properties may include one or more of a density of the solid-liquid mixture and/or shaker effluent; a solids content of the solid-liquid mixture and/or shaker effluent; a particle size distribution of the shaker effluent and/or the first solids-containing component; a dryness of the first solids-containing component; a flow rate of the solid-liquid mixture into the vibratory shaker; a flow rate of the shaker effluent leaving the vibratory shaker; and a power consumption rate of the vibratory shaker.

In some embodiments, the sensor is configured to measure one or more properties of the second solids-containing component and/or the centrifuge effluent, which may include one or more of a density of the centrifuge effluent; a solids content of the centrifuge effluent; a particle size distribution of the centrifuge effluent and/or the second solids-containing component; a dryness of the second solids-containing component; a flow rate of the shaker effluent into the centrifuge; a flow rate of the centrifuge effluent leaving the centrifuge; and a power consumption rate of the centrifuge.

The sensor may be configured to measure one or more properties associated with the centrifuge, the shaker effluent, and/or the centrifuge effluent, which may include a density; a viscosity; a turbidity; a pond depth; and a torque load associated with one or more centrifuge motors.

In some embodiments, the vibratory shaker is configured to receive the control signal from the processor circuit and to change one or more operational parameters of the vibratory shaker based on the received control signal. In some cases, the operational parameters include a screen angle; a shape of vibratory motion; an amplitude of vibratory motion; and a frequency of vibratory motion.

The processor circuit may generate the control signal by performing operations such as determining a relationship between a measured property and an operational parameter such that a change in an operational parameter causes a change in a measured property; and generating the control signal such that the control signal causes a change in the operational parameter to thereby cause a change in the measured property to reduce a difference metric between the measured property and a predetermined target value of the measured property.

In some instances, the processor circuit generates one or more control signals to cause changes in operational parameters of the vibratory shaker and/or centrifuge to minimize a cost metric, wherein the cost metric depends on one or more costs including a dilution cost; a disposal cost; an energy cost; a screen-replacement cost; a maintenance cost; and a non-productive time (NPT) cost.

According to some embodiments, a processor-implemented method includes the steps of receiving, by a processor circuit, time dependent data characterizing drilling fluids associated with a well, the drilling fluids having been processed by a solid-liquid separation system; determining recommended changes to one or more operating parameters of the solid-liquid separation system based on an analysis of the data; generating a time dependent control signal based on the recommended changes; and automatically providing the control signal to a component of the solid-liquid separation system to thereby cause a change in an operational parameter of the solid-liquid separation system.

The control signal may change an operating parameter of a vibratory shaker configured to separate a solid-liquid mixture into a first solids-containing component and a shaker effluent.

In some cases, the control signal changes an operating parameter of a centrifuge configured to separate the shaker effluent into a second solids-containing component and a centrifuge effluent.

In some embodiments, receiving time dependent data comprises receiving signals from one or more sensors configured to measure a property of one or more of a solid-liquid mixture, a first solids-containing component, a shaker effluent, a second solids-containing component, and a centrifuge effluent.

The system may determine recommended changes by performing a machine learning algorithm on the data to identify trends in well performance.

According to some embodiments, a computer-implemented method includes acquiring drilling fluid reports; parsing the drilling fluid reports to extract mud data; standardizing the mud data; performing a machine learning algorithm on the mud data to identify trends in well performance; determining, based at least in part on the trends in well performance, recommendations on improving the well performance by one or more changes to the operating parameters of a solid-liquid separation system; and providing, on a display, the recommendations.

Providing recommendations may include recommended changes to a vibratory shaker configured to separate a solid-liquid mixture into a first solids-containing component and a shaker effluent. Providing recommendations may additionally or alternatively include recommended changes to a centrifuge configured to separate the shaker effluent into a second solids-containing component and a centrifuge effluent.

The computer-implemented method may acquire the drilling fluid reports by receiving data from one or more sensors configured to measure a property of one or more of a solid-liquid mixture, a first solids-containing component, a shaker effluent, a second solids-containing component, and a centrifuge effluent.

In some instances, the method includes generating a control signal based on the recommendations; and providing the control signal to a component of the solid-liquid separation system.

The method may further include a control signal that causes a change in an operational parameter of the vibratory shaker and/or the centrifuge.

INCORPORATION BY REFERENCE

All patents, applications, and publications referred to and identified herein are hereby incorporated by reference in their entirety and shall be considered fully incorporated by reference even though referred to elsewhere in the application. Specifically, the subject matter of the present application is related to and incorporates by reference the complete disclosures of the following commonly owned U.S. Patents and pending applications: US Provisional Patent Application having Ser. No. 62/874,853

BRIEF DESCRIPTION OF THE DRAWINGS

The accompanying drawings are part of the disclosure and are incorporated into the present specification. The drawings illustrate examples of embodiments of the disclosure and, in conjunction with the description and claims, serve to explain, at least in part, various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

FIG. 5 is a matrix of measured properties in relation to various cost metrics, according to an example embodiment.

FIG. 6 is a matrix of measured properties in relation to various cost metrics, according to an example embodiment.

FIG. 7 is a matrix of external input data in relation to various cost metrics, according to an example embodiment.

DETAILED DESCRIPTION

Figure 1:
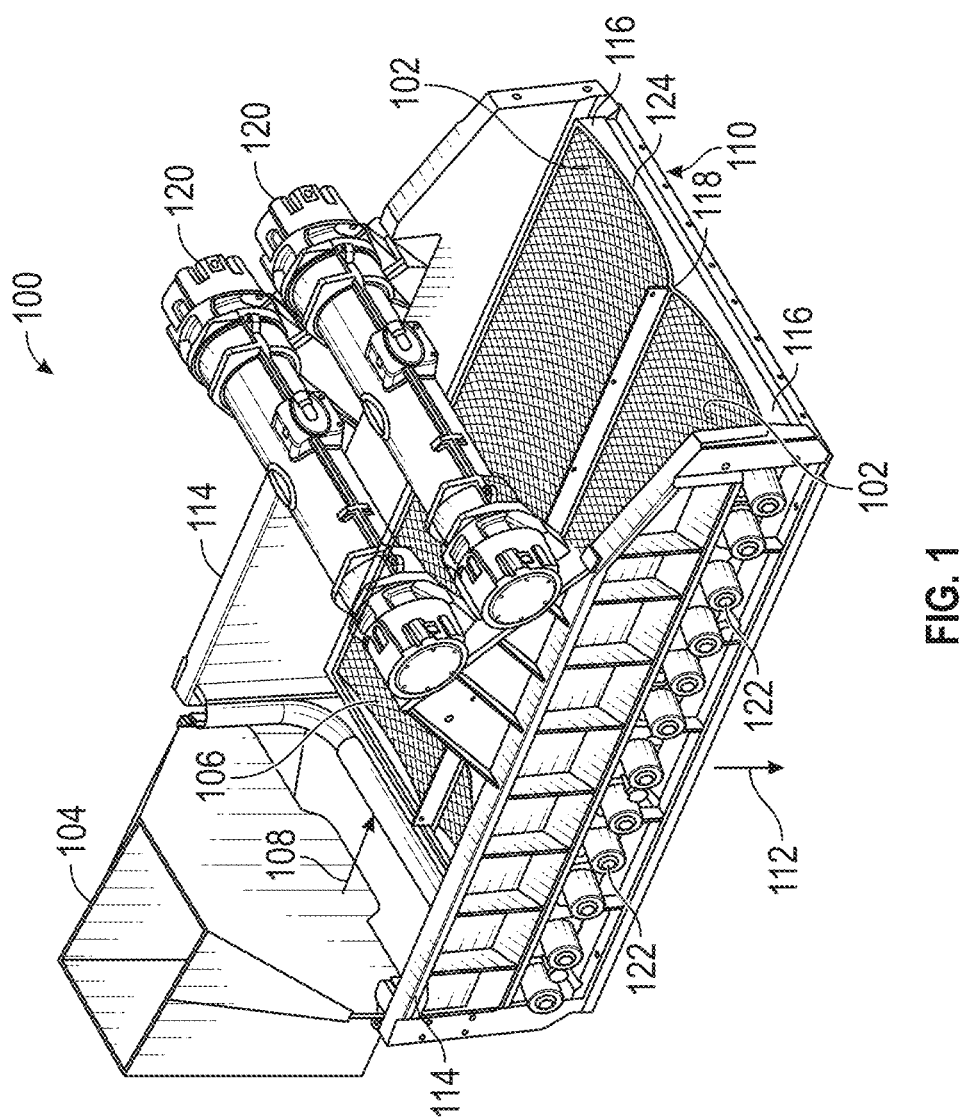
FIG. 1 illustrates a perspective view of a vibratory screening machine with installed replaceable screen assemblies, according to an example embodiment.

This disclosure generally relates to methods and systems that control material separation systems. Materials to be separated may include solid-liquid mixtures that include liquid materials having various particulates disbursed therein. Vibratory screening machines and centrifuges are used in the mining and oil and gas industries, for example, to separate such materials. When drilling an oil well, for example, a slurry material (also known as "drilling mud") may be used to lubricate drill bits and to remove cuttings. One or more shaker machines may be used to remove cuttings and sediment that may accumulate in the slurry. As material flows over a screen of a vibratory screening machine, particles that are smaller than screening openings pass through the screen along with liquid contained in the slurry. Thus, the use of a first vibratory screening machine may be used to remove particles having sizes greater than screen openings. As such, a vibratory screening machine may be used to alter a particle size distribution in a slurry. In one or more additional stages, additional vibratory shaker machines may be used to further alter the particle size distribution of the slurry by removing further particles according to a size of screen openings.

For some operations, it may be advantageous to remove still smaller particles that cannot be removed using a vibratory shaker machine. In such a situation, a centrifuge may be used to further remove smaller particulate materials. In an example, a slurry may contain both low-gravity solids (LGS) and high-gravity solids (HGS). The LGS may have a density of approximately 2.6 g/cm$^3$, and may correspond to cuttings and material that is ground by a drill bit. The LGS may include a particle distribution that may be specified in terms of a size threshold. For example, the LGS may include a first component having particles that are larger than or equal to 75 μm, and a second component having particles that are 74 μm and smaller. According to an embodiment, the first component of the LGS may be removed using a vibratory shaker machine. The second component of the LGS may be removed using a centrifuge. Additional material, including HGS, may also be removed using a centrifuge.

HGS include dense solids that may be added to the slurry to increase its density. For example, HGS may include barite (i.e., BaSO$_4$), having a density of approximately 4.2 g/cm$^3$, or hematite (i.e., Fe$_2$O$_3$), having a density of approximately 5.5 g/cm$^3$. Barite and hematite particles, as used to adjust the density of a slurry, are typically ground to have a particle size in a range from approximately 3 μm to 74 μm. In a barite recovery operation, a centrifuge may be used to remove barite while leaving other smaller-sized particles. Given a particle size distribution including barite and other lower-gravity materials, a centrifuge may be run at first rotational speed that is effective in removing barite particles. In a further operation, the centrifuge may then be run at a second speed, which is greater than the first speed, to remove smaller particles including LGS. In an example embodiment, barite particles having 53 μm, 45 μm, 38 μm, etc., particle sizes may be removed using a first rotational speed of a centrifuge. Smaller particles may then be removed by operating the same centrifuge at a higher rotational speed. In alternate embodiments, a second centrifuge may be utilized to remove still further particles from the slurry.

According to one or more embodiments, a separation system may include one or more vibratory shaker devices and one or more centrifuges. Each device may be used to remove a specific component of the slurry. As described in greater detail below, such a multi-component system has a number of parameters that may be controlled to produce desired results in terms of the quality of separated material, operating costs, etc. According to embodiments, a control system for a separation system is provided. The control system identifies and measures a plurality of operating parameters and adjusts control parameters to optimize operation of the system according to various metrics. Operation metrics may include overall cost in terms of power consumption, material costs, waste removal costs, labor costs, repair costs, etc., as described in greater detail below.

FIG. 1 illustrates a perspective view of a vibratory screening machine 100 with installed replaceable screen assemblies 102, according to an example embodiment. In this example, material is fed into a feed feeder 104 and is thereby directed onto a top surface 106 of the screen assemblies 102. The material travels in a flow direction 108 toward an end 110 of vibratory screening machine 100. Material flowing in direction 108 is contained within the concave configuration provided by the screen assemblies 102 and is prevented from exiting the sides of screen assemblies 102.

Material that is undersized and/or fluid passes through screen assemblies 102 onto a separate discharge material flow path 112 for further processing by another vibratory screening machine, by a centrifuge, etc. Materials that are oversized exit end 110. The material to be screened may be dry, a slurry, etc., and screen assemblies 102 may be pitched downwardly from the feeder 104 toward opposite end 110 in direction 108 to assist with the feeding of the material. In further embodiments, screen assemblies 102 may be pitched upwardly from feeder 104 and/or feeder 104 may provide material at a different location along screen assemblies 102. For example, feeder 104 may be positioned to deposit material in a middle portion of screen assemblies 102 or to deposit material in another location on screen assemblies 102 in other embodiments.

In this example, vibratory screening machine 100 includes wall members 114, concave support surfaces 116, a central member 118, vibrational motors 120, and compression assemblies 122. Support surfaces 116 may have a concave shape and include similarly shaped mating surfaces 124. Compression assemblies 122, which in this example are attached to an exterior surface of wall members 114, may impart a compressive force to screen assemblies 102, to thereby hold screen assemblies 102 in place, in contact with support surfaces 116. Vibrational motors 120 may impart a vibrational motion to screen assemblies 102 that acts to enhance the screening process. Central member 118 divides vibratory screening machine 100 into two concave screening areas. In other embodiments, vibratory screening machines 100 may have one concave screening area with compression assemblies 122 arranged on one wall member as shown, for example, in FIG. 2 and described in greater detail below.

Vibrational motors 120 may include various eccentric vibrator systems that may produce substantially linear, elliptical, and/or circular vibrations, as disclosed in U.S. patent application Ser. No. 16/279,838, the contents of which is incorporated herein by reference in its entirety. Such systems may generate respective substantially linear sinusoidal forces that cause substantially linear vibrations or may change an angle of motion and an acceleration of a screening machine. In one example, a slurry (e.g., a semi-liquid mixture) may be dewatered and/or conveyed along a vibrating screen of the screening machine under the influence of vibratory motion. The slurry may be transformed from a liquid-solid mixture to a dewatered solid. To increase dryness of the material, disclosed embodiments allow a conveyance angle of the system to be adjusted, which increases liquid removal from the mixture.

For example, the conveyance angle may be increased from 45° to 60°. An increased angle may reduce a flow rate of material moving upward on a screening surface, thereby allowing more time for liquid to be driven from the mixture. Similarly, vibrational acceleration of the system may be increased to increase removal of the liquid. Alternatively, vibrational acceleration may be decreased, causing less liquid to be removed, if a wetter discharge is desired. In dry screening applications, vibration of the material may also be increased to reduce an occurrence of stuck particles in the vibrating surface (i.e., to reduce screen blinding). In further embodiments, it may be advantageous to change a vibrational motion from a linear motion, to an elliptical motion, to a circular motion, etc., as described in greater detail below with reference to FIGS. 17 to 27.

Figure 2:
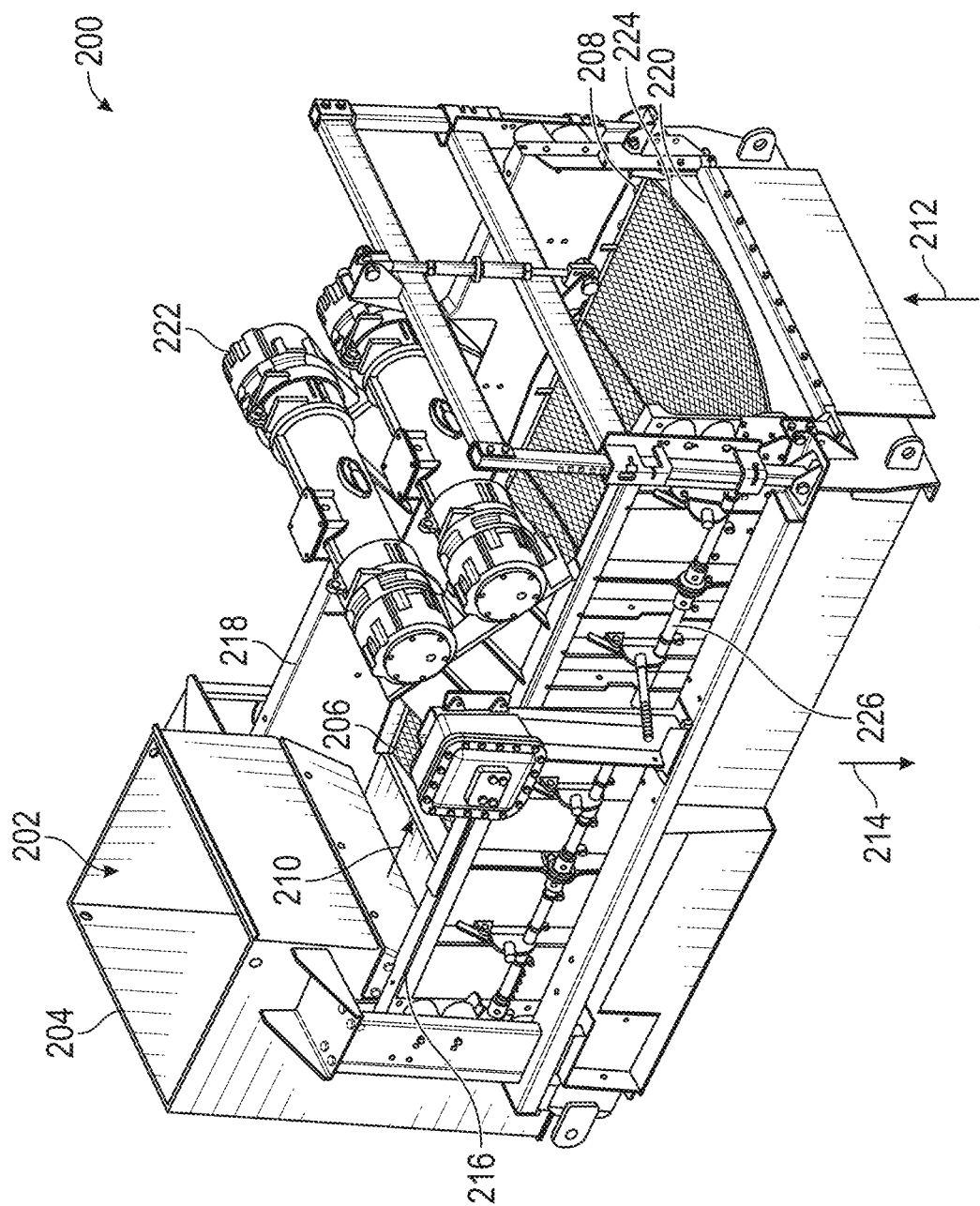
FIG. 2 illustrates a perspective view of a vibratory screening machine with installed replaceable screen assemblies, according to an example embodiment.

FIG. 2 shows a perspective view of a vibratory screening machine 200 with installed replaceable screens assemblies having a single concave screening area, according to an example embodiment. Material 202 to be screened may be fed into a feeder 204 which directs the material onto a top surface 206 of screen assemblies 208. Material deposited by feeder 204 travels in flow direction 210 toward an end 212 of vibratory screening machine 200. Material is prevented from exiting the sides of screen assemblies 208 by the concave shape of screen assemblies 208 and by wall members 216 and 218, as described in greater detail below.

Material that is undersized and/or fluid passes through the screen assemblies 208 onto a separate discharge material flow path 214 for further processing. Materials that are oversized exit end 212. Material to be screened may be dry, a slurry, etc., and screen assemblies 208 may be pitched downwardly from the feeder 204 toward opposite end 212 in the direction 210 to assist with feeding of the material. In further embodiments, screen assemblies 208 may be pitched upwardly from feeder 204 and/or feeder 204 may provide material at a different location along screen assemblies 208. For example, feeder 204 may be positioned to deposit material in a middle portion of screen assemblies 208 or to deposit material in another location on screen assemblies 208 in other embodiments.

Vibratory screening machine 200 includes a first wall member 216, a second wall member 218, concave support surfaces 220, a vibratory motor 222, screen assemblies 208, and a compression assembly 226. Support surfaces 220 have a concave shape and include mating surfaces 224. Compression assemblies 226, which in this example are attached to an exterior surface of wall member 216, may impart a compressive force to screen assemblies 208 to thereby hold screen assemblies 208 in place in contact with mating surface 224 of support surfaces 220.

Vibratory motor 222 may be configured to cause screen assemblies 208 to vibrate to enhance screening. Compression assembly 226 may be attached to an exterior surface of the first wall member 216 or second wall member 218. Vibratory screening machine 200, shown in FIG. 2, has a single concave screening area. In further embodiments, vibratory screening machines may have multiple concave screening areas. While vibratory screening machine 200 is shown with multiple longitudinally oriented screen assemblies 208 creating a concave material pathway, screen assemblies 208 are not limited to such a configuration and may be otherwise oriented. Additionally, multiple screening assemblies 208 may be provided to form a concave screening surface, as shown in FIGS. 1 and 2.

FIGS. 1 and 2 illustrate two example vibratory screening machines. Further embodiments may be configured for use with various vibratory screening machines and parts thereof, including machines designed for wet and dry applications, machines having multi-tiered decks and/or multiple screening baskets, and machines having various screen attachment arrangements such as tensioning mechanisms (e.g., under-mount and over-mount tensioning mechanisms), compression mechanisms, clamping mechanisms, magnetic mechanisms, etc. For example, embodiments may include vibratory screening machines as described in U.S. Pat. Nos. 7,578,394; 6,820,748; 6,669,027; 6,431,366; and 5,332,101.

Screen assemblies may include: side portions or binder bars including U-shaped members configured to receive over-mount type tensioning members, for example, as described in U.S. Pat. No. 5,332,101; side portions or binder bars including finger receiving apertures configured to receive under-mount type tensioning, for example, as described in U.S. Pat. No. 6,669,027; side members or binder bars for compression loading, for example, as described in U.S. Pat. No. 7,578,394; or may be configured for attachment and loading on multi-tiered machines, for example, such as the machines described in U.S. Pat. No. 6,431,366. Screen assemblies and/or screening elements may also be configured to include features described in U.S. Pat. No. 8,443,984, including guide assembly technologies described therein and pre-formed panel technologies described therein. Screen assemblies and screening elements may further be configured to be incorporated into embodiments including pre-screening technologies that are compatible with the mounting structures and screen configurations described in U.S. Pat. No. 8,439,203.

The disclosure of each of U.S. Pat. Nos. 8,439,984; 8,439,203; 7,578,394; 7,228,971; 6,820,748; 6,669,027; 6,431,366; 5,332,101; 4,882,054; and 4,857,176, and the patents and patent applications referenced in these documents, is hereby incorporated by reference in its entirety. Various other screening machines may be included in other embodiments as needed for specific applications.

Figure 3:
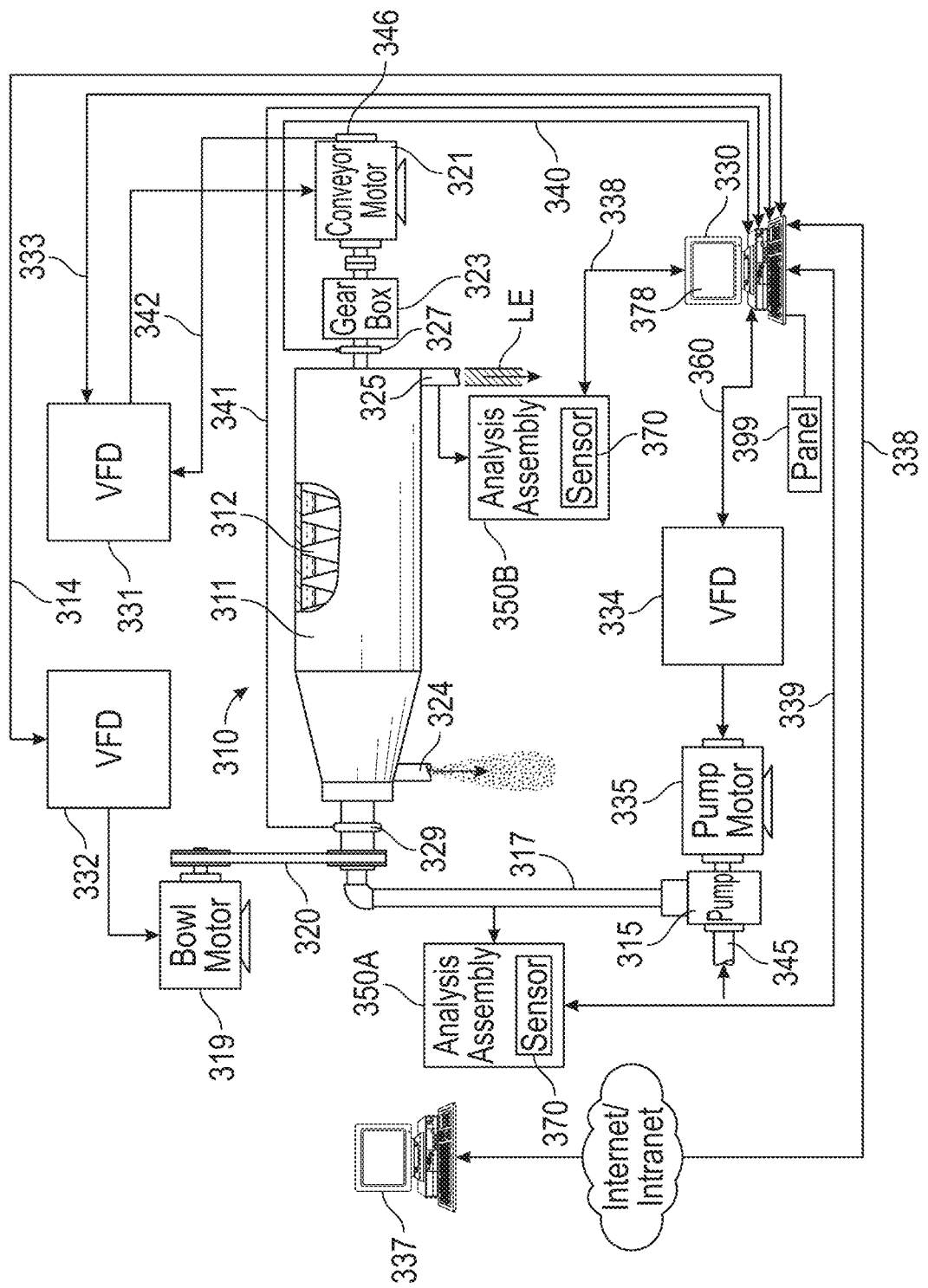
FIG. 3 shows a schematic illustration of a centrifuge with an automatic sampling and control system, according to an example embodiment.

FIG. 3 is a schematic representation of a centrifuge 310 with an automatic sampling and control system, according to an example embodiment. Centrifuge 310 may be a decanter style centrifuge. In this example, centrifuge 310 includes a bowl 311, a screw conveyor 312, a pump 315, a bowl drive motor 319, a screw conveyor drive motor 321, and a pump motor 335. Centrifuge 310 may further include a bowl variable frequency drive (VFD) system 332 that is operatively arranged to drive bowl drive motor 319; a conveyor VFD system 331 that is operatively arranged to drive screw conveyor drive motor 321; a pump VFD system 334 that is operatively arranged to drive the pump drive motor; and at least one computer or processor circuit 330 electrically and operationally connected to bowl VFD 332, conveyor VFD 331, and the pump VFD 334.

Conveyor drive motor 321 may be coupled to conveyor 312 via gearbox 323. Centrifuge 310 may be configured to receive a slurry via conduit 345 connected to pump 315. Pump 315 may be configured to pump the slurry to bowl 311 via conduit 317. Bowl 311 may be driven by bowl motor 319 via pulley arrangement 320, and screw conveyor 312 may be driven by conveyor motor 321 via gear box 323. HGS, which are separated from the slurry, may be discharged from centrifuge 310 through conduit 324. The remaining portions of the slurry (liquid effluent LE) may be ejected from centrifuge 310 via conduit 325. Bowl 311 may be supported by bearings 327 and 329, which may have sensors in communication with computer or processor circuit 330 via lines 340 and 341, respectively.

A speed of conveyor motor 321 and direction information may be calculated by VFD 331 and may be communicated to conveyor VFD 331 via line 342. Line 333 provides a communication link between conveyor VFD 331 and computer or processor circuit 330. Conveyor VFD 331, bowl VFD 332, and pump VFD 334 may communicate with computer or processor circuit 330 over a communication network, for example, using lines 333, 314, and 360, respectively. Many different types of wired and wireless communication networks may be used. A remote computer 337 may be linked to computer 330 by a communication channel, including, but not limited to hardwire line 338 or by a wireless channel. In this regard, troubleshooting or operation of centrifuge 310 may be monitored and controlled from a remote location.

In an example embodiment, a computer or processor circuit 330 may include a display device 378. Computer or processor circuit 330 may be configured to provide control signals to centrifuge 310 and to control various parameters of centrifuge 310 such as a recommended liquid level (i.e., a pond level) of centrifuge 310. Various parameters and operating status data may be displayed on display device 378. In certain embodiments, an operator may interface directly with computer 330, via a local operator control panel 399, or via remote computer 337 with a remote internet or intranet connection to computer or processor circuit 330. In this way, an operator may monitor and control centrifuge 310 while on site or to monitor centrifuge 310 remotely from an off-site location. Additional hardware may allow remote visual monitoring of centrifuge 310 from an off-site location or from an on-site in situations where components of the apparatus may be difficult to access.

Centrifuge 310 may include an analysis assembly 350A connected to conduit 317 that connects pump 315 and bowl 311. Analysis assemblies 350A and 350B may include sensors 370 that are electrically an operationally connected to computer or processor circuit 330, for example, via lines 339. Analysis assembly 350A may be configured to automatically sample a slurry that is pumped through conduit 317 to bowl 311, and to automatically transmit data, characterizing the sampled slurry, to computer or processor circuit 330. Similarly, analysis assembly 350B may be configured to automatically sample an effluent flowing through conduit 325, and to automatically transmit data, characterizing the sampled effluent, to computer or processor circuit 330.

Disclosed embodiments may include a centrifuge and centrifuge control systems such as the embodiments described in U.S. Pat. No. 9,283,572, the disclosure of which is incorporated by reference herein in its entirety. Further embodiments may combine a vibratory shaker machine, such as shown in FIG. 1 or 2, with a centrifuge, such as shown in FIG. 3, as described in greater detail below.

Figure 4:
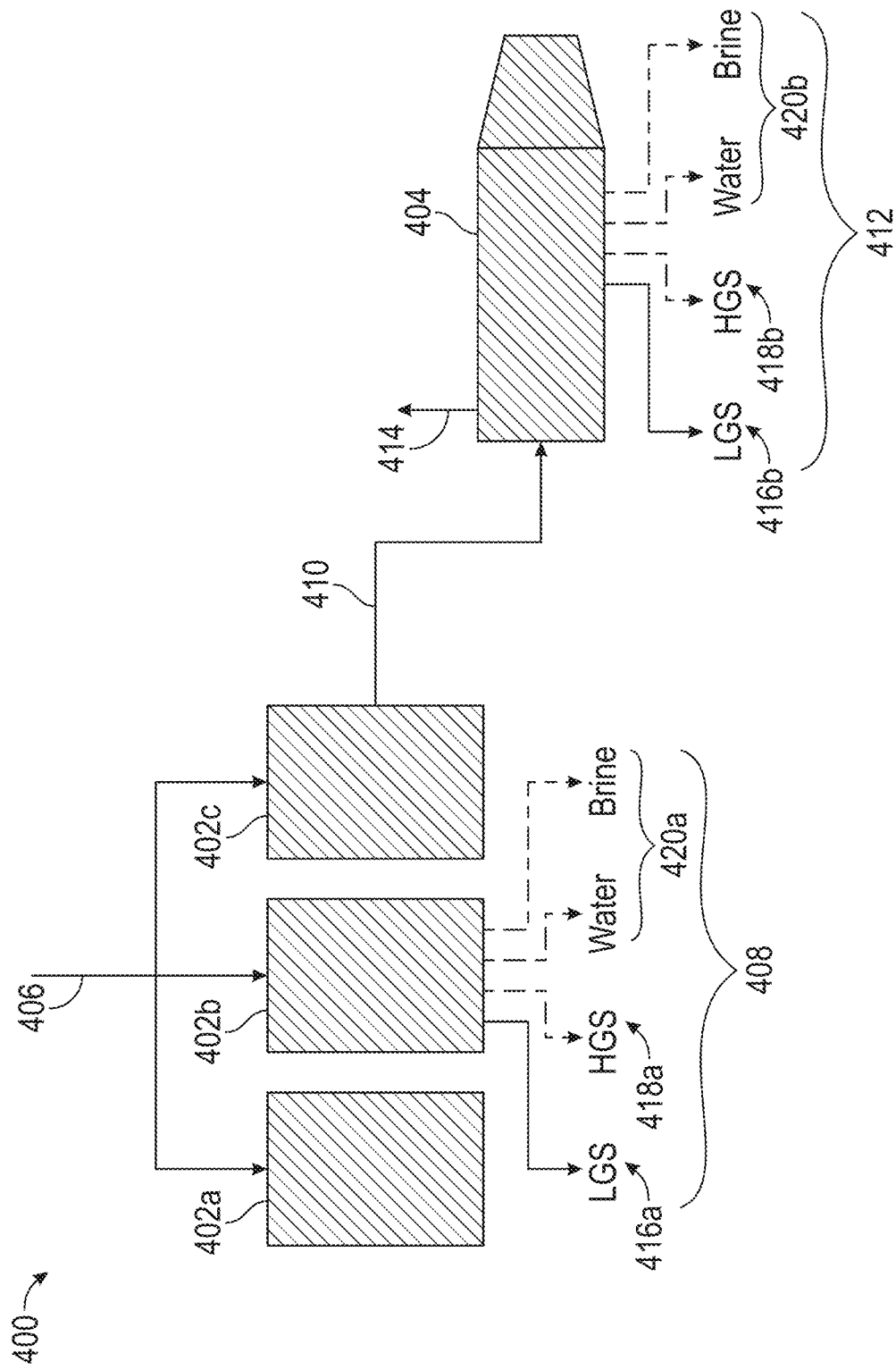
FIG. 4 is a schematic illustration of a solids control system including vibratory shaker machines and a centrifuge, according to an example embodiment.

FIG. 4 is a schematic illustration of a solids control system 400 including shaker machines 402a, 402b, and 402c, and a centrifuge 404, according to an example embodiment. A slurry (e.g., a drilling mud) may be fed to shaker machines 402a, 402b, and 402c along an input path 406. Various solids may be removed by shaker machines 402a, 402b, and 402c along a first output path 408 (for simplicity, an output path is only shown for shaker machine 402b). A shaker liquid effluent, including a liquid and solids not removed by shaker machines 402a, 402b, and 402c, may leave shaker machines 402a, 402b, and 402c along a second output path 410. Further solids may be removed by centrifuge 404 and may leave centrifuge 404 along a third output path 412. A centrifuge liquid effluent, including a liquid and solids not removed by centrifuge 404, may leave centrifuge 404 along a fourth output path 414.

Various parameters of shaker machines 402a, 402b, and 402c and centrifuge 404 may be adjusted to optimize performance of solids control system 404 according to various metrics, as described in greater detail below. For example, solids control system 400 may be used to remove some solids and liquids from a slurry while leaving other solids and liquids that may be recovered as the shaker liquid effluent and/or the centrifuge liquid effluent. For example, it may be desirable to remove LGS (416a and 416b) while leaving HGS (418a and 418b).

As described above, LGS 416a and 416b, may have a density of approximately 2.6 g/cm$^3$, and may correspond to cuttings and material that is ground by a drill bit. LGS may include a first component 416a having particles that are larger than or equal to 75 µm, and a second component 416b having particles that are 74 µm and smaller. According to an embodiment, first component 416a of the LGS may be removed using a vibratory shaker machine and second component 416b of the LGS may be removed using centrifuge 404. Efficient removal of LGS allows slurry to be recycled. As such, removal of LGS represents a cost savings relative to replacement costs of slurry that would otherwise need to be replaced.

As described above, slurry generally includes a certain amount of HGS that is intentionally added to the slurry to adjust the density of the slurry. For example, HGS in the form of barite or hematite may be intentionally added to the slurry. Therefore, it is important to adjust operating parameters of vibratory shaker machines 402a, 402b, and 402c, and to adjust operating parameters of centrifuge 404 to avoid removal of HGS. HGS 418a that is removed by shaker machines 402a, 402b, and 402c, or HGS 418b that is removed by centrifuge 404, therefore, may represent a net incurred cost associated with replacement of removed HGS 418a and 418b. Removal of other components of slurry, such as water and brine, 420a and 420b, may further represent a net incurred cost if the resulting shaker effluent and/or centrifuge effluent becomes too dry. In such situations, it may be necessary to add further liquids to adjust the fluidic properties of the resulting effluent.

A controller for system 400 may adjust operating parameters to efficiently remove certain components (e.g., LGS 416a and 416b) while leaving other components (e.g., HGS 418a and 418b, water, and brine 420a and 420b). Various cost metrics that govern operation of system 400 may be defined. Cost metrics may depend on various measured parameters and control parameters that govern the system, as described in greater detail below. Disclosed embodiments provide a control system that optimizes performance of system 400 based on the various cost metrics and dependence of the cost metrics on measured parameters and control parameters.

TABLE 1 angle of shaker screen frame
shape of shaker motion
amplitude of shaker motion
frequency of shaker motion
size of screen apertures
screen wire thickness
screen panel non-blanked surface area
flow rate of material over screen Table 1, above, provides a list of shaker control parameters, according to an example embodiment. As described above with reference to FIGS. 1 and 2, a vibratory shaker may be used to separate particulate materials from a slurry. The size of screen apertures is an important shaker parameter that acts to modify a particle size distribution. In this regard, liquids and particles that are smaller than a screen aperture pass through the screen apertures and remain with the shaker effluent. Particles that are larger than screen apertures are removed from the slurry and are collected from a screening surface. As slurry flows across a screening surface, a frequency, an amplitude and shape of shaker motion governs screening efficiency. Further, a flow rate of material passing over the screen may have an effect on screening efficiency. For example, if the flow rate is too fast, more of the particulate matter may not have sufficient time to be properly screened. As such, reducing the flow rate may improve screening efficiency. In certain applications, such as with drilling an oil or gas well, it may not be possible to control the rate of flow to the shaker. In such operations, several shakers may be employed. For slow to moderate flow, one or more shakers may be employed with increasing numbers of shakers used as flow increases.

As mentioned above, a screen angle of a vibratory screening machine may be adjustable. In certain embodiments, as the vibratory screening machine vibrates, removed solids may vibrate in such a way that they gradually move up an incline of the screening surface. As removed solids move up the screening surface they generally lose liquid and thereby become drier. As such, the degree of dryness may be affected by the screen angle, as described in greater detail below with reference to Table 5. As also described below, a rate at which solids are removed from a slurry may be determined, in part, by a shaker screen angle.

TABLE 2 solids content
slurry rheology
particle size distribution
dryness of removed solids
maximum flow rate
rate of screen degradation
power consumption Table 2, above, provides a list of shaker measured parameters, according to an example embodiment. Various measurements may be performed to determine properties of the initial slurry, the shaker effluent, and the centrifuge effluent. Parameters may include solids content and particle size distributions of dispersed solids. One parameter of interest is a distribution of solids in terms of mass fractions of LGS, HGS, water, brine, oil, and other components. As mentioned above, it may be desirable to remove LGS while leaving HGS in the effluent. HGS may include barite, hematite, or other heavy solid particulate material that is added to a slurry to adjust the density of the slurry. Often, in an operation to recycle a slurry, LGS, which may represent drill cuttings and other sediment, may be removed from the slurry while HGS, such as barite, hematite, etc., may remain in the slurry. In other operations, it may also be useful to recover HGS material, if needed, for example, to reduce the density of the recycled slurry.

Recovered solids generally are not completely dry and, therefore, have a certain amount of an associated fluid component. The fluid may include water, brine, oil, etc. When such recovered solids are discarded, the liquid component is also discarded. As such, the discarded liquid component may represent an incurred cost if the liquid is otherwise a useful component of the slurry. As such, the dryness of removed solids is a parameter that may factor into operation costs, as described in greater detail below.

As mentioned above, with reference to Table 1, the angle of a screening surface may affect screening efficiency relative to a flow rate of material across a screen. As such, a maximum rate at which solids may be removed from the slurry may be affected by the angle of the screen. A rate of screen degradation may also be affected by other parameters. For example, screens with smaller apertures tend to degrade more quickly than screens with larger apertures. Further, when operating a vibratory screening machine with a variable angle, the screen may degrade at a rate that is dependent on the screening angle, as described in greater detail below. Power consumption is another parameter to consider when operating a vibratory screening machine. For example, under certain operating conditions, it may be more efficient to run a vibratory screening machine continuously at a slower speed rather than operating it at a higher speed but only for certain time intervals.

TABLE 3 bowl speed
conveyor speed
pump speed
conveyor/bowl differential speed
radius of weir plates Table 3, above, provides a list of centrifuge control parameters, according to an example embodiment. The parameters include a bowl speed, a conveyor speed, a pump speed, and a differential speed of relative conveyor/bowl motion. A further parameter may include a radius of weir plates. A pond level of fluid in the centrifuge may be adjusted by changing the radius of weir plates. Various performance metrics of the centrifuge may be adjusted by controlling parameters, such as those listed in Table 3.

TABLE 4 torque load
density
viscosity
turbidity
solids content
particle size distribution
flow rate
pond depth
power consumption Table 4, above, provides a list of centrifuge measured parameters, according to an example embodiment. Measured parameters that characterize material separation processes of the centrifuge include density, viscosity, turbidity, solids content, and particle size distribution. Flow rate of material fed to the centrifuge, along with bowl speed and conveyor speed governs a degree to which materials are separated from the effluent. Pond depth generally affects dryness of the separated solids, and overall power consumption of the centrifuge is related to bowl speed, conveyor speed, pump speed, and torque load. As described in greater detail below, torque load may be controlled by controlling a speed of relative conveyor/bowl motion.

An imposed change in a control parameter generally induces a change in a measured parameter. In turn, a change in a first measured parameter may further induce a change as second, a third, etc., measured parameter. Table 5, below, summarizes relationships between measured and control parameters for a shaker machine while Table 6, below, summarizes relationships between measured and control parameters for a centrifuge.

TABLE 5

| | Change in first parameter | Induced change in second |
|---|---|---|
| 1 | angle of shaker ↑ | dryness of removed solids ↑ |
| 2 | angle of shaker ↑ | maximum flow rate ↑ |
| 3 | angle of shaker ↑ | rate of screen degradation ↑ |
| 4 | flow rate ↑ | effluent solids content (no change) |
| 5 | size of screen apertures ↑ | minimum particle size removed ↑ |
| 6 | size of screen apertures ↑ | rate of screen degradation ↓ |

Table 5 summarizes various relationships between measured and control parameters of the shaker, according to an example embodiment. The relationships shown in Table 5 are observed in some embodiments while in other embodiments, other relationships may govern. For any given embodiment, relationships such as those indicated in Table 5 are generally determined experimentally for a given embodiment. Control schemes and control systems may then be developed to control the system based on the determined relationships.

As mentioned above, the angle of a vibratory shaker machine affects the screening process. For example, as the angle of a screen basket of the shaker is increased, the dryness of the screened solids tends to increase. Further, in some embodiments, as the angle of the shaker is increased, a maximum flow rate may increase. For example, in certain embodiments, separated solids flow up the screen, and as such, gravity limits how fast the separated solids flow up the screen. Higher angle means the separated solids flow up the screen more slowly so the overall flow rate of material that can be processed is slower with higher angle. Alternatively, increased screen angle leads to a larger pool of material at the feed end which tends to increase throughput. Unfortunately, as mentioned above, increasing the shaker screen angle also tends to increase the rate of degradation of the screen.

A further angle of interest with regard to the shaker is an angle of vibratory motion. As the angle of motion is increased from 0 to 90° (with 90° being perpendicular to the screen surface), screened particles are conveyed along the screen at a slower rate. In this scenario the capacity would decrease with increasing angle, as there would be more solids blocking the screen surface thereby reducing fluid flow through the screen. Increasing the screen angle generally does not significantly change the angle of motion. Thus, for embodiments in which the motion of screened solids is dominated by the angle of motion, screened solids continue to convey up the screen at a rate that is not strongly dependent on the screen angle.

A further relationship governs flow rate and effluent solids content. In certain embodiments, material is fed from a top end of a screen to a bottom end of the screen, as described above with reference to FIGS. 1 and 2. In such embodiments, an increasing shaker angle leads to an increased rate of effluent flowing down the screen. In this case, effluent spends less time on the screen, and therefore, fewer solids are removed. Thus, the resulting effluent may have a higher solids content. In other embodiments, such as shakers that are fed from a bottom end, an opposite trend may occur. In other embodiments, there may be no relation between flow rate and effluent solids content.

In general, effluent solids content depends on screen aperture sizes and the percentages of various size particles in the feed to the shaker. Increasing the flowrate (or shaker angle) may not have a significant effect on the percentage of solids that are able to pass through the screen. In terms of mass or volume, a higher feed flow rate may lead to more solids in the effluent stream but the amount of solids would still be related to the proportion of a given particle size in the feed. For example, if the feed includes 10% by volume of particles that are small enough to pass through the screen openings, the effluent would be expected to contain approximately 10 gallons/minute (GPM) of solids in the effluent if the feed to the shaker was 100 GPM. If the flowrate to the shaker was increased to 1000 GPM the effluent may be expected to contain 100 GPM of solids.

As further indicted in Table 5, as screen aperture sizes increase, so does the minimum size of particles that are removed by the screening process. Also, as mentioned above, an inverse relationship between screen aperture size and a rate of screen degradation exists.

TABLE 6

| | Change in fist parameter | Induced change in second parameter |
|---|---|---|
| 1 | pump speed ↑ | flow rate ↑ |
| 2 | pump speed ↑ | power consumption ↑ |
| 3 | pump speed ↑ | dryness of removed solids ↓ |
| 4 | bowl speed ↑ | minimum size of particles removed ↓ |
| 5 | bowl speed ↑ | effluent viscosity ↓ |
| 6 | bowl speed ↑ | effluent turbidity ↓ |
| 7 | bowl speed ↑ | effluent solids content ↓ |
| 8 | bowl speed ↑ | effluent density ↓ |
| 9 | bowl speed ↑ | power consumption ↑ |
| 10 | bowl speed ↑ | dryness of removed solids ↓ or ↑ |
| 11 | conveyor speed ↑ | motion of removed solids ↑ |
| 12 | conveyor/bowl differential speed ↑ | torque load ↓ |
| 13 | conveyor/bowl differential speed ↑ | dryness of removed solids ↓ |
| 14 | flow rate ↑ | torque load ↑ |
| 15 | flow rate ↑ | effluent density ↑ |
| 16 | flow rate ↑ | throughput ↑ |
| 17 | radius of weir plates ↑ | pond depth ↓ |
| 18 | pond depth ↑ | dryness of removed solids ↓ |
| 19 | pond depth ↑ | effluent viscosity ↓ |
| 20 | pond depth ↑ | effluent turbidity ↓ |
| 21 | pond depth ↑ | effluent solids content ↓ |
| 22 | pond depth ↑ | effluent density ↓ |

Table 6 summarizes various relationships between measured and control parameters of a centrifuge, according to an example embodiment. For example, increasing pump speed increases a flow rate of material into the centrifuge at a cost of increased power consumption. The increased flow rate due to the increased pump speed means that material spends less time in the centrifuge. As such, a dryness of particles removed by the centrifuge tends to decrease. Increasing the centrifuge bowl speed leads to a greater degree of solids removal. As such, a minimum size of removed solids tends to decrease. Greater removal of material with increased bowl speed tends to lower effluent viscosity, effluent turbidity, effluent solids content, and effluent density at a cost of increased power consumption.

Increasing bowl speed may increase or decrease dryness of removed solids. Increasing bowl speed increases removal of liquid. As such, for certain sizes of removed particles, dryness increases with bowl speed. In other situations, as bowl speed increases, smaller size particles are more readily removed. Smaller particles may have a larger total surface area per volume which may tend to retain more moisture. Thus, depending on how drastic the change in particle size is with respect to bowl speed, it may be possible that the solid discard actually includes more liquid at high bowl speed. In general, dryness may increase with bowl speed for a first range of bowl speeds and may decrease with bowl speed for a second range of bowl speeds. In certain embodiments, the second range of bowl speeds may be greater than the first range of bowl speeds. For other ranges of bowl speed, there may be approximately no change in dryness of removed solids verses bowl speed.

The conveyor acts to move material through the centrifuge. As such, increased conveyor speed tends to increase the motion of removed solids. Bowl speed is influenced by a bowl drive motor (e.g., bowl drive motor 319 in FIG. 3), and conveyor speed is influenced by a conveyor drive motor 321 (e.g., conveyor drive motor 321 in FIG. 3). A speed of the bowl drive motor is not necessarily the speed of the bowl, as the bowl motor is coupled to the bowl via a belt with a fixed ratio for that drive mechanism. Likewise, the conveyor speed is not necessarily the speed of the conveyor. The conveyor is coupled to the output of a gearbox that is mounted to the bowl. The conveyor motor spins an input pinion on the gearbox and therefore the conveyor speed is determined based on the bowl speed, conveyor motor speed, and the gear box ratio. As a result, there is a conveyor motor speed (gearbox input), conveyor speed (gearbox output), bowl speed, and bowl motor speed.

A control system may calculate the various speeds as follows. A user may input a desired bowl speed and the control system may determine a necessary motor speed to obtain the desired bowl speed. A user may also specify a desired differential speed. In this case, the control system may determine an actual bowl speed (based on the actual motor speed and the belt drive ratio). The control system may further determine a conveyor speed that is needed to obtain a desired differential speed. Based on the determined conveyor speed, the control system may then determine a necessary conveyor motor speed needed to obtain the desired differential speed. Lastly, based on a current conveyor motor speed and a current bowl speed, the control system may determine the actual conveyor differential speed. Various parameters may be controlled or changed if the differential speed differs from a desired differential speed.

For simplicity, Table 6 refers only to bowl speed and bowl/conveyor differential speed to characterize relationships between measured and controlled centrifuge parameters. As the above discussion shows, however, there are more complicated relationships involving the bowl motor speed and the conveyor motor speed. For example, no direct relationships can be established regarding conveyor speed alone because a given conveyor speed may result in many different differential speeds depending on the bowl speed of the centrifuge.

A torque load on one or more motors may be affected by the flow rate and/or by the conveyor/bowl differential speed. An increase in flow rate may lead to a decrease in torque load. Changing a differential speed, however, may be a faster or more efficient way to decrease a torque load. For example, in certain situations, turning off the feed to the centrifuge (i.e., reducing the flow rate to zero) may lead to torque load decreasing on a time scale of thirty to sixty seconds. Alternatively, in certain embodiments, increasing a differential speed by one or two revolutions per minute (RPM) can significantly reduce the torque in a matter of a few seconds.

Table 6 indicates further relationships involving flow rate. For example, increased flow rate may increase effluent density as well as throughput. In many situations, however, it may not be convenient or even possible to control the flow rate. For example, when drilling an oil well, slurry or drilling fluid/mud is pumped down the well and when it returns from the well it is directed to one or more shakers at a rate that is determined by the rate at which slurry is pumped into the well. As described above with reference to FIG. 4, a solids control system may have one or more shakers. A single shaker may be sufficient for low flow rates of slurry. As flow rates increase, based on the needs of a drilling operation, one or more additional shakers may be used.

As mentioned above, a pond depth of liquid in the centrifuge may be controlled by adjusting a radius of weir plates. In turn, adjusting the pond depth may influence various other parameters including: dryness of removed solids, effluent viscosity, effluent turbidity, effluent solids content, and effluent density.

Various systems and methods for controlling a centrifuge using relationships such as those provided in Table 6, above, are described in U.S. Pat. No. 9,283,572, the disclosure of which is incorporated by reference herein in its entirety. For example, a system may receive one or more input parameters identifying desired speeds for the bowl and conveyor motors, a desired torque load for the conveyor motor, and a maximum flow rate for a pump. The system may then regulate a pump speed, and thus a slurry flow rate, to maintain an actual torque load for the conveyor motor at the desired torque load. In situations for which it is not possible to maintain an actual torque load for the conveyor motor at the desired torque load, a pump may be regulated to adjust a pump speed and slurry flow rate to maintain maximum flow rate.

In other embodiments, a system may be configured to determine that an actual torque load is greater than a desired torque load. In turn, the system may regulate a pump speed to control flow rate of the slurry to reduce the actual torque load to be equal to or less than desired torque load. In other embodiments, a differential speed between the bowl and the conveyor may be adjusted to control a torque load, as mentioned above.

In further embodiments, various control systems and methods may rely on various measured parameters. For example, a system may be configured to measure at least one parameter of an effluent including feed density, viscosity, turbidity, solids content, particle distribution, and flow rate. Results of such measurements may then be used by the control system to adjust one or more of a bowl speed, a conveyor speed, a pump speed, a differential speed, and a pump flow rate to obtain desired results based on relationships such as those described above with reference to Table 6.

As described in greater detail below, similar control systems are provided to control a system that includes a centrifuge and one or more vibratory shaker machines, such as system 400, described above with reference to FIG. 4. Such a control system may control the various parameters (e.g., see Tables 1 to 4) of a solids control system (e.g., system 400 of FIG. 4) to control costs according to various cost metrics, based on known relationships between parameters (e.g., see Tables 5 and 6). Cost metrics may include dilution cost savings, disposal cost savings, energy cost savings, screen-replacement costs, maintenance costs, and non-productive time (NPT) cost reduction. The various cost metrics are described in greater detail below.

A cost metric associated with dilution is described as follows. As drilling fluid is used it acquires LGS and its density increases. For solids that are not removed, such a drilling fluid must be diluted with new drilling fluid in order for it to continue to be useful. In an example, 10 barrels (bbl) of fresh drilling fluid may be needed to dilute 1 bbl of solids that are not removed from used drilling fluid. For the purpose of illustration, a cost of $60/bbl of new drilling fluid is assumed. Increasing solids removal by a factor of "R" bbl, leads to a dilution cost savings of 10*60*R. As described above, removed solids typically also are not completely dry. As such, disposal of removed solids also leads to unwanted disposal of liquid. Decreasing the retained liquid by a factor of "O" bbl thus leads to a cost savings of 60*O due to the reduction, by O bbl, of replacement fluid. Thus, for an improved solids control system that increases solids removal by R bbl of solids, and increases dryness of the removed solids by O bbl, a combined dilution cost savings of 600*R+60*O is achieved.

The following example provides estimated dilution cost saving based on testing data from an oil well. In drilling the well, 1465 bbl of drilling fluid was used for dilution, at a cost of $60/bbl drilling fluid for a cost of $87,166. A total of 1110 bbl of cuttings were drilled and of these cuttings, 1005 bbl were removed and discarded leaving 105 bbl of missed cuttings that required dilution. Further, along with the discarded cutting, a total of 1649 bbl of liquid and LGS was discarded including 644.5 bbl of liquid and 1004.7 of LGS. A substantial cost savings may be achieved with an improved solids control system. For example, an improved solids control system may lead to a 13:1 actual dilution ratio, a 50% increase of removal of missed cuttings (i.e., approximately 50 bbl additional cuttings removed), and decreased removal of liquid on cuttings by 125 bbl (i.e., 20% slurry loss). With these estimates, a cost savings of 13*60*50+125*60=$46,500 may be achieved.

Disposal costs may be estimated as follows. In an example, a cost of $20/bbl may be assumed to haul away waste. With an improved solids control system that increases solids removal by R bbl, and decreases retained liquid on cutting by O bbl, a cost savings of 20*O−20*R may be obtained. Data from above-described oil well may also be used to estimate disposal costs. For example, with the above-described example oil well, disposal cost was $17/bbl to haul off waste. A total of 1110 bbl cuttings were drilled and 1649 bbl of waste was discarded. Of the waste discarded, 644.5 bbl was liquid, and 1004.7 bbl was LGS. Using an improved solids control system to increase removed solids by 50 bbl (i.e., 50% of missed cuttings) and to decrease liquid retained on the cutting by 125 bbl (i.e., 20% of slurry lost), leads to a cost savings of 17*125−17*50=$1,275.

As mentioned above, one parameter that may be optimized in an improved solids control system is power consumption. For example, under certain operating conditions, it may be more efficient to run the system continuously at a slower speed rather than operating the system at a higher speed but only for certain time intervals. Assuming an energy cost of $0.16/kWh, an improved system that reduced power consumption by P kWh leads to an energy cost savings 0.16*P dollars.

Screens used in vibratory screening machines gradually degrade and wear out over time. As such, there is an operation cost associated with screen degradation. As mentioned above with reference to Table 5, various operating parameters, such as size of screen apertures and screen angle, affect a rate at which screen panels degrade. In this regard, operating parameters may be adjusted or optimized to prolong screen life and to thereby reduce costs associated with replacement of screens. Assuming a replacement cost of X dollars per screen panel, for example, an improved solids control system that reduced screen panel consumption S screen panels leads to a cost savings of X*S dollars.

Maintenance costs represent another parameter that may be reduced or optimized using an improved solids control system. For example, a conventional system may have maintenance costs that average approximately $1,000/ month. An improved system that reduces maintenance costs by M % leads to a monthly cost reduction of 10*M dollars.

Additional costs are typically associated with non-productive time (NPT). Many factors may lead to down time or NPT, such as mechanical failure and delays associated with processing of used drilling fluid to remove cuttings and other unwanted debris. An improved solids control system may make processing of drilling fluid more efficient leading to a reduction in NPT by N %. In an example drilling situation daily costs to operate a drilling rig may be on the order of $15,000/per day. As a conservative estimate, NPT may account for 20% of working hours per month. Assuming an average of 4,320 working hours per month, and an NPT reduction of N %, a monthly NPT savings of (15,000/24)*4320*(N/10)=27,000*N dollars may be obtained.

The above-described individual cost estimates may be combined into an overall cost metric that may be optimized by controlling the various system parameters listed above in Tables 1 to 4, based on the relationships shown in Tables 5 and 6. As described above, an improved solids control system may lead to: increased solids removal by R bbl, decreased retained liquid on cutting by O bbl, reduced power consumption by P kWh, reduced screen consumption by S screens, reduced maintenance costs by M %/month, and reduced NPT by N %/month. Thus, given these factors, for a job that takes one month, an overall cost savings (in dollars) may be given by the metric=600*R+60*O+20*O−20*R+0.16*P+X*S+10*M+900*N=580*R+80*O+0.16*P+X*S+10*M+27,000*N dollars. In other embodiments, various other metrics may be defined with different weighting factors assigned to the various costs.

In an example embodiment, various shaker parameters, such as the parameters listed in Table 1, may be adjusted to optimize the above-described cost metric. For example, proper selection of screen panel properties (e.g., screen aperture sizes), deck angle adjustment, and rate at which screen panels are replaced may influence various factors in the cost metric. For example, solids removal may be increased by R bbl, retained liquid on cutting may be decreased by O bbl, screen panel consumption by be reduced by S screens, maintenance costs may be reduced by M %/month, and NPT may be reduced by N %/month.

An improved solids control system may control the above parameters by measuring various parameters, such as parameters listed in Table 2, and controlling parameters, such as parameters listed in Table 1, based on relationships such as those listed in Table 5. For example, an improved solids control system may be configured to automatically measure a discard rate of drilling fluid. Such discarded fluid may be measured as a weight per time rate (e.g., in tons/hour). Properties of the discarded fluid may be measured, such as a percentage of solids in the discarded fluid. One or more sensing devices, such as a manual retort, may be used to determine a percentage of solids in the discarded fluid. Using a manual retort, for example, involves weighing a fluid containing solids, using the retort to boil off the liquid, and then weighing the remaining solids to determine a percentage of solids. Various other sensors may be used to perform a particle size analysis to determine a particle size distribution of solids in the discarded fluid.

Parameters for one or more centrifuges, such as parameters listed in Table 3, may also be adjusted to optimize an overall cost metric. Various parameters, such as bowl speed, differential conveyor/bowl speed, flow rate, weir settings, etc., may be adjusted to control various parameters (e.g., see measured parameters of Table 4). For example, solids removal may be increased by R bbl, retained liquid on cutting may be decreased by O bbl, maintenance costs may be reduced by M %/month, and NPT may be reduced by N %/month. In the centrifuge context, as with the above shaker example, an improved solids control system may be configured to automatically measure a discard rate of drilling fluid. Such discarded fluid may be measured as a weight per time rate (e.g., in tons/hour). Properties of the discarded fluid may be measured, such as a percentage of solids in the discarded fluid.

FIG. 5 is a matrix 500 of measured properties in relation to various cost metrics, according to an example embodiment. Rows of the matrix shown in FIG. 5 correspond to various cost metrics including dilution cost savings 502, disposal cost savings 504, energy cost savings 506, maintenance cost savings 508, and NPT cost savings 510. The columns of matrix 500 correspond to various measured properties including a discard rate 512, a percentage of discarded solids 514, a screen utilization 516, a volume percentage of LGS 518, a volume percentage of HGS 520, a volume percentage of brine 522, a particle size distribution 524, and a power consumption 526.

In certain embodiments, various parameters may be automatically measured or may be measured manually. For example, in development of a new system, it may be advantageous to use a combination of automated and manual measurements for benchmarking and testing. As mentioned above, using a manual retort to determine volume density of various components of a fluid, for example, involves weighing a fluid containing solids, using the retort to boil off the liquid, and then weighing the remaining solids to determine a percentage of solids. Alternatively, density and flow measurements may be performed automatically using various density and flow meters that are commercially available.

FIG. 6 is a matrix 600 of measured properties in relation to various cost metrics, according to an example embodiment. Matrix 600 is similar to matrix 500 with the same cost metrics labelling the rows and same measured properties labelling the columns. Matrix 600, however, refers to an alternative embodiment in which more of the measurements are automated, such as the measurement of percentage of discarded solids 514, screen utilization 516, and volume percentages of LGS 518 and HGS 520. The embodiment of FIG. 6 may represent a prototype system that is intermediate between a system that is mostly operated manually, such as the embodiment of FIG. 5, and a fully automated system.

FIG. 7 is a matrix 700 of external input data in relation to various cost metrics, according to an example embodiment. The rows correspond to cost metrics including dilution cost savings 502, disposal cost savings 504, energy cost savings 506, maintenance cost savings 508, and NPT cost savings 510. Matrix 700 includes a further row corresponding to projected value added. The columns of matrix 700 correspond to various pieces of external input data related to determining cost metrics. This data includes mud cost 704, disposal cost 706, generator fuel cost 708, a daily rate 710, barite cost 712, screen panel cost 714, centrifuge maintenance cost 716, oil well hole size 718, well depth 720, starting salinity of drilling mud 722, rig circulating rate 724, maintaining ECD 726, and active system volume 728.

Figure 8:
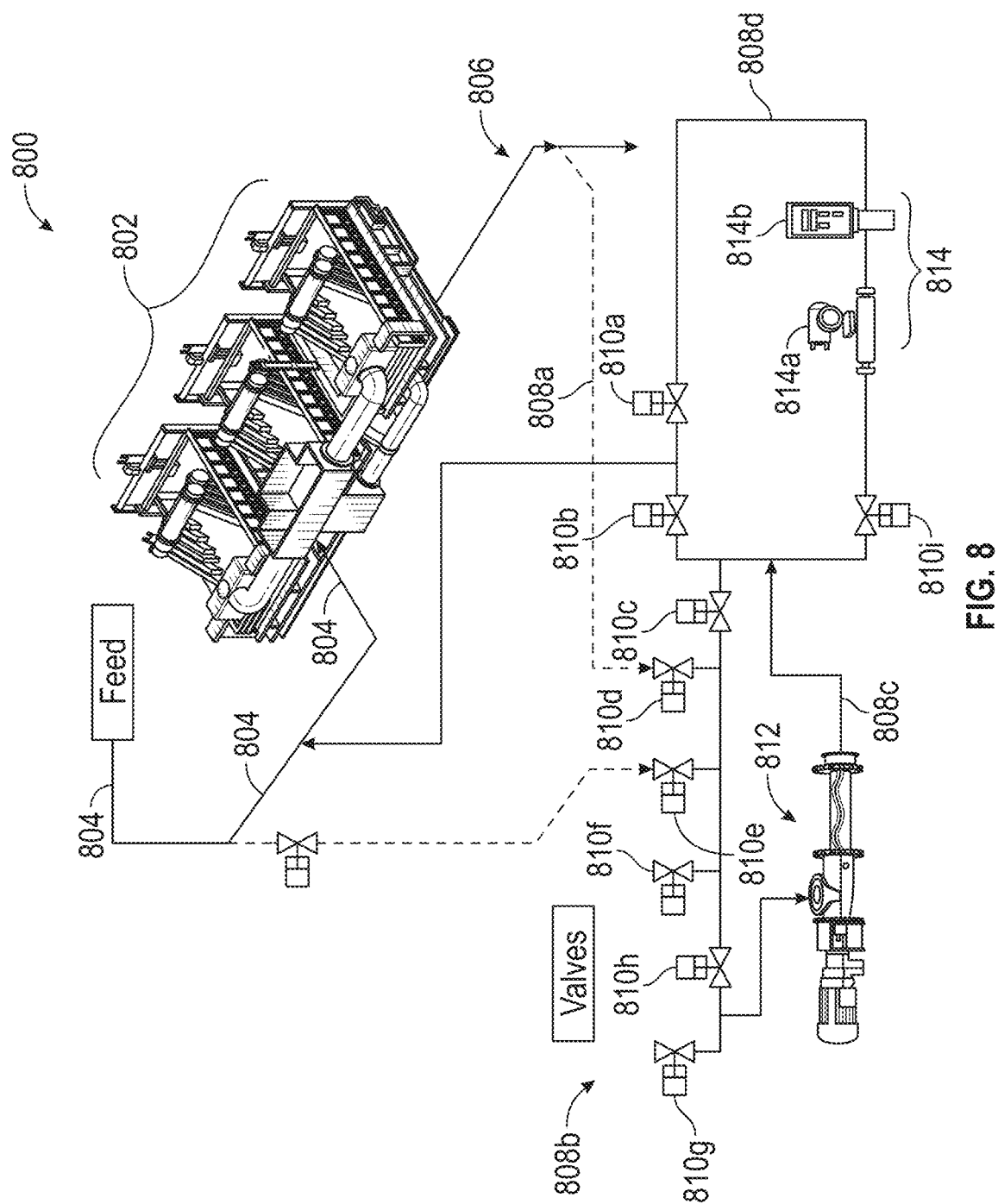
FIG. 8 illustrates a sub-system for measuring fluid effluent of a vibratory shaker component of a solids control system, according to an example embodiment.

FIG. 8 illustrates a sub-system 800 for measuring fluid effluent of a vibratory shaker component of a solids control system, according to an example embodiment. In this example, one or more vibratory shaker machines 802 may receive drilling fluid along a feed path 804. Vibratory shaker machines 802 may separate the drilling fluid into solids and an effluent. The effluent may be removed from vibratory shaker machines 802 along an effluent path 806 and may be processed through various fluidic paths 808a, 808b, 808c, and 808d. Fluidic paths 808a, 808b, 808c, and 808d may have various valves 810a to 810i, one or more pumps 812, and one or more analytic instruments 814. Analytic instruments 814 may include one or more flow/density/viscosity meters 814a and one or more drilling fluid analyzers 814b. Analytic instruments may be used to manually or automatically perform measurements of shaker effluent properties. Effluent properties may include mass and/or volume flow rates, and mass and/or volume percentages of LGS, HGS, water, brine, oil, etc. In an example embodiment, flow/density/viscosity meter 814a may be a Coriolis meter that measures flow rate, density, and viscosity. Further, drilling fluid analyzer 814b may be a Salunda MudChecker™ that measures percentages of oil, water, and solids (e.g., % HGS, % LGS, etc.). Analytical instruments may further include a particle size analysis sensor (e.g., a sensor based on Focus Beam Reflectance Measurements (FBMR)) and/or an optical based turbidity sensor.

Figure 9:
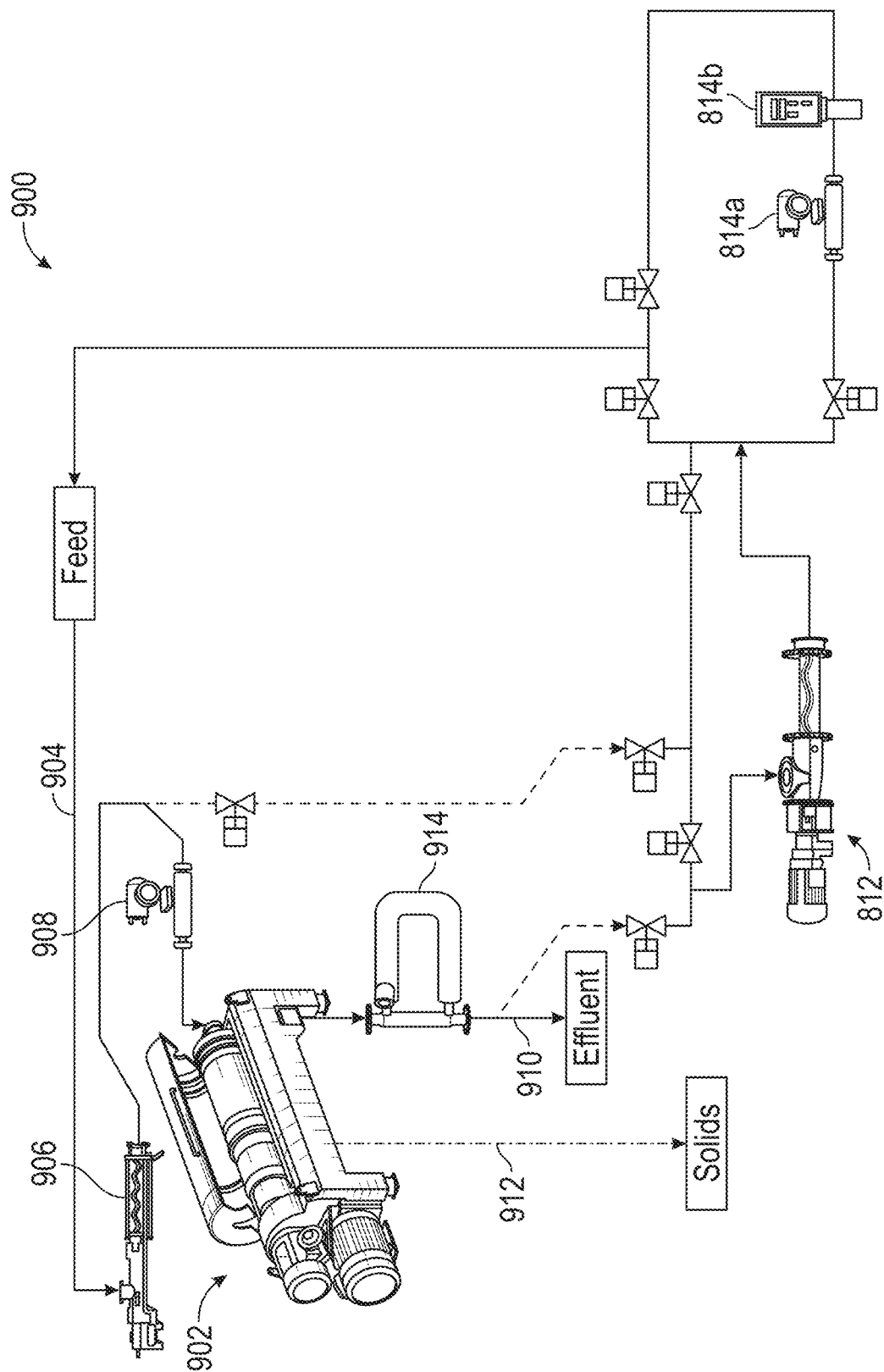
FIG. 9 illustrates a sub-system for measuring fluid effluent of a centrifuge component of a solids control system, according to an example embodiment.

FIG. 9 illustrates a sub-system 900 for measuring fluid effluent of a centrifuge component of a solids control system, according to an example embodiment. Fluid effluent generated by the above-described shaker sub-system 800 may be provided to a centrifuge 902 along one or more fluidic pathways 904. Fluidic pathways 904 may include one or more pumps 906. One or more flow meters 908 may measure the flow rate of material pumped into centrifuge 902. Centrifuge 902 may further separate the effluent provided from shaker sub-system 800 into a centrifuge effluent 910 and separated solids 912. A flow rate of the centrifuge effluent 910 may be measured by one or more flow meters 914. The centrifuge effluent may be routed through various fluidic pathways that may be combined with fluidic pathways associated with shaker sub-system 800. In this way, centrifuge effluent may be recycled in various ways including mixing the centrifuge effluent with the shaker effluent, etc.

Figure 10:
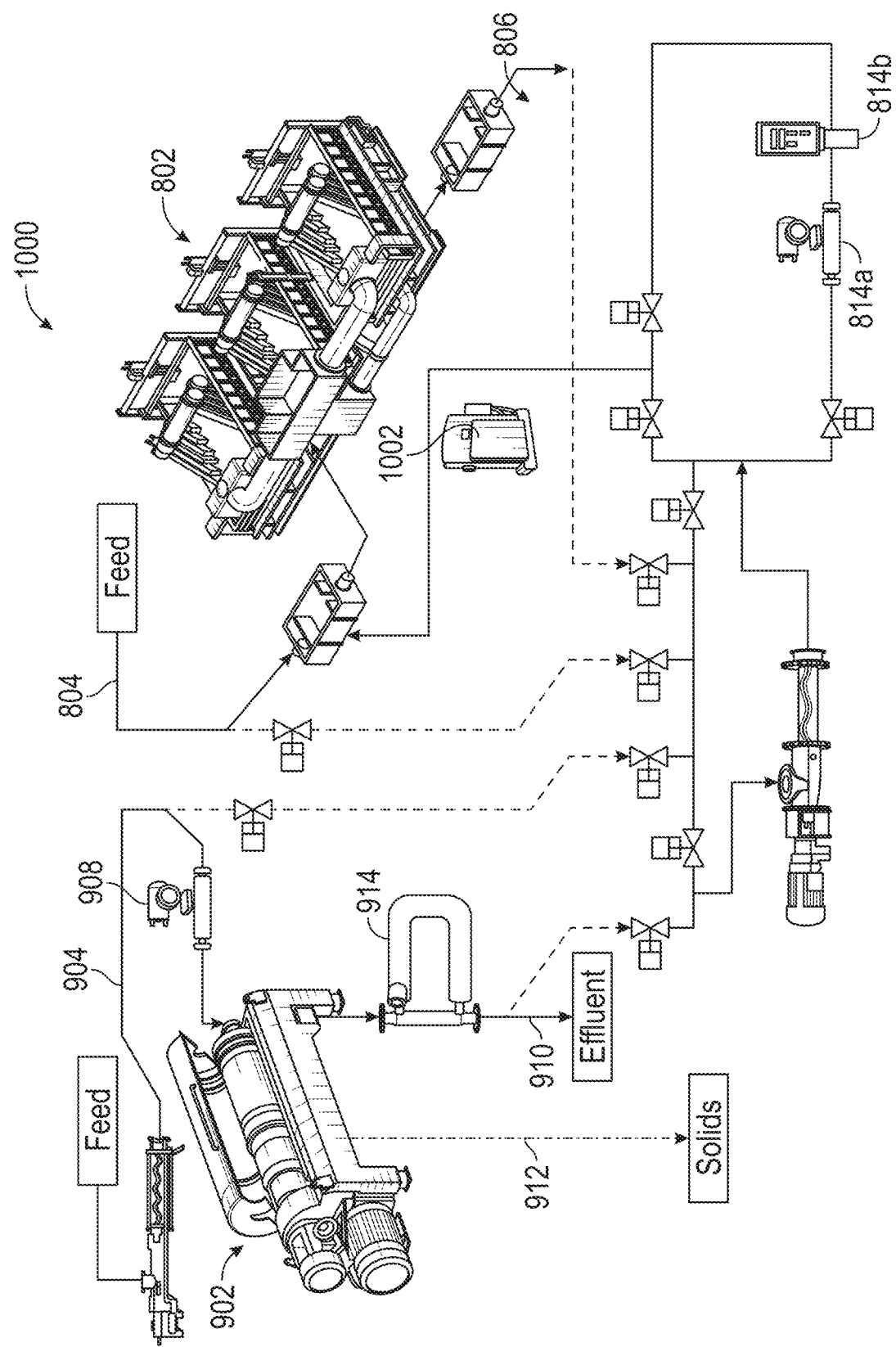
FIG. 10 illustrates a combined sub-system including the sub-systems shown in FIGS. 8 and 9, according to an example embodiment.

FIG. 10 illustrates a combined sub-system 1000 including subsystems shown in FIGS. 8 and 9, according to an example embodiment. System 1000 represents an integrated sub-system for processing effluent through the shaker sub-system 800 and the centrifuge sub-system 900 including analytical instruments 814a, 814b, 908, and 914.

Figure 11:
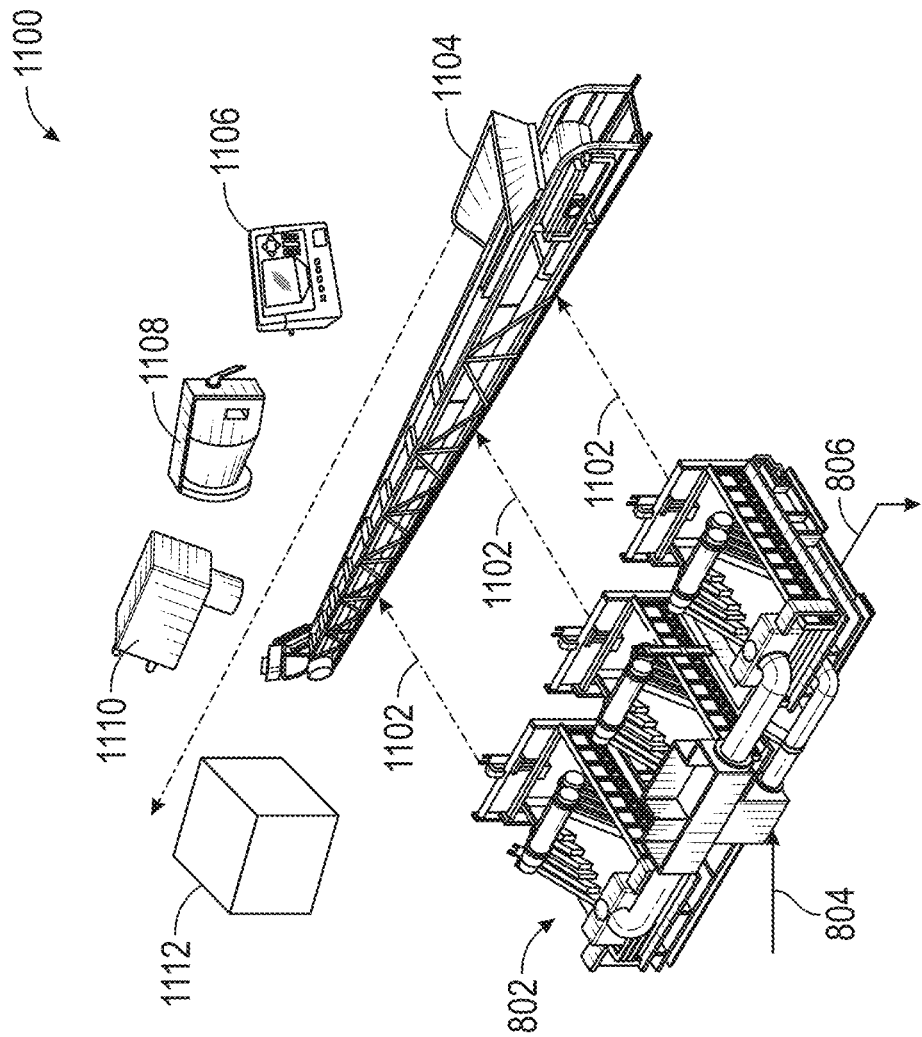
FIG. 11 illustrates a sub-system for measuring solids removed from a shaker component of a solids control system, according to an example embodiment.

FIG. 11 illustrates a sub-system 1100 for measuring solids removed from a shaker component of a solids control system, according to an example embodiment. In this example, one or more vibratory shaker machines 802 receive drilling fluid along pathway 804 and effluent is removed along fluid pathway 806, as described in greater detail above. Solids that are removed by shaker 802 are removed along a solids removal pathway 1102. Removed solids may then be fed to a conveyor 1104 for further processing.

Removed solids may be analyzed by performing various measurements, for example, by weighing the removed solids with a scale 1106, by performing spectroscopy measurements and volumetric calculations on removed solids using laser 1108 and/or near-infrared (NIR) 1110 sources, etc., to determine a discard rate. Removed solids may then be dried using one or more ovens 1112. Dried removed solids may then be weighed to determine a weight of the dried removed solids. Comparison with weight of the removed solids before drying allows a determination of the amount of retained fluid on the removed solids.

Figure 12:
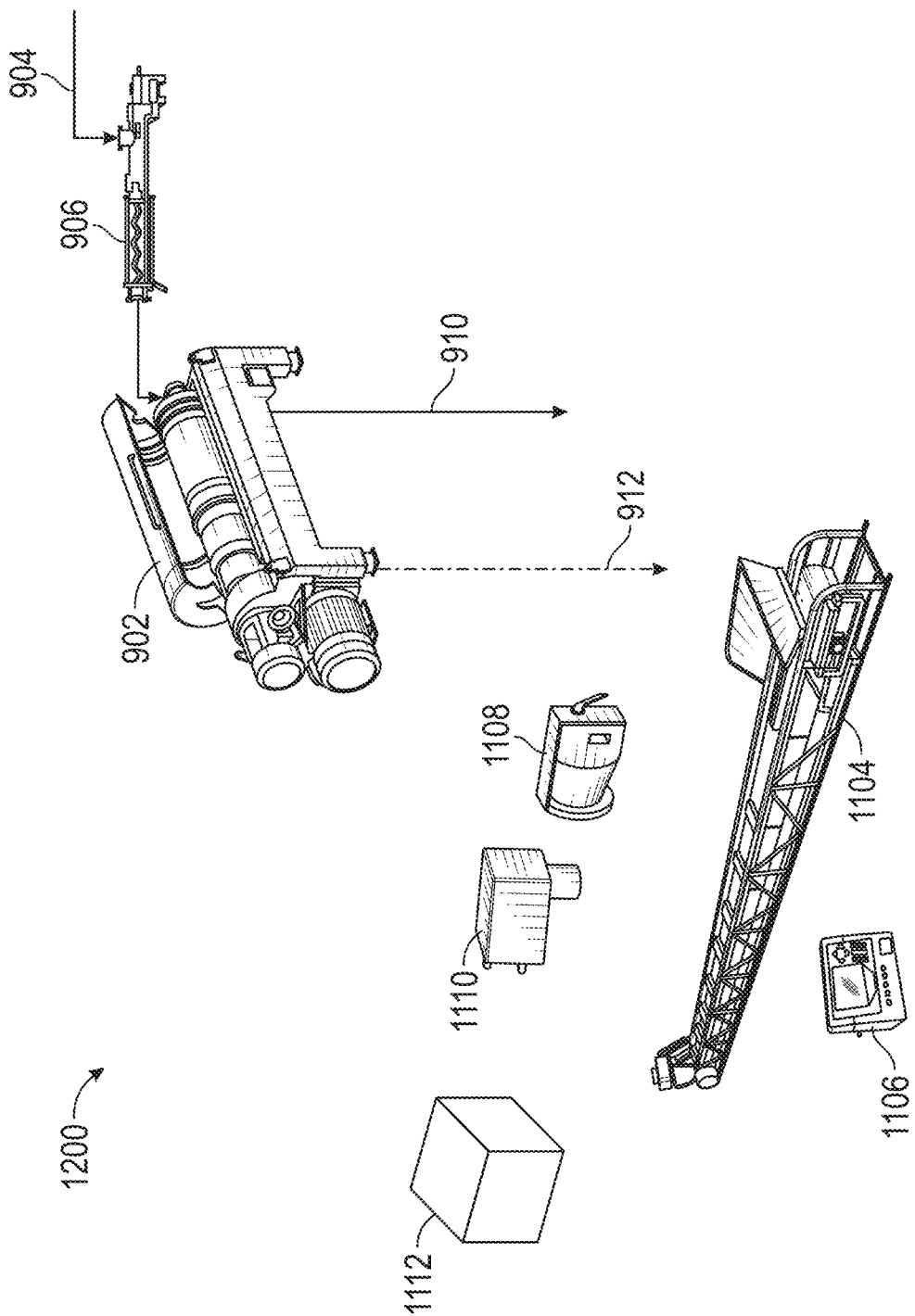
FIG. 12 illustrates a sub-system for measuring solids removed from a centrifuge component of a solids control system, according to an example embodiment.

FIG. 12 illustrates a sub-system 1200 for measuring solids removed from a centrifuge component of a solids control system, according to an example embodiment. As described above, effluent received by the shaker sub-system 800 may be fed to the centrifuge 902 along a fluidic pathway 904 using one or more pumps 906. Centrifuge effluent may be removed along fluidic pathway 910 and processed as described above with reference to FIG. 9. Solids removed by centrifuge 902 may be removed along pathway 912 and may be processed like solids removed by the shaker sub-system 1100. In this way, removed solids may then be fed to a conveyor 1104 for further processing. Removed solids may be analyzed by performing various measurements, for example, by weighing the removed solids with a scale 1106, by performing spectroscopy measurements on removed solids using laser 1108 and/or near-infrared (NIR) 1110 sources, etc., as described above.

Figure 13:
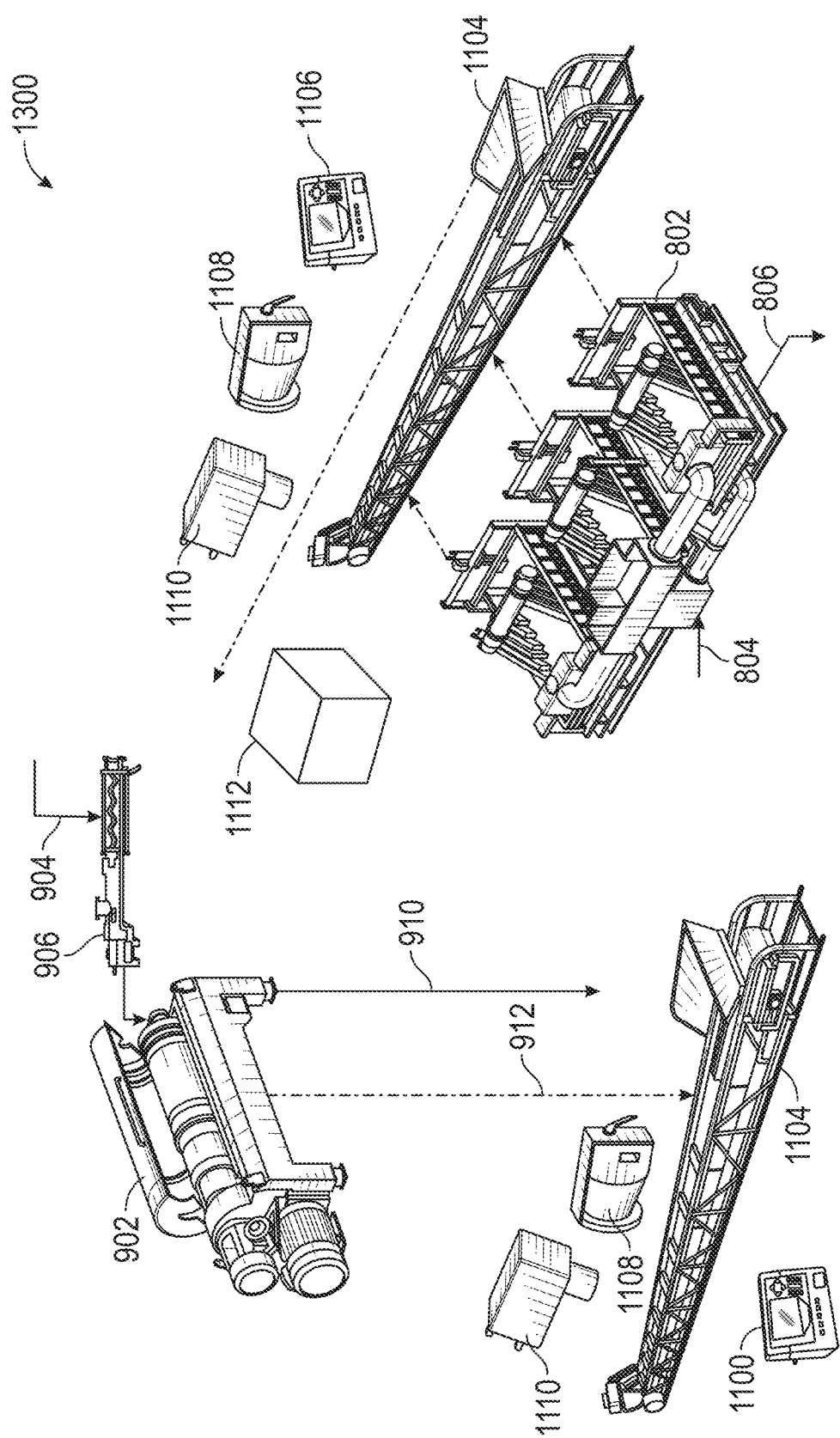
FIG. 13 illustrates a combined sub-system including the subsystems shown in FIGS. 11 and 12, according to an example embodiment.

FIG. 13 illustrates a combined sub-system 1300 including the subsystems shown in FIGS. 11 and 12, according to an example embodiment. System 1300 represents an integrated sub-system for processing solids through the shaker sub-system 800 and the centrifuge sub-system 900 including conveyors 1104, scales 1106, laser sources 1108, NIR sources 1110, ovens 1112, etc.

Figure 14:
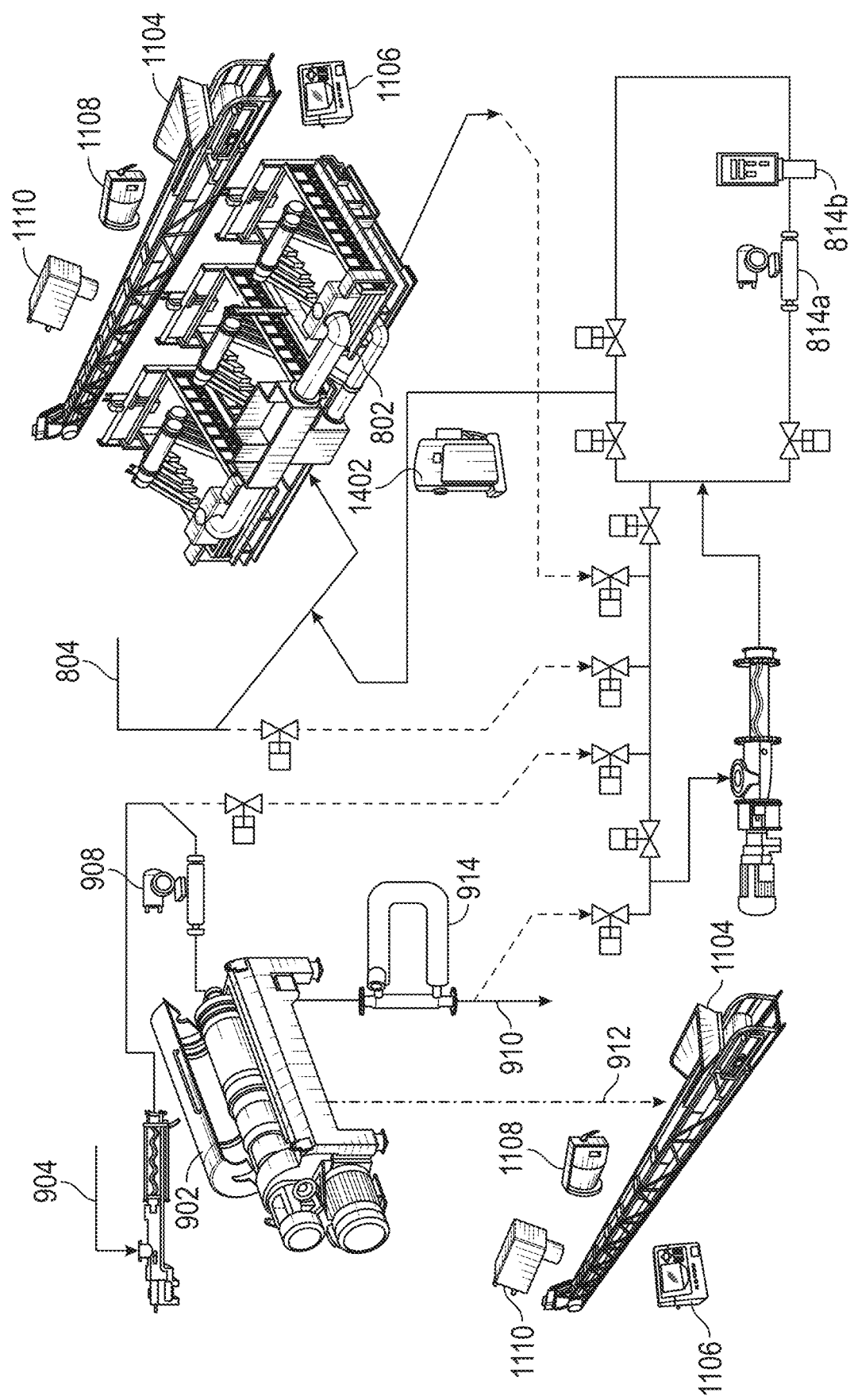
FIG. 14 illustrates a complete solids control system, according to an example embodiment.

FIG. 14 illustrates a complete solids control system 1400, according to an example embodiment. System 1400 is an integrated solids control system that includes one or more vibratory shaker systems 802, one or more centrifuges 902, effluent processing sub-systems, 1000 and 1100, as well as removed solids processing sub-systems 1200 and 1300. System 1400 includes various analytical instruments 814a, 814b, 908, and 904 that may be configured to perform flow and density measurements on various fluid components, as well as other solids processing measurement apparatus, as described in greater detail with reference to FIGS. 11 and 12, above. System 1400 may further include one or more controllers 1402 and/or computing systems or processing circuits. Such controllers and/or computers and/or processing circuits may receive information from sensors and may generate control signals to control various parameters describe above with reference to Tables 1 to 4, based on the relationships described above with reference to Tables 5 and 6. A control system 1402 may be implemented using hardware, firmware, or software using system components such as described below with reference to FIG. 16.

Figure 15:
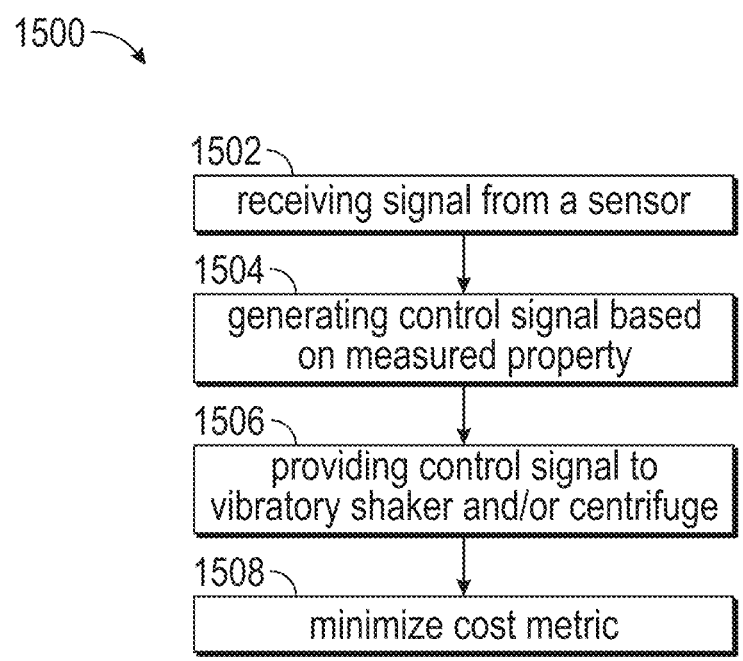
FIG. 15 is a flowchart illustrating a processor implemented method, according to an example embodiment.

FIG. 15 is a flowchart 1500 illustrating a processor implemented method, according to an example embodiment. In this method, the processor controls a solid-liquid separation system that includes a vibratory shaker, a centrifuge, and a sensor. The shaker is configured to separate a solid-liquid mixture into a first solids-containing component and a shaker effluent, and the centrifuge is configured to separate the shaker effluent into a second solids-containing component and a centrifuge effluent. In a first stage 1502, the method includes receiving a signal from a sensor that is configured to measure a property of one or more of the first solids-containing component, the shaker effluent, the second solids-containing component, and the centrifuge effluent. In stage 1504, the method includes generating a control signal based on the measured property, and in stage 1506, the method includes providing the control signal to the vibratory shaker and/or to the centrifuge to thereby cause a change in an operational parameter of the vibratory shaker and/or the centrifuge. In a further stage 1508, the processor may be configured to control the system to minimize a cost metric. The cost metric may depend on one or more of a dilution cost, a disposal cost, an energy cost, a screen-replacement cost, a maintenance cost, and a NPT cost. Various other cost metrics may be defined in other embodiments.

Figure 16:
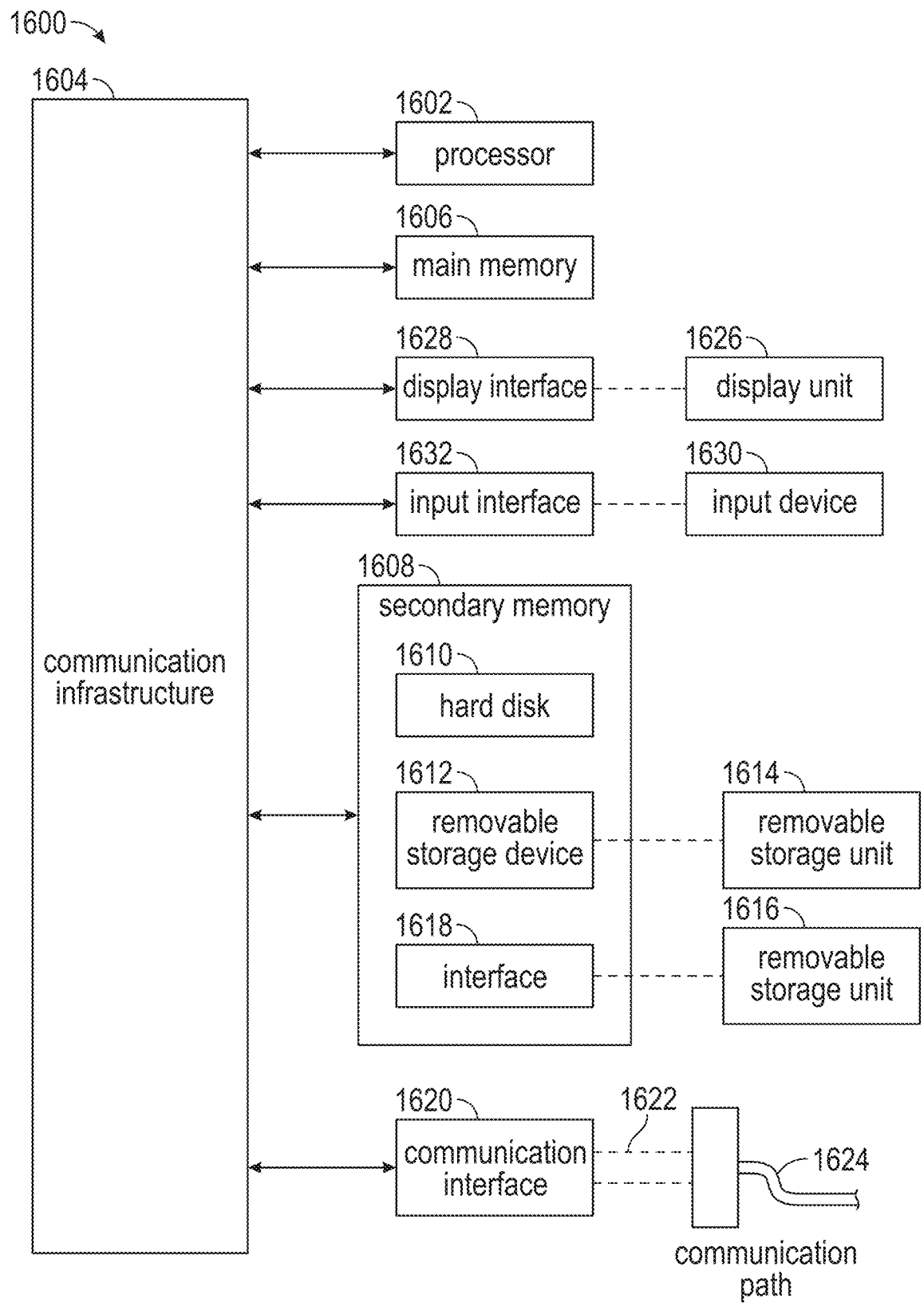
FIG. 16 is a block diagram of an example computer system, in which disclosed embodiments may be implemented, according to an embodiment.

FIG. 16 is a block diagram of an example computer system 1600 in which disclosed embodiments of, or portions thereof, may be implemented as computer-readable code (i.e., machine-readable computer program instructions), which is executed by one or more processors causing the one or more processors to perform operations of the disclosed embodiments, according to an embodiment.

Disclosed systems may include components implemented on computer system 1600 using hardware, software, firmware, tangible computer-readable (i.e., machine-readable) media having computer program instructions stored thereon, or a combination thereof, and may be implemented in one or more computer systems or other processing system.

If programmable logic is used, such logic may be executed on a commercially available processing platform or a on a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various disclosed embodiments are described in terms of this example computer system 1600. After reading this description, persons of ordinary skill in the relevant art will know how to implement disclosed embodiments using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Computer or processor circuit 330, described above with reference to FIG. 3, is an example of computer system 1600, described in greater detail below. Computer or processor circuit 330 may be configured to gather measurement data and to provide control signals to the various components of the system. For example, computer processor circuit 330 may include a personal computer (PC) and/or a programmable logic controller (PLC). The computer processor circuit 330 may receive measurement data from the one or more flow/density/viscosity meters 814*a*, 908, one or more drilling fluid analyzers 814*b* (e.g., see FIGS. 8 and 9), turbidity sensors, temperature sensors, viscosity sensors, particle count sensors, etc. Computer or processor circuit 330 may control laser 1108 and/or NIR 1110 sources (e.g., see FIG. 11) and may further receive measurement data from corresponding laser and/or NIR sensors (not shown). Computer or processor circuit 330 may further receive data from, and provide control signals, to VFD systems 331, 332, and 334 (e.g., see FIG. 3) that, in turn, control bowl drive motor 319, screw conveyor drive motor 321, pump drive motor 335, etc. Computer or processor circuit 330 may also control various valves 810*a* to 810*i* (e.g., see FIG. 8), scale 1106, and oven 1112 (e.g., see FIG. 11).

As persons of ordinary skill in the relevant art will understand, a computing device (e.g., computer or processor circuit 330) for implementing disclosed embodiments has at least one processor, such as processor 1602, wherein the processor may be a single processor, a plurality of processors, a processor in a multi-core/multiprocessor system, such system operating alone, or in a cluster of computing devices operating in a cluster or server farm. Processor 1602 may be connected to a communication infrastructure 1604, for example, a bus, message queue, network, or multi-core message-passing scheme.

Computer system 1600 may also include a main memory 1606, for example, random access memory (RAM), and may also include a secondary memory 1608. Secondary memory 1608 may include, for example, a hard disk drive 1610, removable storage drive 1612. Removable storage drive 1612 may include a floppy disk drive, a magnetic tape drive, an optical disk drive, a flash memory, or the like. The removable storage drive 1612 may be configured to read and/or write data to a removable storage unit 1614 in a well-known manner. Removable storage unit 1614 may include a floppy disk, magnetic tape, optical disk, etc., which is read by and written to, by removable storage drive 1612. As will be appreciated by persons of ordinary skill in the relevant art, removable storage unit 1614 may include a computer readable storage medium having computer software (i.e., computer program instructions) and/or data stored thereon.

In alternative implementations, secondary memory 1608 may include other similar devices for allowing computer programs or other instructions to be loaded into computer system 1600. Such devices may include, for example, a removable storage unit 1616 and an interface 1618. Examples of such devices may include a program cartridge and cartridge interface (such as that found in video game devices), a removable memory chip (such as EPROM or PROM) and associated socket, and other removable storage units 1616 and interfaces 1618 which allow software and data to be transferred from the removable storage unit 1616 to computer system 1600.

Computer system 1600 may also include a communications interface 1620. Communications interface 1620 allows software and data to be transferred between computer system 1600 and external devices. Communications interfaces 1620 may include a modem, a network interface (such as an Ethernet card), a communications port, a PCMCIA slot and card, or the like. Software and data transferred via communications interface 1620 may be in the form of signals 1622, which may be electronic, electromagnetic, optical, or other signals capable of being received by communications interface 1620. These signals may be provided to communications interface 1620 via a communications path 1624.

In this document, the terms "computer program storage medium" and "computer usable storage medium" are used to generally refer to storage media such as removable storage unit 1614, removable storage unit 1616, and a hard disk installed in hard disk drive 1610. Computer program storage medium and computer usable storage medium may also refer to memories, such as main memory 1606 and secondary memory 1608, which may be semiconductor memories (e.g., DRAMS, etc.). Computer system 1600 may further include a display unit 1626 that interacts with communication infrastructure 1604 via a display interface 1628. Computer system 1600 may further include a user input device 1630 that interacts with communication infrastructure 1604 via an input interface 1632. A user input device 1630 may include a mouse, trackball, touch screen, or the like.

Computer programs (also called computer control logic or computer program instructions) are stored in main memory 1606 and/or secondary memory 1608. Computer programs may also be received via communications interface 1620. Such computer programs, when executed, enable computer system 1600 to implement embodiments as discussed herein. In particular, the computer programs, when executed, enable processor 1602 to implement the processes of disclosed embodiments, such various stages in disclosed methods, as described in greater detail above. Accordingly, such computer programs represent controllers of the computer system 1600. When an embodiment is implemented using software, the software may be stored in a computer program product and loaded into computer system 1600 using removable storage drive 1612, interface 1618, and hard disk drive 1610, or communications interface 1620. A computer program product may include any suitable non-transitory machine-readable (i.e., computer-readable) storage device having computer program instructions stored thereon.

Embodiments may be implemented using software, hardware, and/or operating system implementations other than those described herein. Any software, hardware, and operating system implementations suitable for performing the functions described herein may be utilized. Embodiments are applicable to both a client and to a server or a combination of both.

Figure 17:
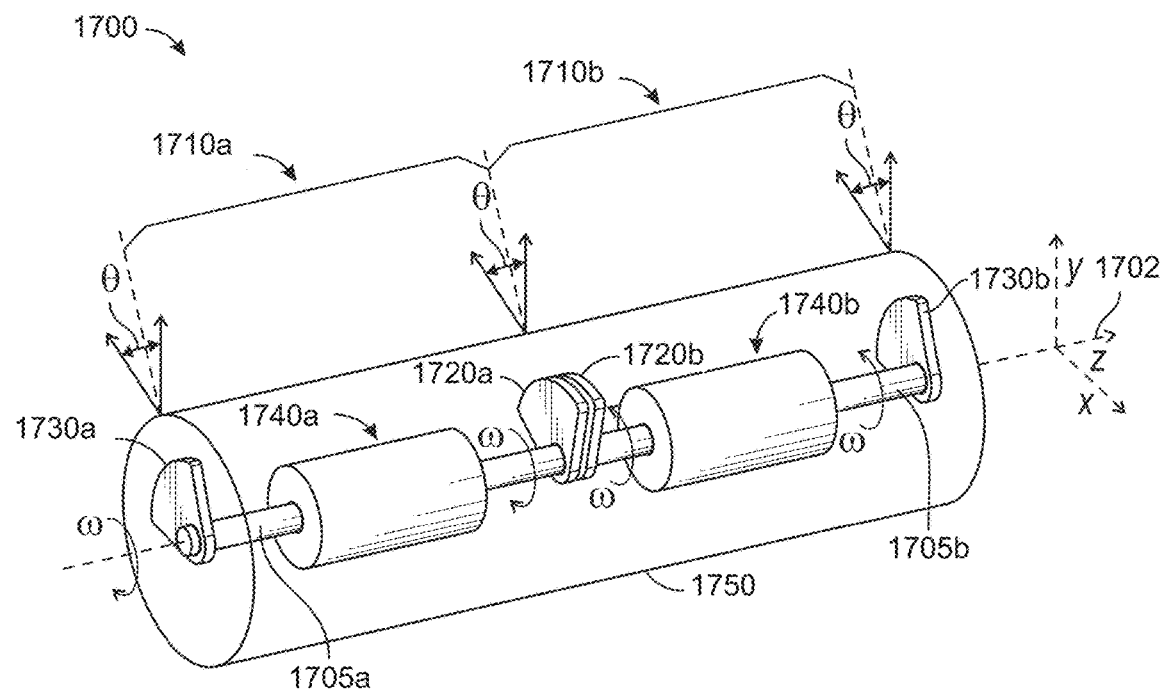
FIG. 17 is a transparent perspective view of an eccentric vibrator apparatus, according to an example embodiment.

FIG. 17 is a transparent perspective view of an eccentric vibrator apparatus 1700, according to an example embodiment. Eccentric vibrator apparatus 1700 includes a housing assembly 1750 that may have an elongated shape defining an axis 1702 (e.g., labeled with a "z" in FIG. 17). Eccentric vibrator apparatus 1700 may also include a first motor assembly 1710a and a second motor assembly 1710b, each disposed within housing assembly 1750. In some embodiments, first motor assembly 1710a may include a first shaft 1705a oriented substantially along axis 1702, a first mass member 1720a mounted eccentrically on first shaft 1705a, and a first counterbalance mass member 1730a mounted eccentrically on first shaft 1705a.

Figure 18:
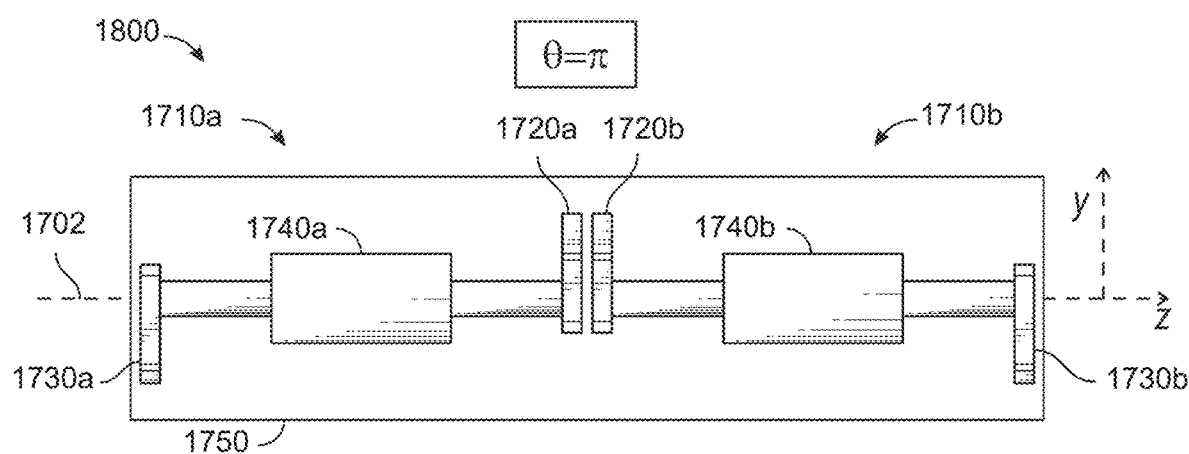
FIG. 18 is a transparent side view of an eccentric vibrator apparatus, according to an example embodiment.

As shown in FIG. 17, first mass member 1720a may be attached proximate to a first end of the first shaft 1705a. First counterbalance mass member 1730a may be attached proximate to a second end of first shaft 1705a. The first mass member 1720a and the first counterbalance mass member 1730a may each include a plurality of members. In an embodiment, a first member of the first mass member 1720a and a first member of the first counterbalance mass member 1730a may be configured to be substantially in parallel and may be assembled at a defined angle around a circumference of the first shaft 1705a relative to one another. In one example, the defined angle may be approximately 180 degrees (e.g., as shown in FIG. 18 and described in greater detail below).

Second motor assembly 1710b may include a corresponding second shaft 1705b oriented substantially along axis 1702, a second mass member 1720b mounted eccentrically on second shaft 1705b, and a second counterbalance mass member 1730b mounted eccentrically on second shaft 1705b. Second mass member 1720b may be attached proximate to a first end of second shaft 1705b, where the first end of the second shaft 1705b is adjacent to the first end of first shaft 1705a. Second counterbalance mass member 1730b may be attached proximate to a second end of the second shaft 1705b, opposite the first end of second shaft 1705b. The second mass member 1720b and the second counterbalance mass member 1730b may each include a plurality of members. A first member of the second mass member 1720b and a first member of the second counterbalance mass member 1730b may be configured to be substantially in parallel and may be assembled at a defined angle around a circumference of the second shaft 1705b relative to one another. In an example, the defined angle may be approximately 180 degrees (e.g., as shown in FIG. 18 and described in greater detail below).

The first mass member 1720a and the second mass member 1720b may each have a first net mass. Likewise, the first counterbalance mass member 1730a and the second counterbalance mass member 1730b may each have a second net mass. Various combinations of the first net mass and the second net mass may be chosen, with the magnitude of the second net mass depending on the magnitude of the first net mass, as explained in more detail below. For example, the first net mass may be about 24.0 kg, while the second net mass may be about 3.0 kg. In some embodiments, each member of the first mass member 1720a may have a substantially circular sector shape having a radius of about 14.0 cm. Similarly, each member of the second mass member 1720b may have a substantially circular sector shape having a radius of about 14.0 cm. Further, each member of the first counterbalance mass member 1730a may have a substantially circular sector shape having a radius of about 9.4 cm. Similarly, each member of the second counterbalance mass member 1730b may also have a substantially circular sector shape having a radius of about 9.4 cm. Other embodiments may include mass members having other shapes, dimensions, and masses.

Eccentric vibrator apparatus 1700 may generate a substantially sinusoidal force with an adjustable magnitude and orientation along a direction substantially perpendicular to axis 1702 (e.g., in the x-y plane). In this regard, first shaft 1705a is configured to rotate about axis 1702 in a first direction at an angular frequency ω (a real number in units of rad/s), and second shaft 1705b is configured to rotate about axis 1702 at the angular frequency ω, in a second direction. In certain embodiments the second direction may be opposite the first direction, while in other embodiments, the first and second directions may be the same. The angular frequency ω may have a magnitude of up to about 377 rad/s. Rotation in the first direction causes first mass member 1720a to produce a first radial force $F_a$ that is substantially perpendicular to a trajectory of circular motion (i.e., perpendicular to the velocity) of first mass member 1720a (as described in greater detail below with reference to FIGS. 24 to 27). Similarly, rotation in the second direction causes second mass member 1720b to produce a second radial force $F_b$ that is substantially perpendicular to a trajectory (i.e., perpendicular to the velocity) of circular motion of second mass member 1720b. Rotation of first shaft 1705a and second shaft 1705b about axis 1702 may yield a resultant force that is substantially contained within a plane perpendicular to the axis 1702 (e.g., in the x-y plane). A linearly oscillating force may be generated when first 1705a and second 1705b shafts are counter-rotating. Alternatively, a force corresponding to circular or elliptical motion may be generated when first 1705a and second 1705b shafts are co-rotating, as described in greater detail below.

A magnitude of the first force $F_a$ may be determined, in part, by the angular frequency ω and the moment of inertia of first mass member 1720a. Further, the magnitude of the second force $F_b$ may be determined, in part, by the angular frequency ω and the moment of inertia of second mass member 1720b. Each member of the first mass member 1720a may have a different mass or may share a common first mass, and each member of the second mass member 1720b may have a different mass or may share a common second mass. In an embodiment, the first and second masses may be approximately equal. In this case, force $F_a$ would have a similar magnitude to force $F_b$, irrespective of respective angular positions of first and second mass members. Counter rotation of the first shaft 1705a and second shaft 1705b at angular frequency ω may yield a resultant force $F=F_a+F_b$ that is maximal at an angular position in which a tangential velocity of first mass member 1720a and a tangential velocity of second mass member 1720b are substantially collinear and oriented in the same direction. Further, the resultant force F may vanish at an angular position in which the tangential velocity of first mass member 1720a and the tangential velocity of second mass member 1720b are substantially collinear and oriented in substantially opposite directions. In an embodiment, the amplitude of the time-dependent resultant force F may have a value of about 89000 N for an angular frequency ω of about 183 rad/s.

In some embodiments, mass members in first mass member 1720a may be embodied as respective first slabs disposed substantially perpendicularly to axis 1702. Each of these first slabs may be elongated and assembled to be substantially parallel to one another. Further, each of these first slabs may be mounted eccentrically on the first shaft 1705a. Similarly, mass members in second mass member 1720b may also be embodied as respective second slabs, also disposed substantially perpendicularly to axis 1702. Each of the second slabs may also be elongated and assembled to be substantially parallel to one another. In addition, the second slabs may be mounted eccentrically on second shaft 1705b.

The first slabs may each have a defined first mass and a defined first size, and the second slabs may also collectively share the defined first mass and the defined first size. Accordingly, the magnitude of the force $F_a$ and the magnitude of the force $F_b$ may be essentially equal irrespective of the respective angular positions of the first slabs and the second slabs. As mentioned, the counter rotation of first shaft 1705a and second shaft 1705b at angular frequency ω may yield a resultant force $F=F_a+F_b$ that is maximal at an angular position in which the tangential velocity of the first slabs and the tangential velocity of the second slabs are substantially collinear and oriented in the same directions. Likewise, the resultant force F may be substantially zero (or otherwise negligible) at an angular position in which the tangential velocity of the first slabs and the tangential velocity of the second slabs are substantially collinear and oriented in substantially opposite directions.

In some embodiments, as shown in FIG. 17, first mass member 1720a is assembled in proximity to and spatially separated along axis 1702 from second mass member 1720b. At an angular position in which the tangential velocity of first mass member 1720a and the tangential velocity of second mass member 1720b are substantially collinear and oriented in substantially opposite directions, forces $F_a$ and $F_b$ described herein may not cancel one another completely due to imperfect alignment between first mass member 1720a and second mass member 1720b, as described in more detail below.

Incomplete cancellation of the forces may result in residual net forces that are oriented along a direction that is transverse to the longitudinal axis 1702. For example, the residual net forces may be oriented along the x direction of the Cartesian coordinate system shown in FIG. 17. The spatial offset between mass members 1720a and 1720b and the residual net forces form a couple, which may distort the linear vibration generated by the eccentric vibrator apparatus 1700. In order to remove or reduce such a couple, first counterbalance mass member 1730a and second counterbalance mass member 1730b are added to eccentric vibrator apparatus 1700, as described above. As illustrated in FIGS. 17 and 18, for example, first counterbalance mass member 1730a and second counterbalance mass member 1730b also are offset relative to one another, along the longitudinal axis 1702. Therefore, due to this spatial offset, counterbalance mass members 1730a and 1730b also generate an additional couple as a result of incomplete cancellation of forces generated by these mass members. By aligning counterbalance mass members 1730a and 1730b in a transverse direction opposite the transverse direction along which mass members 1720a and 1720b are oriented, as shown in FIG. 18, for example, the couple resulting from the counter rotation of the counterbalance mass members 1730a and 1730b may cancel the couple generated by the mass members 1720a and 1720b.

In some embodiments, mass members in first counterbalance mass member 1730a may share a common first mass, and mass members in second counterbalance mass member 1730b may share a common second mass. A magnitude of masses 1730a and 1730b may therefore be essentially equal. The magnitude of the first and second masses of counterbalancing mass members 1730a and 1730b may be configured to be less than the net mass of mass members 1720a and 1720b, due to differences in spatial offsets, as needed to cancel unwanted residual couple from interaction of mass members 1720a and 1720b.

As illustrated in FIG. 17, first mass member 1720a and first counterbalance mass member 1730a may be assembled to have an offset relative angular alignment. In addition, second mass member 1720b and second counterbalance mass member 1730b may also be assembled to have the same relative alignment offset. The relative alignment offset may be indicated by an angle θ (a real number in suitable units, such as radians or degrees) between a line representative of the orientation of first mass member 1720a and another line representative of the orientation of first counterbalance mass member 1730a.

In an embodiment in which θ is essentially equal to π (or 180 degrees), As illustrated in FIG. 18, for example, the resultant force F, due to masses 1720a and 1720b, may be oriented substantially opposite to the resultant force F' due to masses 1730a and 1730b. As such, a net residual couple force is essentially zero when masses 1720a and 1720b are not aligned. Thus, first counterbalance mass member 1730a and/or second counterbalance mass member 1730b may be utilized to maintain linearity of the vibrational motion produced by the eccentric vibrator apparatus 1700 when shafts 1705a and 1705b are counter rotating, as described in greater detail below with reference to FIGS. 24 to 27.

With further reference to FIG. 17, eccentric vibrator apparatus 1700 includes a first rotor mechanism 1740a that generates rotation of the first shaft 1705a. Vibrator apparatus 1700 also includes a second rotor mechanism 1740b that generates rotation of second shaft 1705b. In some embodiments, first rotor mechanism 1740a may include a first rotor assembly (not shown) mechanically coupled to first shaft 1705a, and a first stator assembly (not shown) electromagnetically coupled to the first rotor assembly. First rotor mechanism 1740a may also include a first bearing assembly (not shown) mechanically coupled to first shaft 1705a near first mass member 1720a, and may further include a second bearing assembly (not shown) mechanically coupled to first shaft 1705a near first counterbalance mass member 1730a. Further, second rotor mechanism 1740b may include a second rotor assembly (not shown) mechanically coupled to second shaft 1705b, and a second stator assembly (not shown) electromagnetically coupled to the second rotor assembly. Second rotor mechanism 1740b may also include a first bearing assembly (not shown) mechanically coupled to second shaft 1705b near second mass member 1720b, and may further include a second bearing assembly (not shown) mechanically coupled to second shaft 1705b near second counterbalance mass members 1730b.

In some embodiments, first rotor mechanism 1740a may include a first feedback device such as an encoder device (not shown) attached to first shaft 1705a. The first feedback device may provide one or more of first information indicative of a respective position of at least one mass member of first mass member 1720a; second information indicative of the angular velocity ω of the first shaft 1705a; or third information indicative of a rotation direction (such as clockwise direction or counterclockwise direction) of the first shaft 1705a. A position of first mass member 1720a is represented by an angle between 0 and 2π per revolution of the first shaft 1705a, relative to a defined origin corresponding to a particular placement of the first shaft 1705a. Rotor mechanism 1740b may further include a second feedback device such as an encoder device (not shown) attached to second shaft 1705b.

The second feedback device may provide one or more of first information indicative of a respective position of second mass member 1720b; second information indicative of angular velocity ω of second shaft 1705b; or third information indicative of a rotation direction of second shaft 1705b. A position of second mass member 1720b is represented by an angle between 0 and 2π per revolution of second shaft 1705b, relative to a defined origin corresponding to a particular placement of the first shaft 1705b.

First feedback device and second feedback device may be embodied as respective encoder devices. Each of the respective encoder devices may be embodied in or may include, for example, a rotary encoder device. A rotary encoder device may include, for example, a 1024 pulse-per-rotation rotary encoder device. An encoder device may include an essentially circular plate that rotates with the shaft (either the first shaft 1705a or second shaft 1705b).

The essentially circular plate may include openings alternating with solid sections. The openings and solid section partition the plate in multiple arcs of essentially equal length, subtending a defined angle Δy. The greater the number of openings in the encoder device, the smaller the value of Δy, and thus, the greater the angular position resolution of the encoder device. Each opening may represent a value of an angular position of the shaft. The encoder device may also include, for example, a light source device, a first sensor, and a second sensor. The light source device may illuminate the essentially circular plate, causing the first light sensor to provide an electric signal in response to being illuminated and further causing the second light sensor to provide another electric signal in response to being obscured by a solid section. As the shaft rotates, the first sensor and the second sensor provide respective trains of pulses that may be utilized to determine the angular velocity of the shaft, an angular position of the shaft, and/or a direction of rotation of the shaft. The disclosure is not limited to rotary encoder devices and other types of encoder devices may be utilized in various embodiments.

By controlling respective initial angles of rotation of first shaft 1705a and rotation of second shaft 1705b—and, thus, controlling a relative angle offset between such shafts—a direction of a resultant force generated by first mass member 1720a and of second mass member 1720b may be controlled. As such, a resultant force directed in a required or intended direction perpendicular to the axis 1702 may be achieved by configuring and maintaining initial angles of, and associated relative angle offset between, the respective substantially circular motions of the first shaft 1705a and second shaft 1705b. Configurations of such initial angles may be performed during operation (with the mass member in movement) or at start up (with the mass members at rest) of the eccentric vibrator apparatus.

Figure 19:
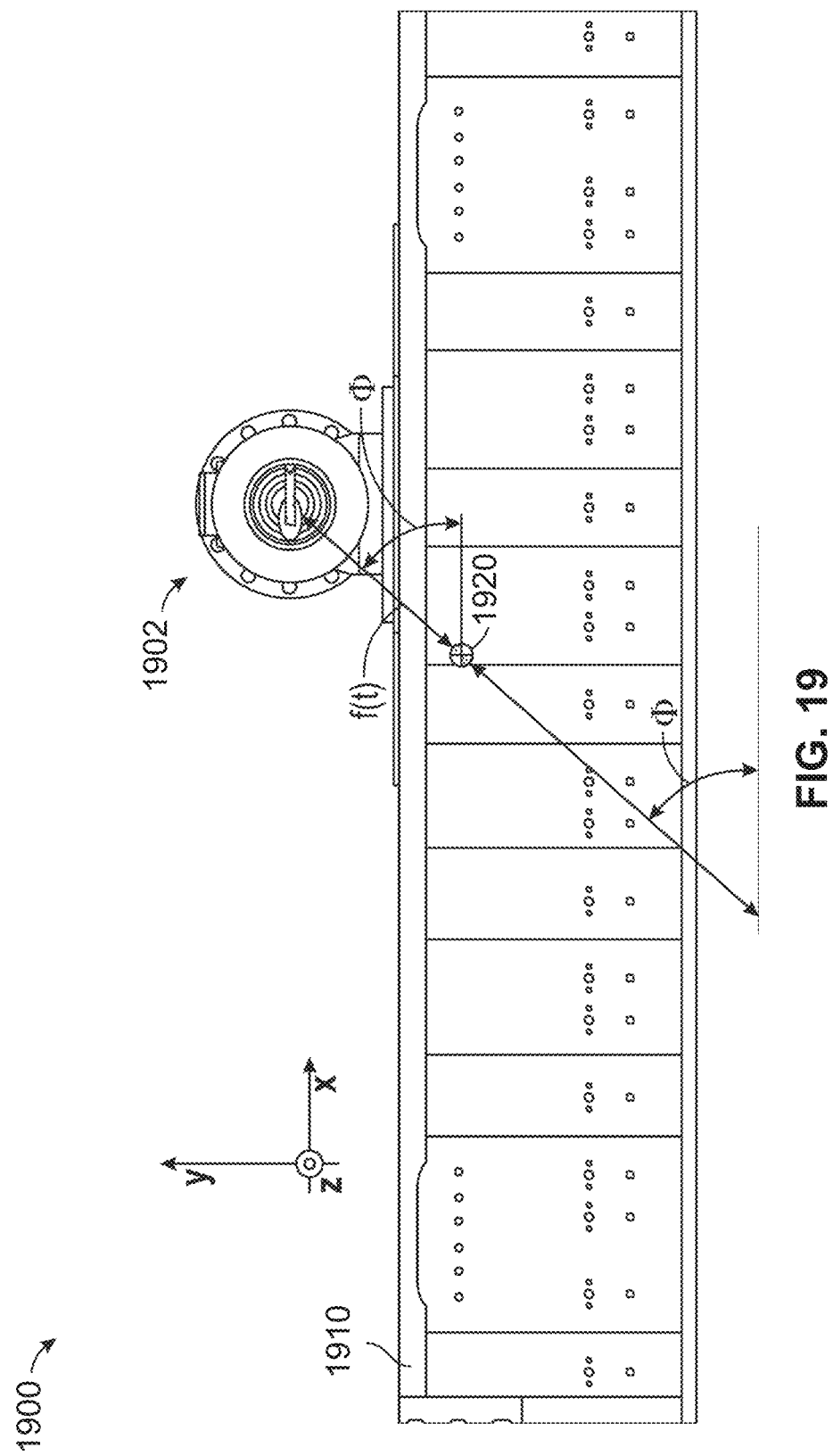
FIG. 19 is a side view of a vibratory system, according to an example embodiment.

FIG. 19 is a side view of vibratory system 1900 that utilizes eccentric vibrator apparatus 1902, according to an example embodiment. Vibratory system 1900 includes a deck assembly 1910 that is mechanically coupled to eccentric vibrator apparatus 1902 by, for example, coordinated flange members and fastening members (not shown). During operation, eccentric vibrator apparatus 1902 may generate a time-dependent force f(t). Thus, in operation, eccentric vibrator apparatus 1902 may exert a time-dependent oscillatory force f(t) on the deck assembly 1910, causing a time-dependent oscillatory mechanical motion of the deck assembly 1910. The intensity and period of oscillation of the mechanical motion may be determined by the angular frequency ω of rotation of shafts in the eccentric vibrator apparatus 1902 and by other mechanical parameters including moments of inertia.

An amplitude of time-dependent force f(t) may be determined, in part, by the angular velocity ω of the shafts in eccentric vibrator apparatus 1902, by the respective resultant moments of inertia of a first mass member and a second mass member in the eccentric vibrator apparatus 1902, and by the respective moments of inertia of a first counterbalance mass member and a second counterbalance mass member in eccentric vibrator apparatus 1902. The time-dependent force f(t) may be oriented in a direction substantially perpendicular to the longitudinal axis of eccentric vibrator apparatus 1902 (e.g., axis 1702 in FIG. 17). As such, the time-dependent force f(t) may be represented as a three-dimensional vector $(f_x(t), f_y(t), f_z(t))$, where the vector component $f_z(t)$ may be substantially null and the time dependent force f(t) may be substantially equal to $(f_x(t), f_y(t), 0)$. In an example scenario in which the deck assembly 1910 starts at rest and eccentric vibrator apparatus 1902 is energized from an power-off state, f(t) may self-align, after a transient period (for example, about 500 ms), into a direction that passes through the position of a center of gravity (CG) 1920 of the deck assembly, in the x-y plane.

Such a self-alignment may occur based on angular momentum conservation in vibratory system 1900 after eccentric vibrator apparatus 1902 is energized. Such alignment may be configured by choice of motor assembly, such as an assembly that includes an asynchronous motor (such as an induction motor) that allows slip between an input frequency and shaft speed. Such a motor may thereby produce torque without reliance on physical electrical connections to a rotor. Accordingly, an angle ϕ indicative of the orientation of the time-dependent force f(t) relative to a base side of the deck assembly 1910 may be determined by the position of the eccentric vibrator apparatus 1902 on the deck assembly 1910, along the x direction in the coordinate system illustrated in FIG. 19.

While the f(t) is illustrated as being strictly collinear with a line having an orientation ϕ, the actual f(t) generated by eccentric vibrator apparatus 1902 traverses, over time, an ellipse having a semi-major axis parallel to the line having orientation ϕ and a semi-minor axis that is much smaller (such as one, two, or three orders of magnitude smaller) than the semi-major axis. Such an ellipse may be referred to as a "tight ellipse." Specifically, angle ϕ decreases as the coordinate of the eccentric vibrator apparatus 1902 along the x axis increases (or, more colloquially, as the eccentric vibrator is moved forward on the deck assembly) and increases as the coordinate of the eccentric vibrator apparatus 1902 along the x axis decreases (or as the eccentric vibrator is moved rearward). Angle ϕ and the magnitude |f(t)| may determine the respective magnitudes of vector components $f_x(t)$ and $f_y(t)$. For example, small $\phi$ (that is, a few degrees) may yield a large $f_x(t)$ and a small $f_y(t)$, whereas large $\phi$ (for example, several tens of degrees) may yield a small $f_x(t)$ and a large $f_y(t)$. Thus, the angle $\phi$ may adjusted to control a conveyance rate or residence time of particulate matter or other types of solids on an x-z plane of deck assembly 1910.

Figure 20:
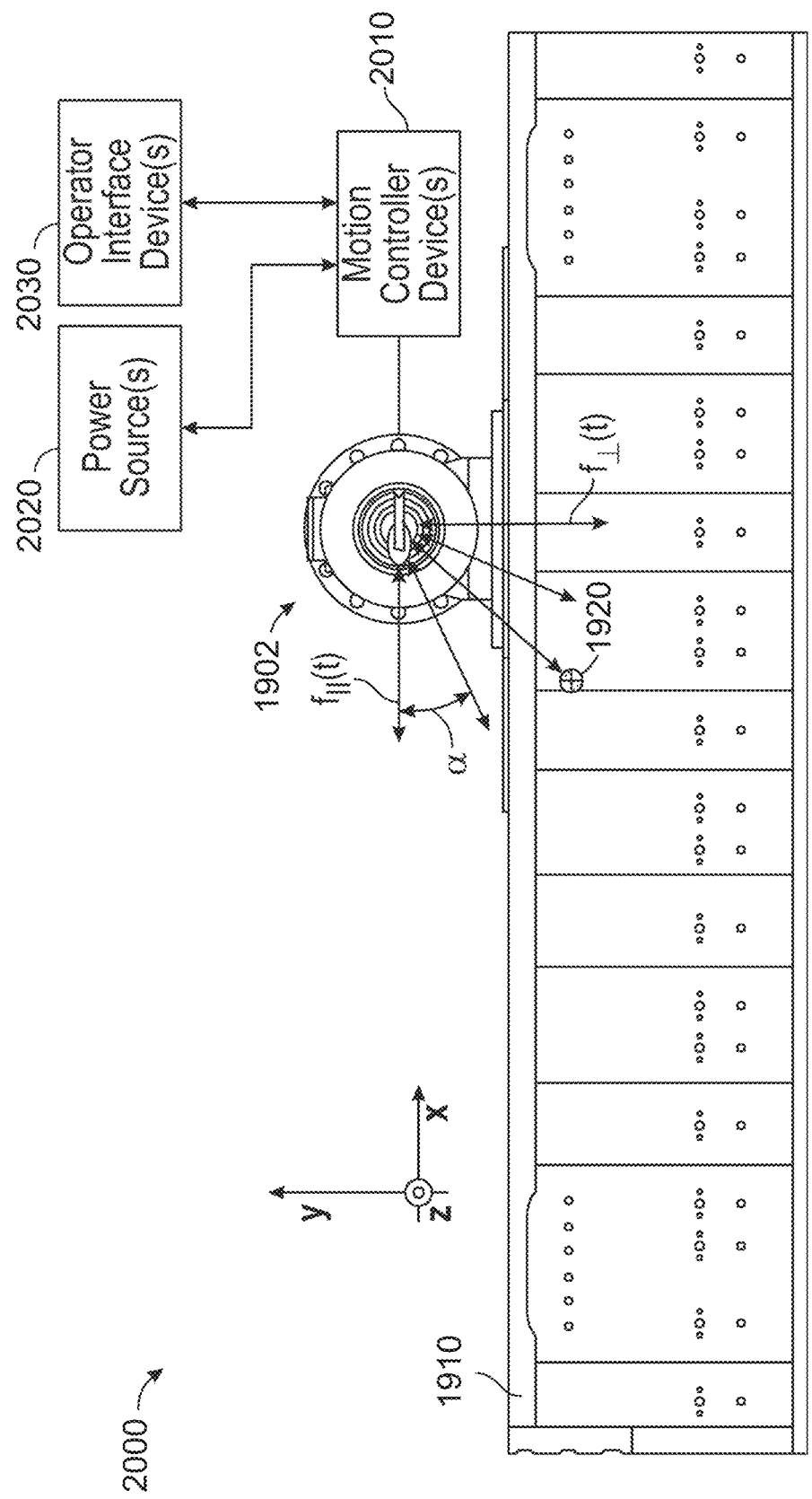
FIG. 20 is a diagram of a vibratory system, according to an example embodiment.

FIG. 20 is a diagram of a vibratory system 2000 that includes a control system functionally coupled to eccentric vibrator apparatus 1902, according to an example embodiment. The control system includes one or more operator interface devices 2030 and one or more motion controller devices 2010. Vibratory system 2000 also includes one or more power sources 2020 that may energize the motor assemblies included in eccentric vibrator apparatus 1902 and/or at least one device of the control system. Power source(s) 2020 may include one or more power supplies and/or a utility power source. Operator interface device(s) 2030 may include input/output (I/O) interface device(s), such as a human machine interface (HMI), which may allow selection of a desired mode of vibration (for example, substantially linear excitation or substantially elliptical or circular excitation).

Operator interface device(s) 2030 may further allow real-time monitoring or intermittent monitoring at particular instants. A mode of vibration may include a defined orientation and a defined magnitude of a time-dependent force f(t) exerted by eccentric vibrator apparatus 1902. The defined orientation is represented by an angle $\alpha$ in FIG. 20. As illustrated, $\alpha=0$ would correspond to a time-dependent force $f_\|(t)$ essentially aligned along an x direction. Stated differently, $f_\|(t)$ is essentially parallel to a base side of the of deck assembly 1910. As further illustrated, $\alpha=\pi/2$ would correspond to a time-dependent force $f_\perp(t)$ that is essentially vertical, along a y direction, where $f_\perp(t)$ is essentially perpendicular to the base side of the of deck assembly 1910.

Configuration of a mode of operation may include the configuration of a defined angular frequency of rotation of a shaft of eccentric vibrator apparatus 1902 and/or the configuration of a defined angular offset between a first eccentric mass member of a first motor assembly and a second eccentric mass member of a second motor assembly. An operator interface device 2030 may receive input information indicative of a desired angle $\alpha$, angular frequency $\omega$, and/or angular offset. The input information may be used to configure a motion controller device 2010 to control vibratory motion of eccentric vibrator apparatus 1902. While the resultant f(t) generated by eccentric vibrator apparatus 1902 is illustrated as being linear with an orientation $\alpha$, the actual f(t) generated by eccentric vibrator apparatus 1902 traverses, over time, an ellipse having a semi-major axis parallel to the line having the slope $\alpha$ and a semi-minor axis that is much smaller (for example, one, two, or three orders of magnitude smaller) than the semi-major axis.

Depending on desired screen performance, angle $\alpha$ (which may also be referred to as tight-ellipse angle) may be configured to induce slow conveyance of material to be screened, to thereby maximize discharge dryness. Alternatively, angle $\alpha$ may be configured to induce fast conveyance to material to be screened, to thereby increase machine handling capacity, or may be configured to momentarily reverse conveyance of material to thereby dislodge stuck particles (i.e., for de-blinding).

Further, angle $\alpha$ may be adjusted during operation, as described herein, to an angle $\alpha'$ of about 90° for a defined period of time to attain temporary deblinding of a screen in a screening apparatus. After the defined period, $\alpha'$ of about 90° may be readjusted to $\alpha$. Further temporary changes to a mode of operation may be implemented in various embodiments. In one example, a transition from an angle co of about 45° to angle $\alpha'$ of about 60° may be made to slow conveyance and to cause a drier discharge from a slurry fed into a deck assembly having eccentric linear vibrator 1902. Subsequently, a transition from $\alpha'$ of about 60° to $\alpha_0$ of about 45° may be implemented to resume faster conveyance. In another example, an angle $\alpha$ of approximately 45° may be adjusted during operation, as described herein, to an angle $\alpha'$ of about 30° for a defined period of time to remove accumulated matter on a screen. After the defined period of time, $\alpha'$ of about 30° may be readjusted to a.

Such an adjustment may be desirable in operation of a screening machine to screen a slurry. During screening, slurry material transforms from a liquid-solid mixture to a dewatered solid. Angle $\alpha$ may be adjusted to increase dryness. For example, if the angle $\alpha$ is increased from about 45° to approximately 60°, as described above, a flow rate of the material on the screening decreases. This decrease in flow rate permits more time for liquid to be driven out of the slurry as the material moves more slowly towards a discharge end of the screening machine.

Figure 21:
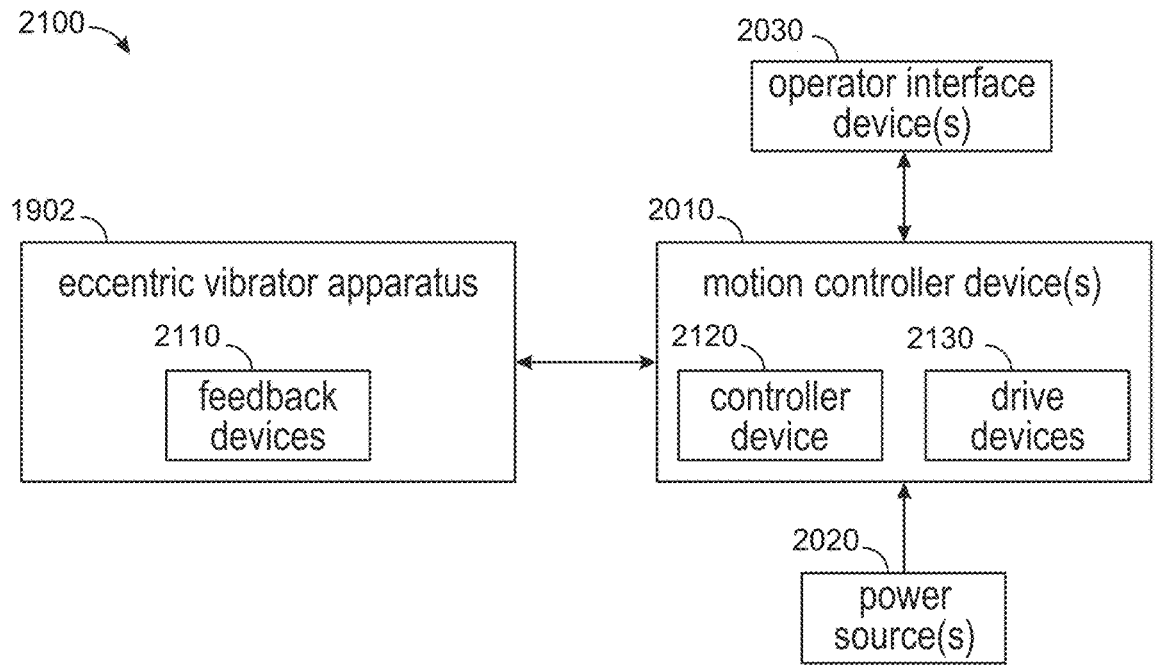
FIG. 21 is a schematic illustration of an eccentric vibrator apparatus coupled to a control system, according to an example embodiment.

FIG. 21 is a schematic illustration of a system 2100 that may include motion controller device(s) 2010, a controller device 2120, and drive devices 2130. Controller device 2120 may be embodied in or may include a programmable logic controller (PLC), a microcontroller, etc., and drive devices 2130 may be embodied in or may include electronic motor drives, variable frequency drives (VFDs), etc. Controller device 2120 may receive information indicative of position, velocity of eccentric mass members, and/or of direction of rotation of eccentric vibrator apparatus 1902. Controller device 2120 may control drive devices 2130 to generate a specific mode of operation. In this regard, feedback devices 2110 may be coupled to respective shafts of eccentric vibrator apparatus 1902 and may provide first information indicative of respective positions of mass members.

Feedback devices 2110 may also provide second information indicative of respective angular velocities of the shafts. Feedback devices 2110 may provide third information indicative of a direction of rotation of a shaft of eccentric vibrator apparatus 1902. In one embodiment, the first information, the second information, and the third information may be provided directly to controller device 2120. In another embodiment, the first information, the second information, and the third information may be provided indirectly to controller device 2120, where such information is provided to respective drive devices 2130, and relayed by drive devices 2130 to controller device 2120. Controller device 2120 may control drive devices 2130 to generate rotational movement of at least one of the collinear shafts of eccentric vibrator apparatus 1902.

Feedback devices 2110 may include a first feedback device (such as a first encoder device) attached to a first shaft of eccentric vibrator apparatus 1902. The first feedback device may send one or more of (a) first information indicative of a respective position of at least one of first mass members of eccentric vibrator apparatus 1902, (b) second information indicative of angular velocity of the first shaft, or (c) third information indicative of a direction of rotation of the first shaft. Feedback devices 2110 may also include a second feedback device (such as a second encoder device) attached to a second shaft of vibrator apparatus 1902. The second feedback device may send one or more of (a) fourth information indicative of a respective position of at least one of second mass members of eccentric vibrator apparatus

1902, (b) fifth information indicative of angular velocity of the second shaft, or (c) sixth information indicative of direction of rotation of the second shaft.

Controller device 2120 may further receive the first information, the second information, the third information, the fourth information, the fifth information, the sixth information, and operator interface device 2030 information and may direct drive devices 2130 to configure rotational movement of the first shaft and second shaft based at least on the received information. In an embodiment, controller device 2120 may receive such information directly from the first feedback device and the second feedback device. In another embodiment, controller device 2120 may receive the first information, the second information, the third information, the fourth information, the fifth information, and/or the sixth information indirectly, where such information is provided to drive devices 2130, and relayed by drive devices 2130 to controller device 2120.

Drive devices 2130 may include a first drive device coupled to a first motor assembly including the first shaft of eccentric vibrator apparatus 1902. Controller device 2120 may direct the first drive device to generate the rotational movement of the first shaft based on one or more of a portion of the first information; a portion of the second information; a portion of the third information and operator interface device 2030 information. Drive devices 2130 may also include a second drive device coupled to a second motor assembly including the second shaft of eccentric vibrator apparatus 1902. Controller device 2120 may direct the second drive device to configure the rotational movement of the second shaft based on one or more of a portion of the fourth information; a portion of the fifth information; a portion of the sixth information and operator interface device 2030 information.

Figure 22:
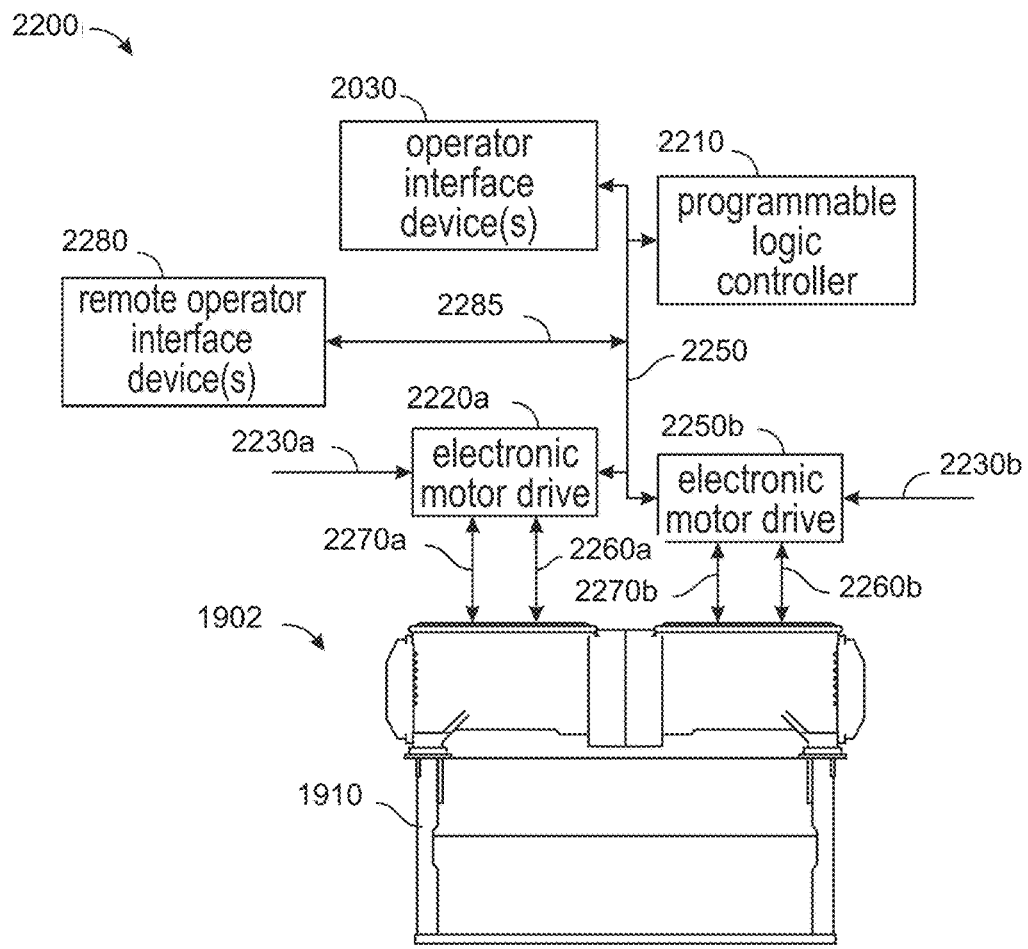
FIG. 22 is a schematic illustration of an eccentric vibrator apparatus coupled to a control system, according to an example embodiment.

FIG. 22 is a schematic illustration of an eccentric vibrator apparatus 2200 coupled to a control system, according to an example embodiment, as illustrated in FIG. 22, system 2200 may include a controller device 2210 that may be embodied in or may include a programmable logic controller. In addition, drive devices 2130 (e.g., see FIG. 21) may be embodied in or may include a first electronic motor drive 2220A and a second electronic motor drive 2220B. The disclosure is not limited to electronic motor drives that share a common architecture. First electronic motor drive 2220A and second electronic motor drive 2220B may power respective motor assemblies in eccentric vibrator apparatus 1902. In this regard, first electronic motor drive 2220A may include an electronic inverter or another type of power supply coupled (for example, electromechanically coupled) to a first motor assembly by, for example, a power line assembly 2260A. Second electronic motor drive 2220B may include an electronic inverter or another type of power supply coupled to a second motor assembly by a second power line assembly 2260B.

First and second power line assemblies 2260A and 2260B may include, for example, an electrical conductor, power connectors, insulating coatings, etc. First electronic motor drive 2220A and second electronic motor drive 2220B may be coupled to respective power lines 2230A and 2230B that are connected to a utility power source (such as a 50 Hz AC power source or a 60 Hz AC power source). Further, first electronic motor drive 2220A may be coupled (electrically or electromechanically) to the first feedback device of eccentric vibrator apparatus 1902 by a first bus 2270A. Second electronic motor drive 2220B may also be coupled (electrically or electromechanically) to a second bus 2270B. First and second bus structures 2270A and 2270B allow transmission of information (analog and/or digital) that may represent angular position, angular velocity, and/or direction of rotation of a shaft of eccentric vibrator apparatus 1902. The disclosure is not limited to buses that share a common architecture.

As is further illustrated in FIG. 22, system 2200 may further include operator interface device(s) 2030 and remote operator interface device(s) 2280. Operator interface device(s) 2030, programmable logic controller 2210, first electronic motor drive 2220A, and second electronic motor drive 2220B may be coupled by network devices 2250 (such as a high-speed network device or bus). Network devices 2250 may allow exchange of information (for example, data and/or signaling) between operator interface device(s) 2030, programmable logic controller 2210, first electronic motor drive 2220A, and second electronic motor drive 2220B. One or more of remote operator interface device(s) 2280 may be coupled to a network device 2250 via wireless links and/or wired links 2285. Device(s) 2280 may allow configuration and/or monitoring of operation of eccentric vibrator apparatus 1902.

Figure 23:
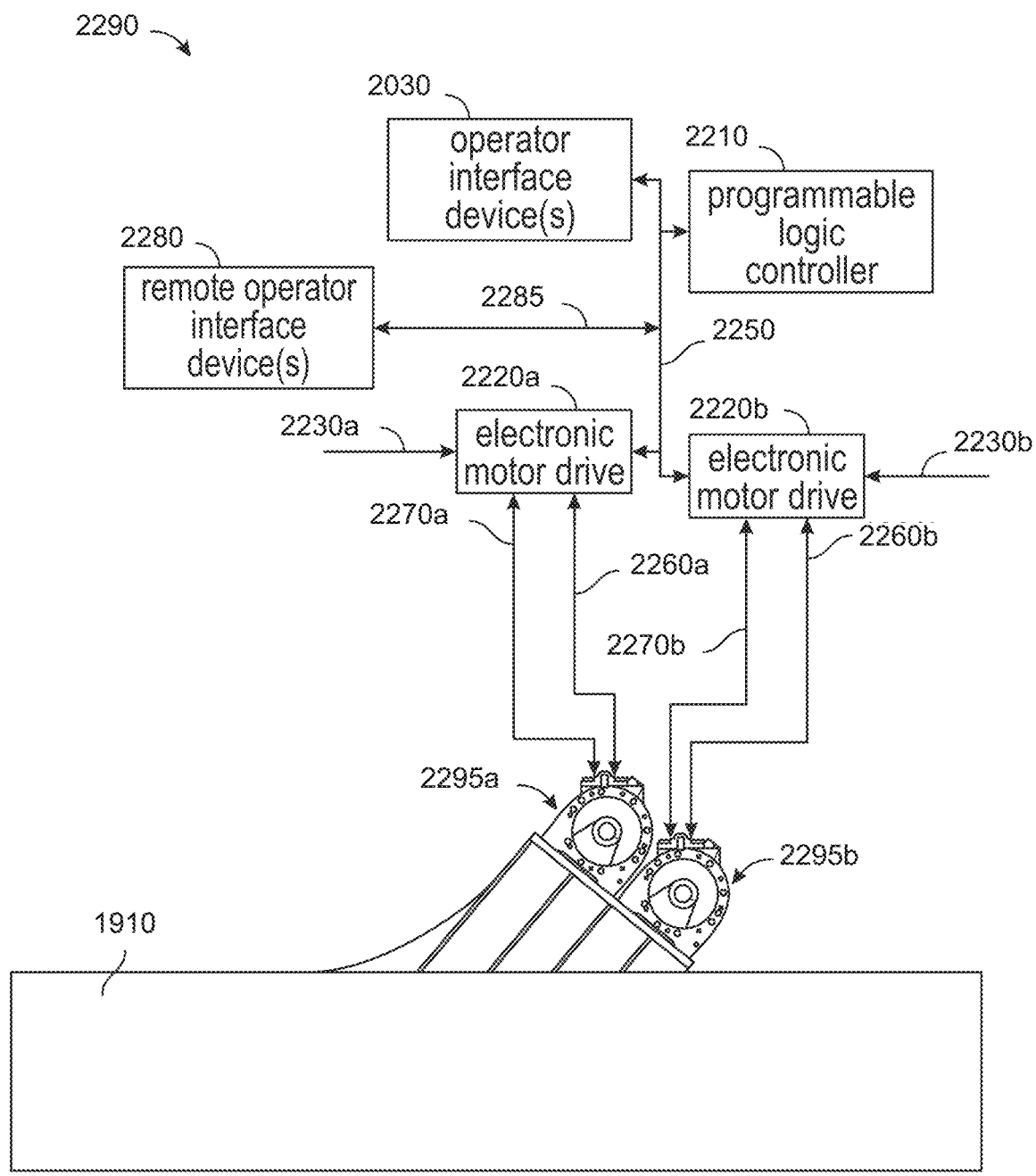
FIG. 23 is a schematic illustration of a vibrator apparatus coupled to a control system, according to an example embodiment.

FIG. 23 is a schematic illustration of a vibratory system 2290 having a control system that is functionally coupled to other types of eccentric motors to thereby control a type of motion generated by the eccentric motor. For example, a control system may be functionally coupled to conventional eccentric motors 2295a and 2295b, such as eccentric motors that do not include collinear shafts. A mode of rotation (for example, magnitude of angular velocity and direction of rotation) of each one of the conventional motors 2295a and 2295b may be controlled independently, according to an embodiment. For example, to generate an essentially linear mechanical excitation, a PLC 2210 may direct a first electronic motor drive 2220A to cause eccentric motor 2295a to rotate in a first direction at an angular velocity $\omega$. PLC 2210 may further direct a second electronic motor drive 2220B to cause eccentric motor 2295b to rotate in a second direction opposite the first direction, at the angular velocity $\omega$. In another example, to generate an essentially circular mechanical excitation, PLC 2210 may direct first electronic motor drive 2220A to cause eccentric motor 2295a to rotate in a first direction at an angular velocity $\omega$. PLC 2210 may further direct second electronic motor drive 2220B to cause eccentric motor 2295b to rotate in the first direction as well, at the angular velocity $\omega$.

As described above, control system that includes motion controller device(s) 2010 (e.g., see FIG. 20) may generate a predetermined mode of operation of a disclosed eccentric vibrator apparatus. The control system may configure and/or monitor the respective movements—such as respective angular velocities and angular positions—of collinear shafts included in the eccentric vibrator apparatus independently and continuously, nearly continuously, or at specific times (for example, periodically, nearly periodically, or according to a schedule). For example, a mode of operation may be monitored and/or configured as desired in nearly real time (or essentially periodically, at time intervals significantly shorter than, such as a hundredth part, a thousandth part, a millionth part, and so forth, of a period of revolution $1/\omega$ of a shaft of the apparatus) without powering off the eccentric vibrator apparatus. In this regard, motion controller device(s) 2010 may employ various techniques, including electronic gearing to configure the angular velocity and/or angular position of a shaft during operation of the eccentric vibrator apparatus, without needing to power down the eccentric vibrator apparatus to perform a reconfiguration operation.

As described above, the control system may be configured to set and maintain a relative angle offset between respective rotational movements of collinear shafts of an eccentric vibrator apparatus. In this regard, the control system may impose respective initial angles of respective rotational movements of the collinear shafts. The respective initial angles may be defined relative to a reference coordinate system and may determine an orientation of oscillation of a resultant force f(t) (an essentially sinusoidal force) produced by the eccentric vibrator apparatus. The orientation may be represented by an angle relative to a defined direction in a reference coordinate system. For example, the reference coordinate system may be a Cartesian system having an axis (for example, a z-axis as shown in FIG. 20) essentially parallel to the longitudinal axis of the eccentric vibrator apparatus. A direction representing an orientation of the oscillation of the resultant force f(t) may lie in a plane (e.g., in the x-y of FIG. 20) that is normal to the z axis.

FIGS. 24-27 illustrate schematic force diagrams for four respective configurations of initial angles and associated relative angle offsets, at nine different instants during operation of an eccentric vibrator apparatus 2400 in accordance with embodiments described herein.

Figure 24:
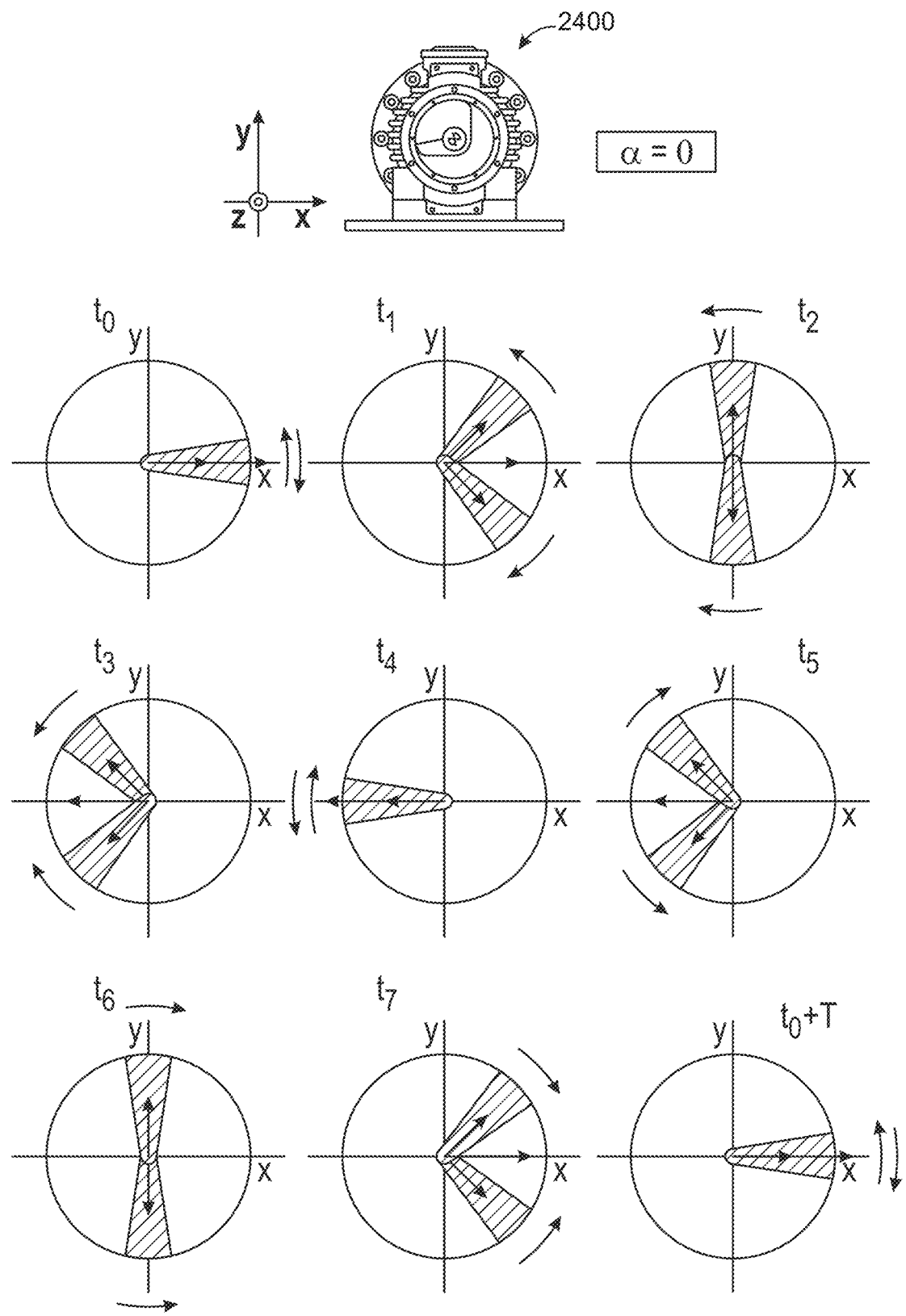
FIG. 24 illustrates time-dependent forces between mass members of an eccentric vibrator apparatus for a first mode of vibration, according to an example embodiment.

FIG. 24 illustrates force configurations at instants $t_0$, $t_1$, $t_2$, $t_3$, $t_4$, $t_5$, $t_6$, $t_7$, and $t_0+T$ for initial angles equal to 0 for both collinear shafts in eccentric vibrator apparatus 2400, resulting in a relative angle offset essentially equal to 0. At any given instant, forces are indicated by arrows within the circle, and shaded regions indicate positions of respective masses. Arrows external to the circle indicate velocities. Forces corresponding to respective pluralities of mass member are represented with thin arrows, and resultant forces F are represented with thick arrows. In this example, angles are defined relative to the Cartesian coordinate system shown in FIG. 24, and T represents a period of the rotation of the collinear shafts. For the initial angular configuration and associated relative angle offset of this example, a first mass member of eccentric vibrator apparatus 2400 may be essentially aligned with a second mass member at angles 0 and $\pi$, As illustrated by the diagrams corresponding to $t_0$ and $t_4$.

At each instant, the force exerted by a given mass (e.g., shown by a thin arrow in the circle) is essentially perpendicular to the velocity (e.g., shown by an arrow outside of the circle) of the mass members. The masses generate forces that share a common magnitude. For example, a first mass member and a second mass member may exert, respectively, a force $F_a$ and a force $F_b$, where $|F_a|=|F_b|$. As shown in FIG. 24, for initial angles essentially equal to 0, the resultant force f(t) may be oriented along the x direction, or parallel to a base of the eccentric vibrator apparatus 2400. Further, forces cancel at instants $t_2$ and $t_6$ and point in the negative x direction at instant $t_4$. The configuration of FIG. 24 therefore causes horizontal, side-to-side vibration of equipment (such as a deck assembly or screen basket) onto which the force is exerted. For instance, a screen frame or deck assembly may vibrate with oscillations in a plane that is essentially horizontal.

Figure 25:
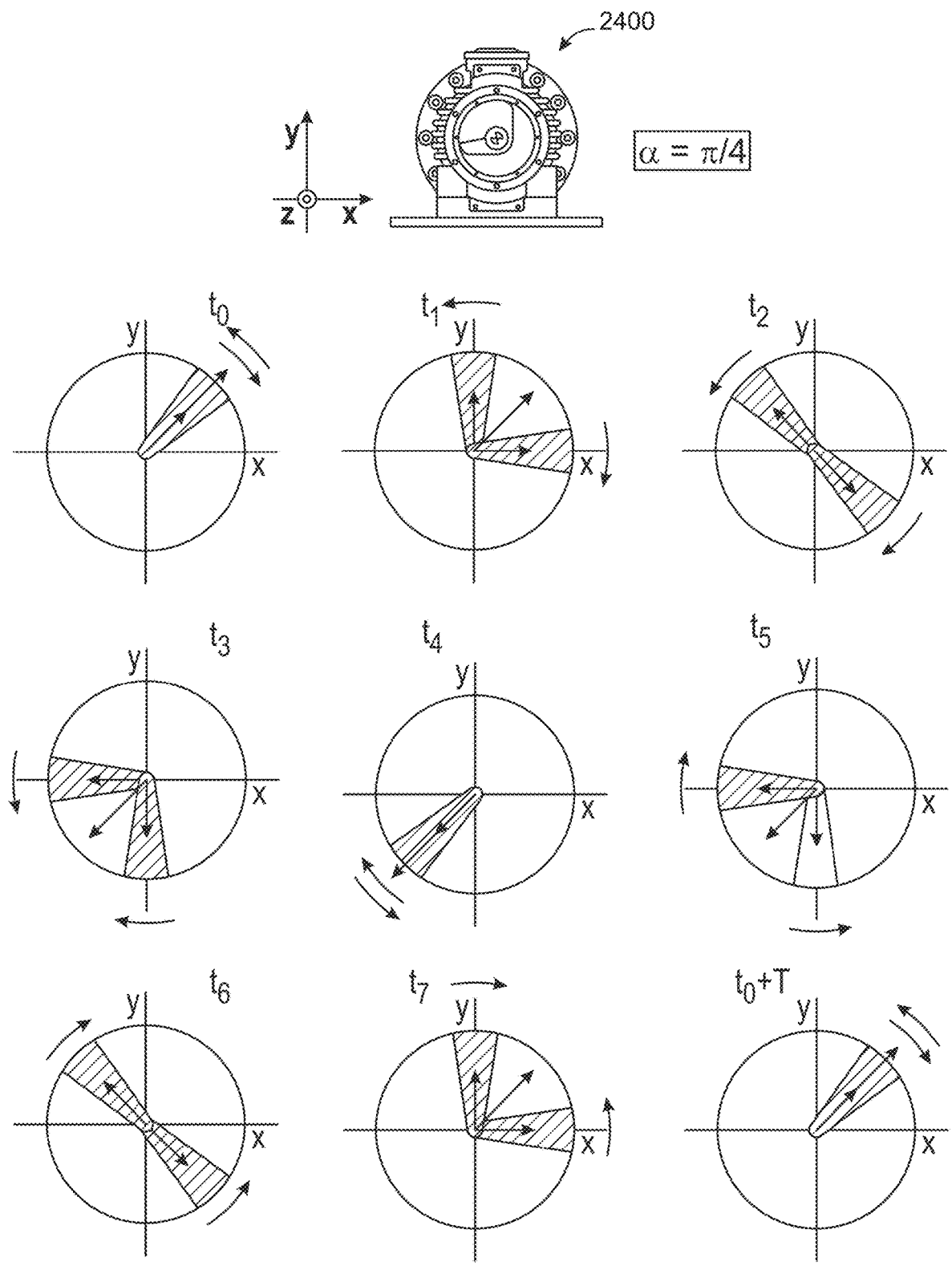
FIG. 25 illustrates time-dependent forces between mass members of an eccentric vibrator apparatus for a second mode of vibration, according to an example embodiment.

FIG. 25 illustrates a second mode of vibration in which a linear oscillation is oriented at an angle with respect to the horizontal, in accordance with an embodiment of the disclosure. In this example, the control system may momentarily delay the first shaft and momentarily increase speed of the second shaft of the eccentric vibrator apparatus, thus configuring respective initial angles of the first shaft and the second shaft that yield a relative angle offset approximately equal to $\pi/4$ (set $t_2$ equal to $t_0$ in FIG. 25). In FIG. 25, one of the mass members may be advanced, for example, by $\pi/4$ and the other one of the mass members may be delayed, for example, by $\pi/4$. Therefore, the first mass member may be essentially aligned with the second mass member at angles $\pi/4$ and $5\pi/4$, as illustrated by the diagrams corresponding to $t_0$ and $t_4$. For such initial angles and associated relative angle offset, the resultant force f(t) may be oriented at about $\pi/4$ relative to the base of the eccentric vibrator apparatus 2400.

Figure 26:
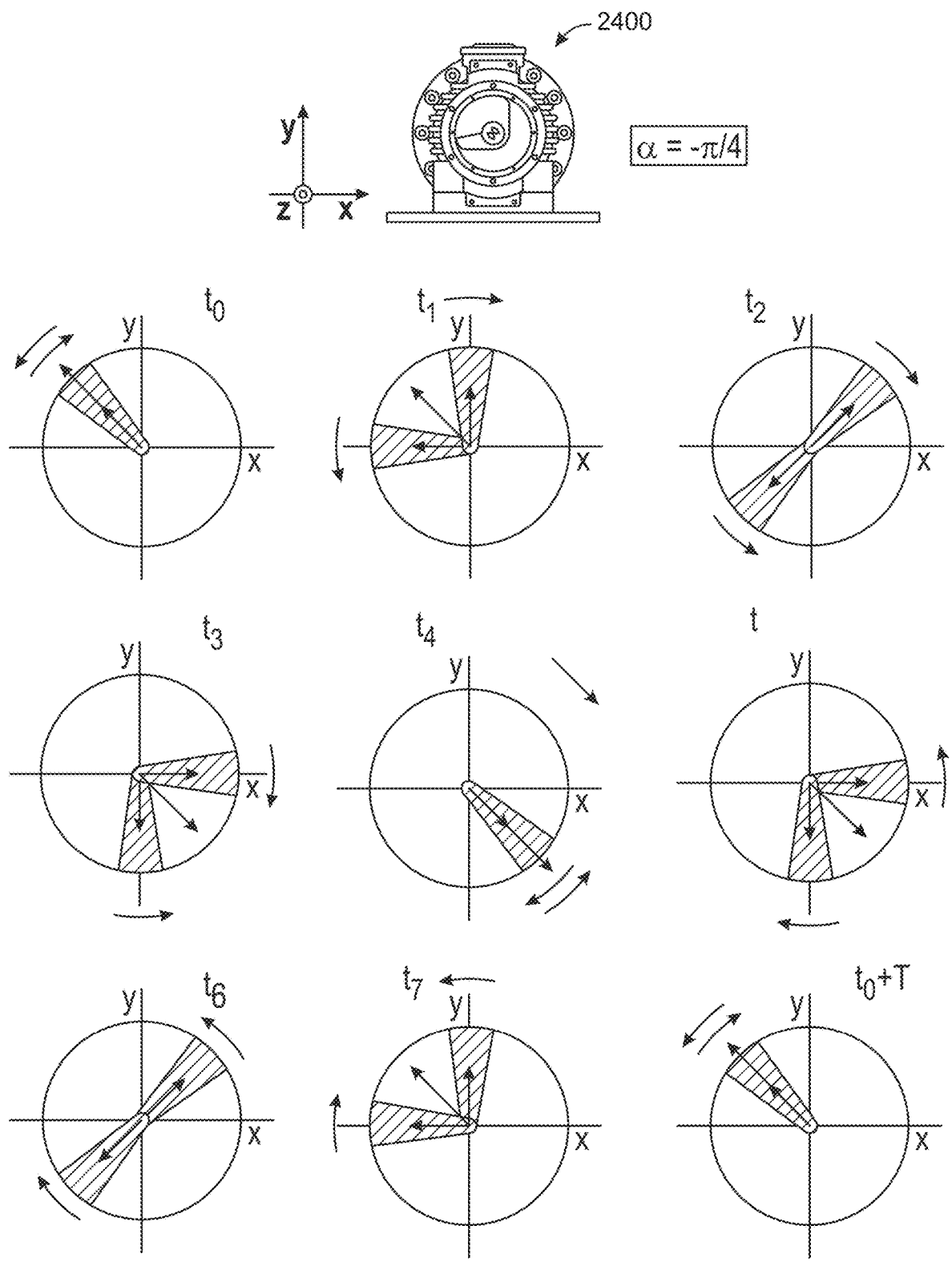
FIG. 26 illustrates time-dependent forces between mass members of an eccentric vibrator apparatus for a third mode of vibration, according to an example embodiment.

FIG. 26 illustrates a third mode of vibration in which a linear oscillation is oriented at an angle with respect to the horizontal, in accordance with an embodiment of the disclosure. By setting the initial angles of rotation of the first shaft and the second shaft to be approximately $3\pi/4$, a relative angle offset of about $3\pi/4$ may be attained, as is shown in FIG. 26 (set $t_2$ equal to $t_0$ in FIG. 26). In this example, the first mass member may be essentially aligned with the second mass member at angles $3\pi/4$ and $7\pi/4$, As illustrated by the diagrams corresponding to instants $t_0$ and $t_4$ in FIG. 26. Thus, rotating the orientation of oscillation of the resultant force f(t) by an angle $\pi/2$ relative to the orientation for a relative angle offset of $\pi/4$ (see FIG. 25), causing such a force to be essentially aligned with the other diagonal of the x-y plane of the Cartesian coordinate system relative to the motion of FIG. 25.

Figure 27:
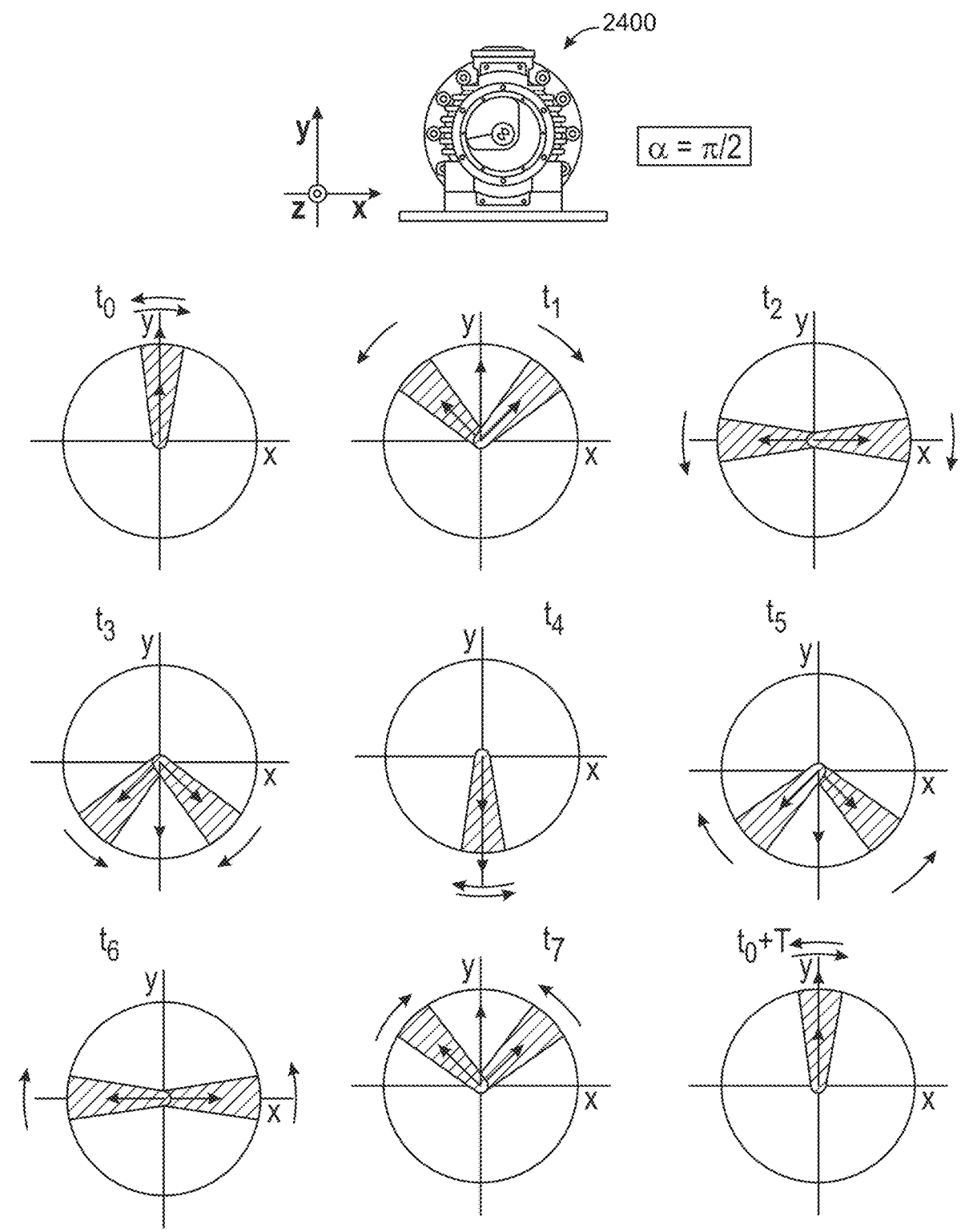
FIG. 27 illustrates time-dependent forces between mass members of an eccentric vibrator apparatus for a fourth mode of vibration, according to an example embodiment.

FIG. 27 illustrates a fourth mode of vibration in which a linear oscillation is oriented at an angle with respect to the horizontal, in accordance with an embodiment of the disclosure. The control system may set the initial angles of respective rotations of the first shaft and the second shaft to $\pi/2$, causing a relative angle offset of approximately $\pi/2$, as is shown in FIG. 27. In this example, a first mass member may be advanced, for example, by $\pi/2$ while a second mass member may be advanced by $\pi/2$. As such, the first mass member may be essentially aligned with the second mass member at angles $\pi/2$ and $3\pi/2$, As illustrated by the diagrams corresponding to $t_0$ and $t_4$ in FIG. 27 (set $t_1$ equal to $t_0$ in FIG. 27). The oscillation of the resultant force f(t) may therefore be oriented essentially perpendicular to the horizontal (i.e., aligned along the y direction). As such, the motion is essentially a vertical, up-down vibration. In this mode of vibration, a screen frame or deck assembly may be caused to vibrate with a linear oscillatory motion that is essentially perpendicular to the ground.

The control systems described herein may cause changes to angles of respective rotations of collinear shafts during the operation of an eccentric vibrator apparatus. In this regard, a plane of oscillatory motion may be changed while the eccentric vibrator apparatus is running. In a different mode of operation, the vibratory motion may be changed from a linear oscillation to a circular or elliptical oscillation. For example, a control system may cause collinear shafts of an eccentric vibrator apparatus to rotate in a common direction and at a common angular velocity to generate an essentially circular mechanical excitation. For example, while the system is generating linear motion with counter rotating masses, the control system may change the direction of rotation of a first shaft (or, in some instances, a second shaft) of the substantially collinear shafts to be reversed. Upon such a reversal, the control system may also cause the first shaft and the second shaft to be angularly aligned—neither the first shaft nor the second shaft is angularly advanced or angularly retarded relative to the other shaft. Thus, the substantially collinear shafts are configured to rotate in a common direction at a common angular frequency $\omega$, without an angular shift between the shafts, resulting in a substantially circular motion of the eccentric vibrator apparatus. In further embodiments, elliptical as well as circular vibrations may be implemented with masses rotating in the same direction but with relative offsets.

In further embodiments, an eccentric vibrator apparatus may generate a substantially circular mechanical excitation, without reliance on a control system to configure circular motion and to provide power. In such embodiments, a direction of rotation of a shaft of the eccentric vibrator apparatus may be reversed by changing a polarity of two of three incoming power leads of a three-phase asynchronous induction motor that generates rotation of the shaft. For example, a three-phase system may include (i) a first line power L1, a second line power L2, and a third power line L3, and (ii) a first motor terminal T1, a second motor terminal T2, and a third motor terminal T3. Clockwise rotation of a shaft may be accomplished by connecting L1 to T1, L2 to T2, and L3 to T3. Alternatively, counterclockwise rotation of the shaft may be achieved by switching L1 to be connected to T3, maintaining L2 connected to T2, and switching L3 to be connected to T1.

A control system may allow real-time or nearly real-time control of motor assembly speed and/or vibrating force direction. A rate at which particulate matter is conveyed from a feed end to a discharge end of a separator system may, in turn, be controlled by controlling characteristics of an eccentric vibrator apparatus that is coupled to the separator system. In addition to shaker systems, an eccentric vibrator apparatus may be coupled to feeders, such as vibratory feeders, where feed rate of material may be accurately controlled. As an example, in high-volume processing applications, conveyance rate may be increased to move particulate matter or other types of solids away from a screening surface and/or to expose a screening surface area to an incoming flow of matter. As another example, a conveyance rate may be decreased to increase dryness of screened material by increasing a residence time of the material on a screening surface.

As will be described in greater detail below in reference to FIGS. 32-35, the dilution savings are displayed to the user within a user interface 3200 as a comparison in the Dilution Ratio 3510 and the SCE losses 3512 between the proprietary rigs and the third-party rigs. In some instances, the user interface 3200 may provide recommendations on how to improve the operators rigs, such as by adjusting solids controls to increase efficiency of the solids system, thereby reducing waste, improving dilution, and reducing cost. Additional drilling mud parameters may be compared and displayed in the user interface 3200. For example, a comparison of water (bbls) 3514, barite 3516, chemical 3518, and base oil 3520 may show how the wells compare in their performance. The user may then make informed decisions on changes to the well operating parameters to improve the well performance.

Figure 28:
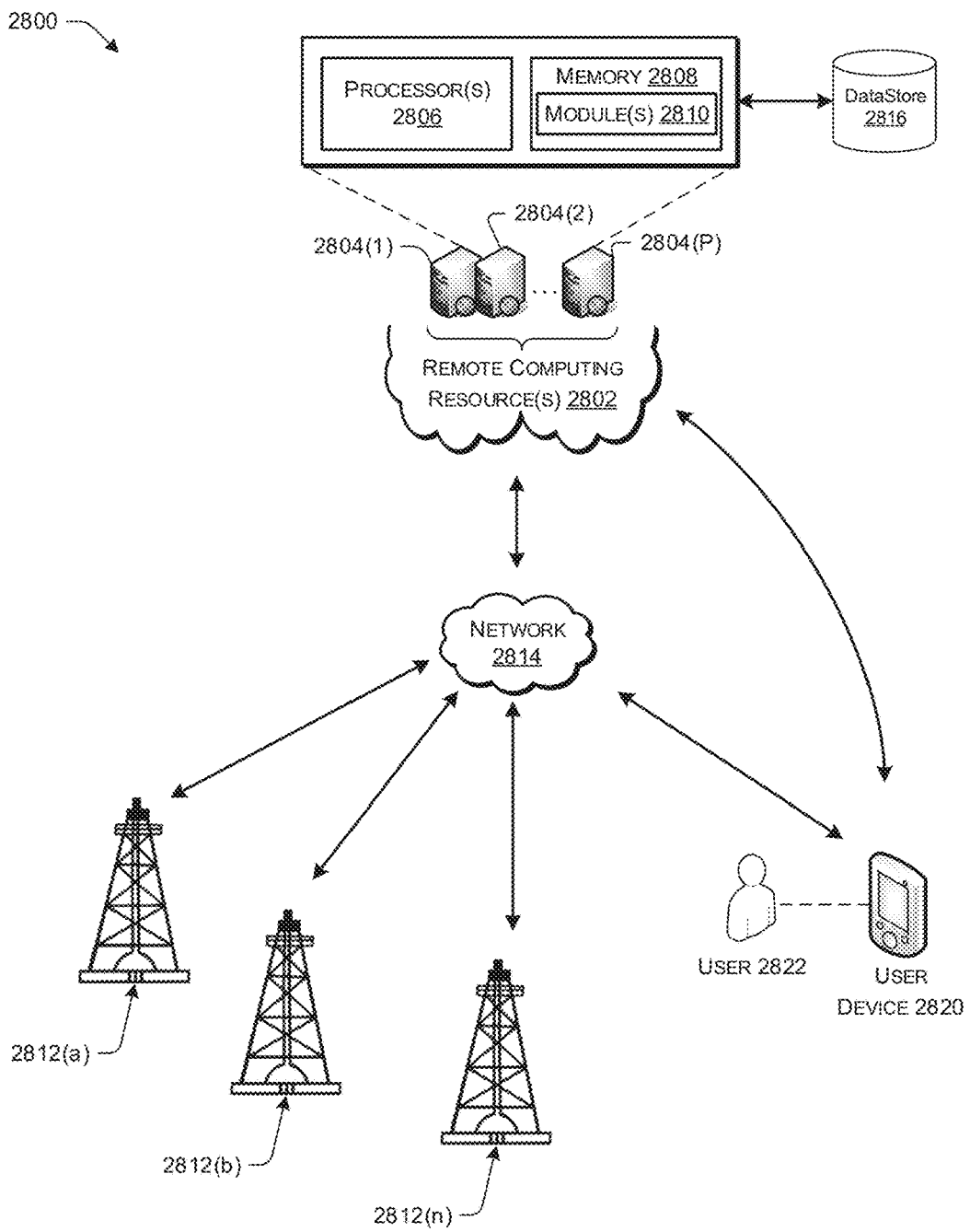
FIG. 28 illustrates a schematic representation of a system configured to generate data and visual representations associated with drilling mud quality and efficiency, in accordance with some embodiments.

FIG. 28 illustrates a schematic representation of a system configured to generate data and visual representations associated with drilling mud quality and efficiency. The system may provide important feedback, statistics, and efficiency, which may be used to inform business decisions regarding operation of solids control equipment. According to some embodiments, a system 2800 includes computing resources 2802, which may be remote from a drilling site. Computing resources 2802 may be any suitable type of computing system as described herein, and may include one or more servers, a distributed computing platform (e.g., cloud computing services), or some other type of infrastructure or networked computing resources. In some embodiments, the computing resources 2802 include one or more server computers 2804(1), 2804(2), ... 2804(P) which may be located in any suitable location and may share tasks required of the system. The computing resources 2802 have one or more processors 2806 and memory 2808. Memory 2808 stores one or more sets of computer readable instructions 2810, which include instructions that, when executed, cause computing resources 2802 to perform various operations (e.g., by executing procedures, routines, and tasks).

According to some embodiments, computing resources 2802 receive reports from one or more well sites 2812(a), 2812(b), 2812(n). As an example, computing resources 2802 will receive a report, such as a drilling mud report or fluid volume tracker, from one or more of the well sites 2812(a). The mud report may include data regarding drilling fluids (e.g., drilling mud), which may aid in maintaining hydrostatic pressure, transporting drill cuttings to the surface, cooling a drill bit and drill string, and sealing the wellbore, among other things. Mud reports may include data associated with a mud, such as, but not limited to, density, rheology, fluid loss, chemical properties, and solids control and analysis. Mud reports are typically prepared by a mud engineer and may take any suitable form, such as a physical document, an electronic document, and may be prepared by one or more software applications that receive data from the mud engineer, from one or more sensors, or a combination of sources.

In some examples, at least some portions of the mud report are generated automatically from sensors that capture data associated with a time-dependent state of the drilling mud and/or the drilling equipment. The mud report may be sent to computing resources 2802 through any suitable method, such as a wired connection or a wireless connection utilizing any suitable technology and protocol. In some situations, the mud report is sent to computing resources 2802 in an email. Drilling rigs 2812(a), may be in communication with the computing resources 2802 by a network 2814, such as the internet.

The mud report may typically contain a substantial amount of information about the drilling mud, and an analysis of the report, or a series of reports, may be used to determine changes to the drilling operation to increase efficiency, increase throughput, increase well production rate, reduce cost, and reduce waste, among other things. In some instances, the mud report may include data associated with the current density of the mud, which is the ability of the mud to suspend cuttings or clear obstructions from within the wellbore to the surface. The density of the mud may be determined before entering the wellbore and again after exiting the wellbore to determine the change in density as a result of withdrawing solids from the wellbore.

The mud report may include data associated with rheology of the mud which is indicative of the flow properties of the mud. The rheology data may include data such as a yield point which indicates a shear stress required for the mud to flow; a funnel viscosity which is a measure of the viscosity profile as the mud flows through a funnel; a plastic viscosity which is a measure of viscosity from a rheometer or viscometer; Gels, which measures a gel strength after a predetermined undisturbed time.

The mud report may additionally include data associated with a fluid loss of mud which indicates loss of fluid to maintenance of hydrostatic pressure and other losses. The fluid loss data may include a filtrate volume, cake thickness, static filtration behavior at an elevated temperature and pressure, water loss, etc.

The mud report may additionally include data associated with the chemical properties of the mud, which may be used to ensure that the physical properties of the mud are not changing over time and are not eroding the wellbore. The chemical properties data may include, among other things, a pH which indicates the mud system's hydrogen ion concentration, and its acidity or alkalinity; a total chlorides content in the mud; the levels of K and Ca, a phenolphthalein alkalinity of mud filtrate, a methyl orange alkalinity of mud filtrate, and a clay content in the mud.

The mud report may also include a solids control analysis, which indicates a measure of LGS, a measure of HGS, a percent water in the mud system, a percent oil in the mud system, and a total solids in the mud system, among other parameters.

These properties, along with others, are important performance indicators for well equipment (e.g., efficiency of well production). A mud report may be sent to the computing resources 2802 on a periodic basis, such as once a day, twice a day, four times a day, or another increment. Mud reports may be stored in a datastore 2816 for aggregation and analysis.

Instructions 2810 may include a variety of instructions that perform analyses on the aggregated mud reports, which may provide data that may lead to more efficient operation of the well site, as will be described in further detail, below.

Results of the data analysis may be used to determine recommendations, trends, costs, performance, or other useful information, and may be delivered to a user device 2820 associated with a user 2822. The user may be a stakeholder of the one or more well sites, such as a mud engineer, an investor, an owner, an operator, or some other interested party. In some instances, the analysis performed on the data agglomerated from the mud reports will show trends that may be helpful in operating the solids control apparatus more efficiently, economically, or both.

In some embodiments, a solid-liquid separation system includes one or more sensors that collect data associated with the drilling mud. A shaker is configured to separate a solid-liquid mixture into a first solids-containing component and a shaker effluent, and a centrifuge is configured to separate the shaker effluent into a second solids-containing component and a centrifuge effluent. A signal from a sensor that is configured to measure a property of one or more of the first solids-containing component, the shaker effluent, the second solids-containing component, and the centrifuge effluent, is generated and sent to the computing resources 2802. In some embodiments, a control signal based on the measured property is returned from the computing resources 2802 and may be used to adjust one or more parameters of the mud. In some instances, the control signal sends a recommendation, a control, or a parameter that is used to reduce or minimize a cost metric. The cost metric may depend on one or more of a dilution cost, a disposal cost, an energy cost, mud-replacement, and a maintenance cost, and a NPT cost. Various other cost metrics are contemplated herein, such as any one or more of the cost metrics shown and described in conjunction with FIGS. 5-7, and may be used with any of the embodiments described herein.

Figure 29:
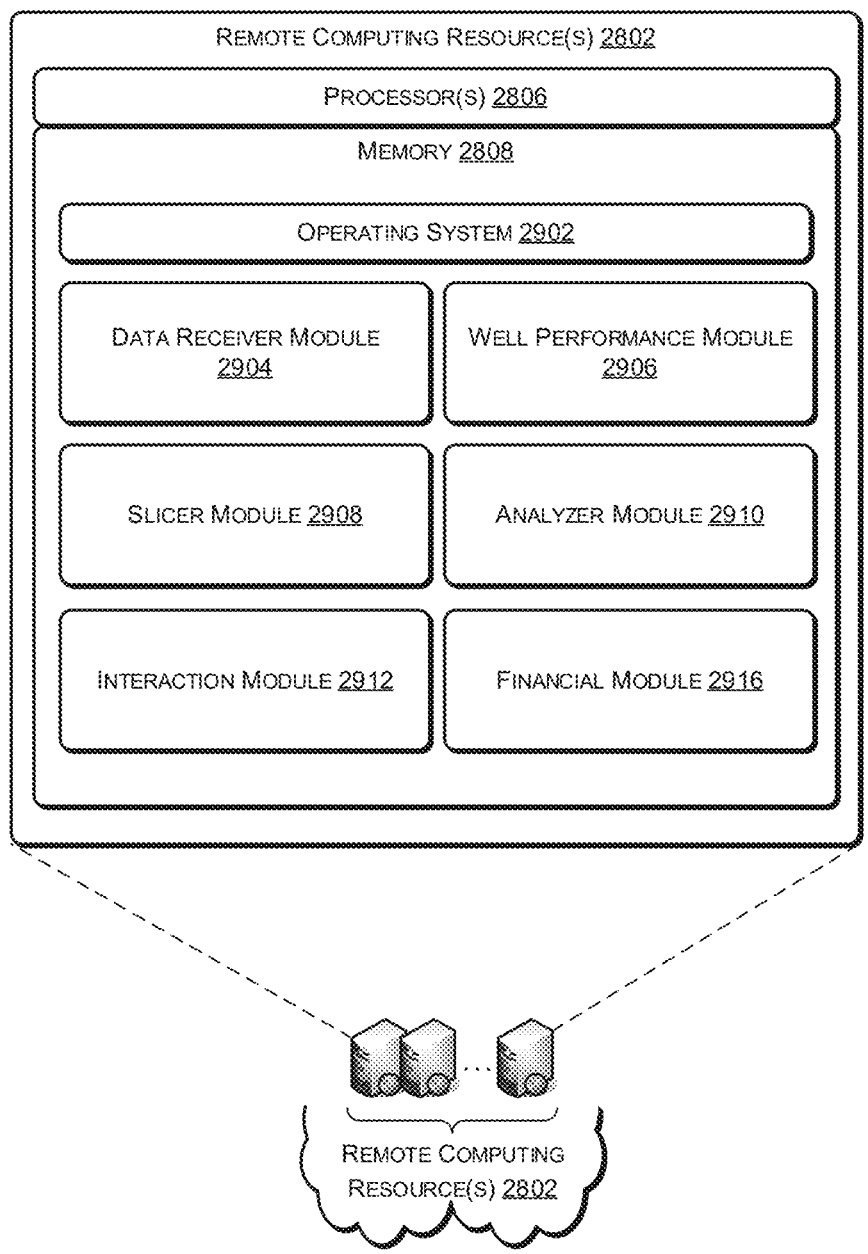
FIG. 29 is a schematic representation of computing resources configured to generate data and visual representations associated with drilling mud quality and efficiency, in accordance with some embodiments.

FIG. 29 schematically illustrates computing resources 2802. Computing resources 2802 includes one or more processors 2806, and memory 2808 that stores instructions. The memory stores any suitable operating system 2902 and one or more sets of computer readable instructions. Some exemplary instructions include a data receiver module 2904, a well-performance module 2906, a slicer module 2908, an analyzer module 2910, an interaction module 2912, a trends data module 2914, a financial module 2916, and a user input module 2918, among others.

Computing resources 2802 may be in communication with the datastore 2816 to store and retrieve historical well-performance data. The data receiver module 2904 includes instructions that allow the computing resources 2802 to receive data in any of a variety of formats. In some instances, the computing resource 2802 receives periodic mud reports that are delivered in a machine-readable file format. In some instances, the mud reports are delivered as a fillable form, a spreadsheet, or another type of file format, and may be pushed or pulled from one or more drilling sites, as needed. In some examples, the mud report is sent in an email associated with a mail server accessible by computing resources 2802. Data receiver module 2904 is able to receive the mud report and extract data contained in the mud report. In some embodiments, the data receiver module 2904 is configured to parse an email to determine that an attached file contains a mud report. The data receiver module 2904 may use natural language processing, keyword recognition, or some other type of artificial intelligence to determine the contents of the received data.

Data receiver module 2904 may parse the contents of the mud report and format and/or standardize the data for storage in the datastore 2816. In some embodiments, data receiver module 2904 is configured to standardize various mud reports through a taxonomy that tags the incoming data and stores the incoming data in datastore 2816 according to a predetermined taxonomy for later analysis.

Well-performance module 2906 may access datastore 2816 to determine a historical performance of a well site. This may be performed through data analysis using an algorithm that generates a well performance metric. In some instances, the well performance program 2906 utilizes data such as average dilution, average discard ratio, average production rate, total mud built, and other data types to indicate historical well performance. In some embodiments, incoming data may be analyzed in near real time and a current well performance may be generated.

Slicer module 2908 allows a user to analyze, view, and create reports on a subset of all drilling sites that provide data to the computing resources 2802. For instance, slicer module 2908 may segregate well sites by geography, by owner, by operator, by type, by date, by technology, by manufacturer, or some other filter or combination of filters that allows mud reports to be analyzed and viewed as a subset of all the mud reports that have previously been aggregated. This may help determine whether a drilling rig is operating at similar efficiency levels to other drilling rigs, such as other wells in geographic proximity to a given well.

Analyzer module 2910 parses the mud report data stored in the datastore 2816 and determines trends, anomalies, and patterns that may be used to improve operating efficiency of one or more drilling rigs. The analyzer module 2910 may use one or more machine learning algorithms to determine trends and associations. Such a machine learning algorithm may include, without limitation, neural networks, linear regression, nearest neighbor, Bayesian, clustering, K-means clustering, error checking (e.g., value out of range, missing data, etc.), natural language, and others.

Interaction module 2912 provides an interface that facilitates user interaction. For example, a user interface may be generated to allow one or more users to query data associated with one or more operators, drilling rigs, or wells. Interaction module 2912 may generate a web-based interface that allows a user to interact with computing resources 2802. In some instances, the interaction module 2912 requests log-in credentials with associated individual users and may allow individual users to gain access to only certain portions of data stored in the datastore 2816. For example, a particular well operator may be limited to retrieving, viewing, and analyzing data associated with wells operated by that particular well operator. In some cases, a particular well operator may have access to agglomerated data for other well operators (such as by geographic basin), but may not be able to determine individual data for specific well sites owned by other entities.

Financial module 2916 may be configured with instructions to output financial models associated with one or more drilling rigs or wells. For example, the financial program may provide information associated with the economic impact of modifying the solids control configuration of a drilling rig based on empirical data from historical wells. For instance, the financial module 2916 may determine a cost savings associated with reducing the density of the drilling mud and provide a recommendation for maximizing the cost savings.

According to some embodiments, the described systems allow a user to view chronological attributes, for example, dilution, performance, and waste management for particular drilling rigs and wells and to correlate trends in solids control performance with changes in drilling programs. In some embodiments, the systems allow for fair comparisons between drilling sites by slicing the comparable drilling sites through intelligent decision making, such as by slicing by geographic basis. One or more data quality algorithms may be utilized to identify problems with data that the mud engineer provides to the system. In some embodiments, drill basin averages and conditional formatting may be used to provide baselines and performance trends to benchmark solids controls across a broad sample size.

Figure 30:
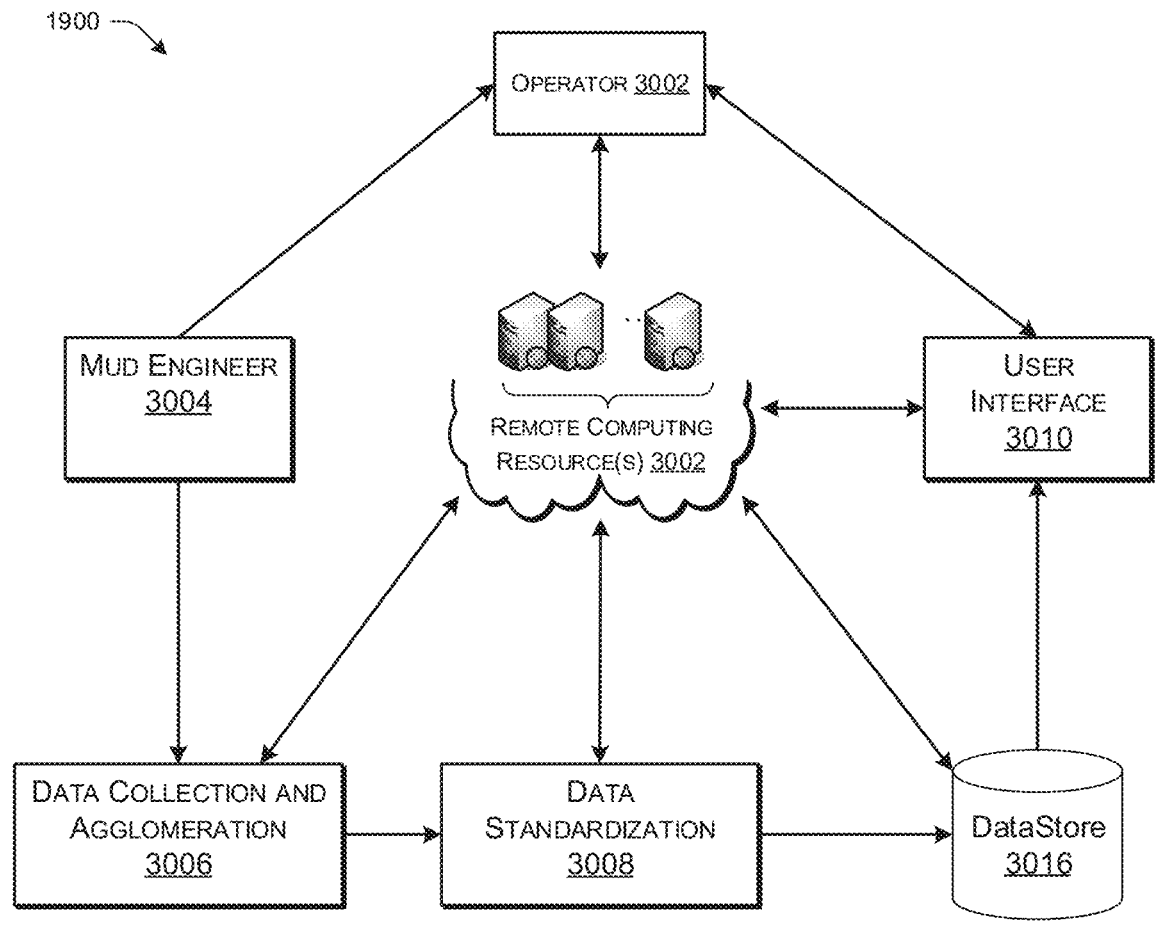
FIG. 30 illustrates a sample data flow schematic, according to some embodiments.

FIG. 30 illustrates a sample data flow schematic 3000 according to some embodiments. A mud engineer 3002 creates a mud report, such as by entering data into a software program, filling in a fillable form, and in some cases, the data is generated by one or more sensors that determine one or more parameters of the drilling mud. The mud report may be sent to multiple locations, such as to an operator 3002 and also to computing resources 2802. In some instances, the mud report may be sent to an email alias, which may be configured to route the mud report to one or more intended recipients, including the computing resources 2802. The mud report may be collected through a data collection and agglomeration 3006 process executed on the computing resources 2802 and may include natural language processing to tag and store the data. The computing resources 2802 may additionally execute a data standardization process 3008 that allows data from different sources and in different formats to be tagged and stored meaningfully for subsequent analysis, filtering, and retrieval. In some cases, the mud reports may use different terminology, have different fields, or use a different format, and the data standardization process 3008 may standardize the terminology and formatting of the mud reports to a uniform data mapping.

The standardized data is then stored in the datastore 2816 for subsequent analysis, filtering, and retrieval. Computing resources 2802 may execute instructions to provide a user interface 3010 that allows a user, such as the operator 3002, to run searches, queries, and receive alerts, notifications, recommendations, and updated machine operating parameters to improve one or more characteristics of the well. In some cases, the operator may access the datastore 2816 through the user interface to search for, and retrieve, raw data associated with one or more drilling rigs or wells. In some cases, operator 3002 may retrieve trends or historical data associated with a plurality of drilling rigs or wells, which may be grouped by a predetermined grouping, such as geographic basin, well type, operator-owned, or some other grouping. In some cases, historical statistics may be provided for drilling rigs or wells not owned or controlled by the operator 3002, and the operator may view a comparison of drilling rigs or wells that are controlled by the operator 3002 versus drilling rigs or wells not controlled by the operator 3002.

According to some embodiments, the systems and methods described herein provide a web-based application that enables users to access the data in a meaningful way, such as by having predefined reports available to track the history, trends, and performance of drilling rigs. In some cases, the data is retrievable by a user, but some of the data is not readily identifiable with a particular drilling rig, well, or operator. The level of available detail may be based, among other things, on user credentials to the system. In some embodiments, a user is able to slice the data according to meaningful subset, such as by geographic basin, that allows comparison options between an operator's fleet and those owned by third parties. A user may be able to view chronological information based on drilling rig, well dilution, well performance, and waste management and correlate trends in solids control performance to changes in drilling programs.

In some embodiments, the user interface provides historical averages, such as according to a geographic basin, and the user may compare a current operating performance with historical baseline performance across an entire geographic basin. In some cases, the data is normalized, such as to account for wells of varying lengths to expand the applicable data sets and provide performance measures.

In some cases, the user interface 3010 allows an operator to review parameters associated with a well, or a grouping of wells, in order to make informed decisions and actions. For example, a user may view, and act upon, information associated with one or more of AVG well LGS %; Solids Removal Efficiency %; Total Dilution; Total Mud Built; Total Haul-Off (waste volume); Discard Ratio; Dilution Ratio; Total Dilution/Foot; Total Mud Built/Foot; Average Plastic Viscosity; Average Yield Point; Average Mud Weight; Days on Interval; Interval Length; Base Oil Addition Volume; Water Addition Volume; Weight Material Addition Volume; Chemical Addition Volume; Dilution Cost (based on a user-defined cost/bbl); Haul-Off Cost (based on a user-defined cost/bbl); Base Oil Cost (based on a user-defined cost/bbl); Weight Material Cost (based on a user-defined cost/bbl); Basin averages for the metrics above; and Data Quality Analysis and Error Detection, among other factors.

Figure 31:
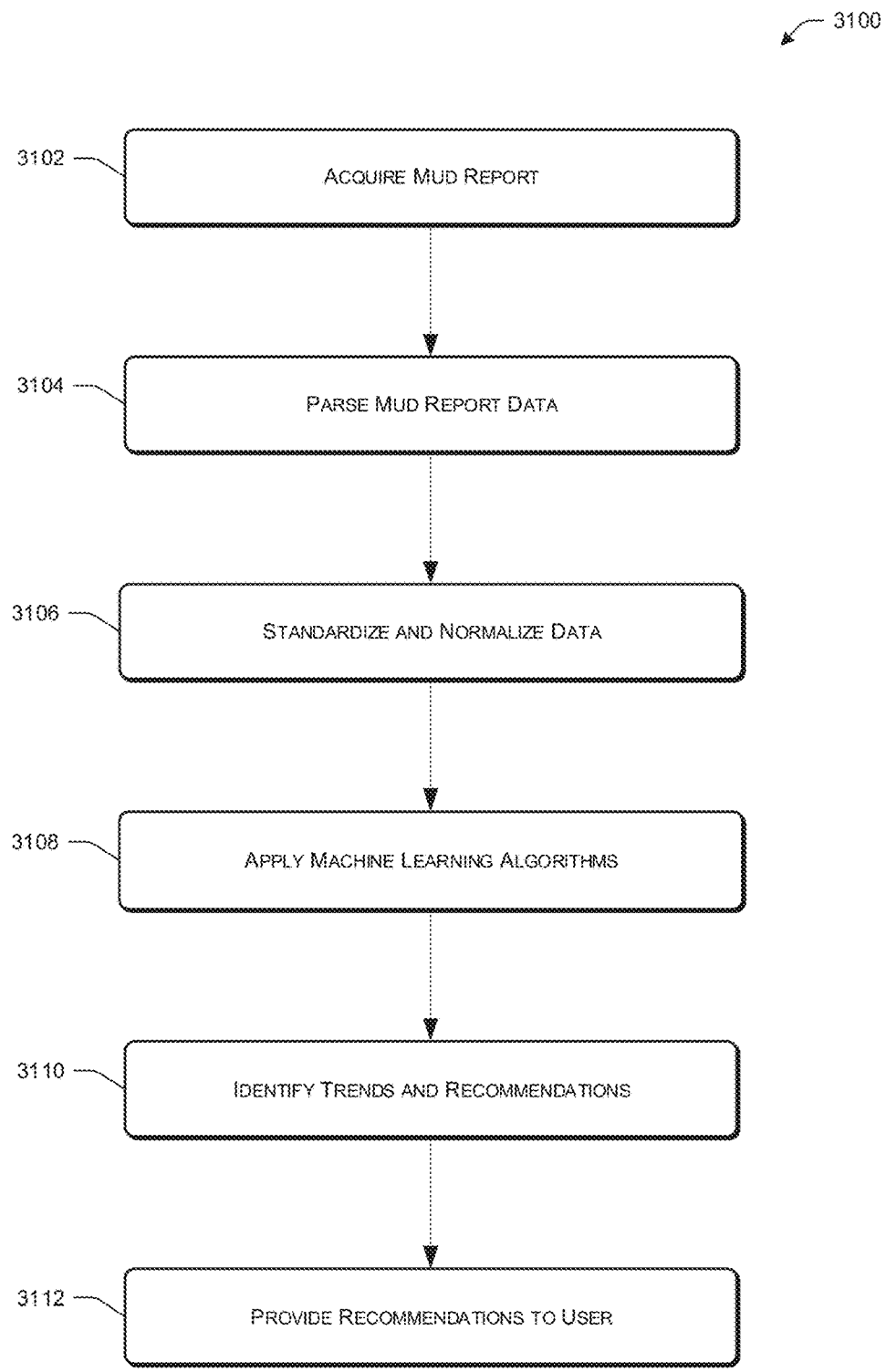
FIG. 31 illustrates an example process flow for the system, according to some embodiments.

FIG. 31 illustrates an example process flow 3100 for the system according to some embodiments. At block 3102, the system receives one or more mud reports. The mud reports may be sent at regular intervals, such as once a day, multiple times a day, or some other regular or nonregular interval. The mud report may be sent by a mud engineer, or some other person or system associated with a drilling operation. The mud report may be automatically generated, such as by sensors coupled to the drilling equipment. The mud report may be manually generated, and in some cases, the mud report is a combination of automatically generated data and manually obtained data. The mud report may be acquired through any suitable process, such as by receiving an electronic file, pulling data from one or more sensors, through email, or some other method.

At block 3104, the system parses the mud report. This may include opening an attached file, calling an application programming interface ("API") to extract data, performing natural language processing or semantic processing on the data, or some other process.

At block 3106, the data is standardized and normalized. In some cases, the data may come from different sources, be in different formats, include different tags or semantics, or be associated with different well types and sizes. In these cases, the data may be standardized, such as by applying a taxonomy to the data and assigning standardized tags to the data for categorization. In some cases, the data is normalized such as to account for different well lengths so the data may be compared against data from other wells in a meaningful way.

At block 3108, one or more machine learning algorithms are applied to the data. Any suitable machine learning algorithm may be applied, such as at block 3110 to look for trends, anomalies, or cause and effect, and may be used to generate and provide recommendations for improving well performance. In some instances, recommendations include changes to the solids control configuration to improve performance, increase efficiency, reduce waste, reduce cost, among others.

At block 3112, the recommendations are provided to a user. The recommendations may be delivered through the user interface, or may be pushed to a user, such as through instant communication, for example, text messaging, email, SMS messaging, or some other form of an alert or recommendation.

The system provides numerous improvements to current technology by synthesizing drilling fluid properties, characteristics, and well bore geometry from daily mud reports to measure solids control effectiveness and cost-savings metrics. The mud reports are distributed to stakeholders in the drilling process, and embodiments of the described system acquire the raw data and transform it into decision-quality information, complete with recommendations based upon machine learning algorithms that inform the operator or suggested steps to take to increase productivity, increase well performance, reduce cost, reduce waste, and increase efficiency. The data analysis and recommendation system allows decision-makers, engineers, and technicians tools and recommendations to optimize solids control configurations and cut costs associated with the drilling process. Embodiments of the described system analyze data and provide metrics to the user that were not previously attainable or possible by simply reviewing the fluids reports (e.g., mud reports and volume tracking spreadsheets). The described system further compares rig and well data against other rigs and wells from the same operator, against aggregated basin averages, and slice this data by a myriad of factors to realize network effects. Further, described embodiments broaden the scope of solids control performance evaluation available to users and focus the tool to provide valuable insights into cost-savings that are application-specific.

Furthermore, embodiments described herein provide a feedback loop in the solids control system and compare fluid and waste-disposal cost savings, fluid properties, and differentiate solids control setups. These improvements to existing technology allow operators to optimize cycle, reduce environmental impact, and enhance the cost-savings of solids control equipment.

Figure 32:
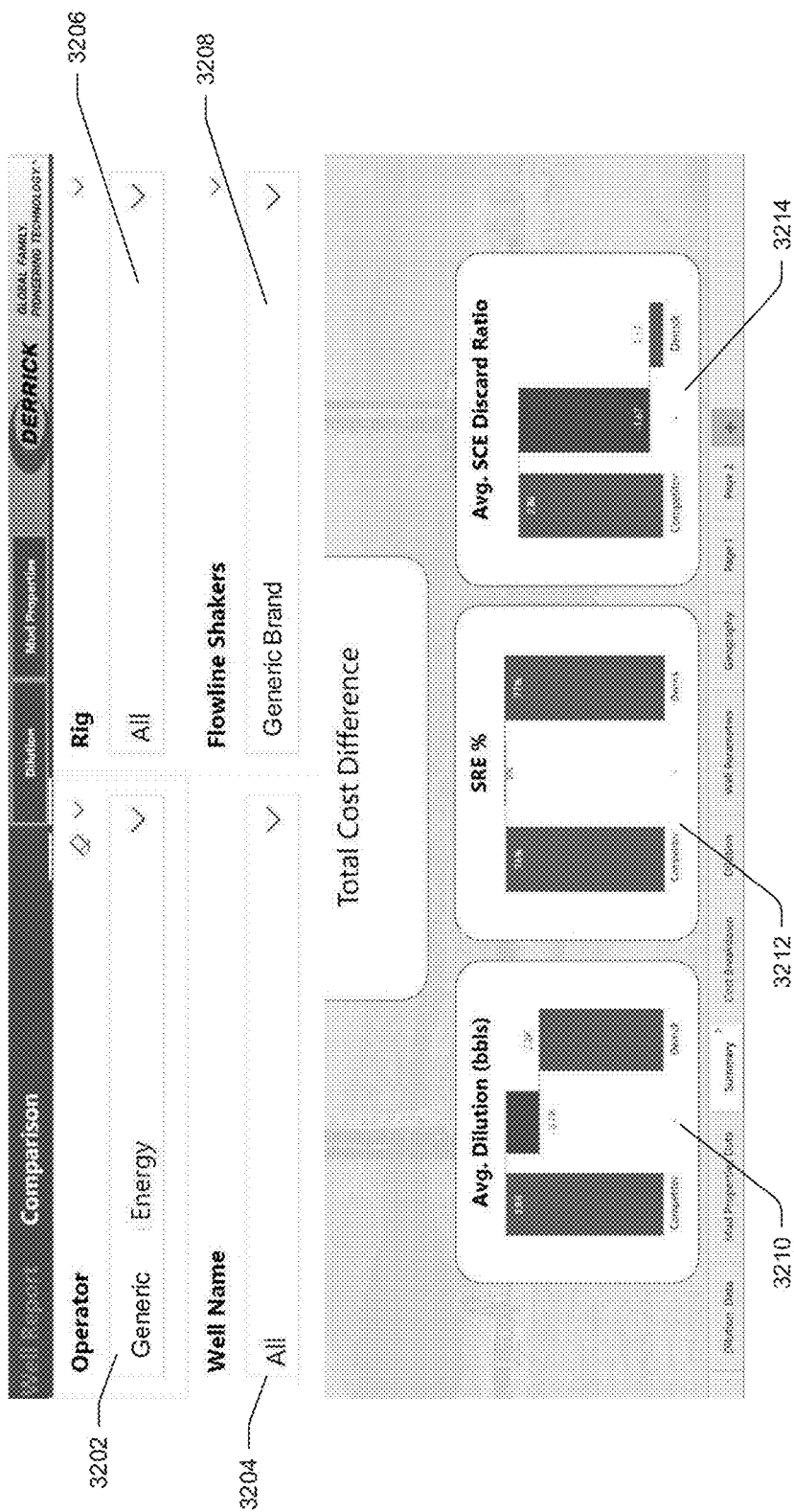
FIG. 32 illustrates an example user interface for an improved solids control system, in accordance with some embodiments.

FIG. 32 illustrates an example user interface 3200 that may be used with the methods and systems described herein for improved solids control. The user interface 3200 provides a visualization of one or more attributes of a well and in the illustrated embodiment, provides a comparison between the currently selected operator and third-party wells. For example, a selection in the Operator selector 3202 allows a user to select a well operator, which is Generic Energy in the illustrated example. A well name selector 3204 allows the user to choose one or more wells to analyze. In addition, a rig selector 3206 allows one or more rigs at the well site to be selected. A flowline shaker selector 3208 allows a user to specify a type of shaker being used.

Based upon the selected criteria, the system analyzes the data collected in one or more mud reports and displays relevant data according to the selected criteria. For example, the user interface 3200 may display a cost difference by reviewing the Avg. Dilution (bbls) 3210, the SRE % 3212, and the Avg. SCE Discard Ratio 3214.

The system is able to determine these savings based upon historical mud reports acquired by the system. For example, the estimated dilution cost saving may be based on testing data from an oil well. In one example of drilling the well, 1465 bbl of drilling fluid was used for dilution, at a cost of $60/bbl drilling fluid for a cost of $87,166. A total of 1110 bbl of cuttings were drilled and of these cuttings, 1005 bbl were removed and discarded leaving 105 bbl of missed cutting that required dilution. Further, along with the discarded cutting, a total of 1649 bbl of liquid and LGS was discarded including 644.5 bbl of liquid and 1004.7 of LGS. A substantial cost savings may be achieved with an improved solids control system. For example, an improved solids control system may lead to a 13:1 actual dilution ratio, a 50% increase of removal of missed cuttings (i.e., approximately 50 bbl additional cuttings removed), and decreased removal of liquid on cuttings by 125 bbl (i.e., 20% slurry loss). With these estimates, a cost savings of 13*60*50+125*60=$46,500 may be achieved. The user interface 3200 may display these type of cost savings representing a change in operation of the well.

Similarly, disposal costs may be estimated as follows. In an example, a cost of $20/bbl may be assumed to haul away waste. With an improved solids control system that increases solids removal by R bbl, and decreases retained liquid on cutting by O bbl, a cost savings of 20*O−20*R may be obtained. Data from the above-described oil well may also be used to estimate disposal costs. For example, with an example oil well, disposal cost may be $17/bbl to haul waste. A total of 1110 bbl cuttings were drilled and 1649 bbl of waste was discarded. Of the waste discarded, 644.5 bbl was liquid, and 1004.7 bbl was LGS. Using an improved solids control system to increase removed solids by 50 bbl (i.e., 50% of missed cuttings) and to decrease liquid retained on the cutting by 125 bbl (i.e., 20% of slurry lost), leads to a cost savings of 17*125-17*50=$1,275. The user interface is able to display these numerical savings and provide recommendations on how to improve efficiency at the well site.

Figure 33:
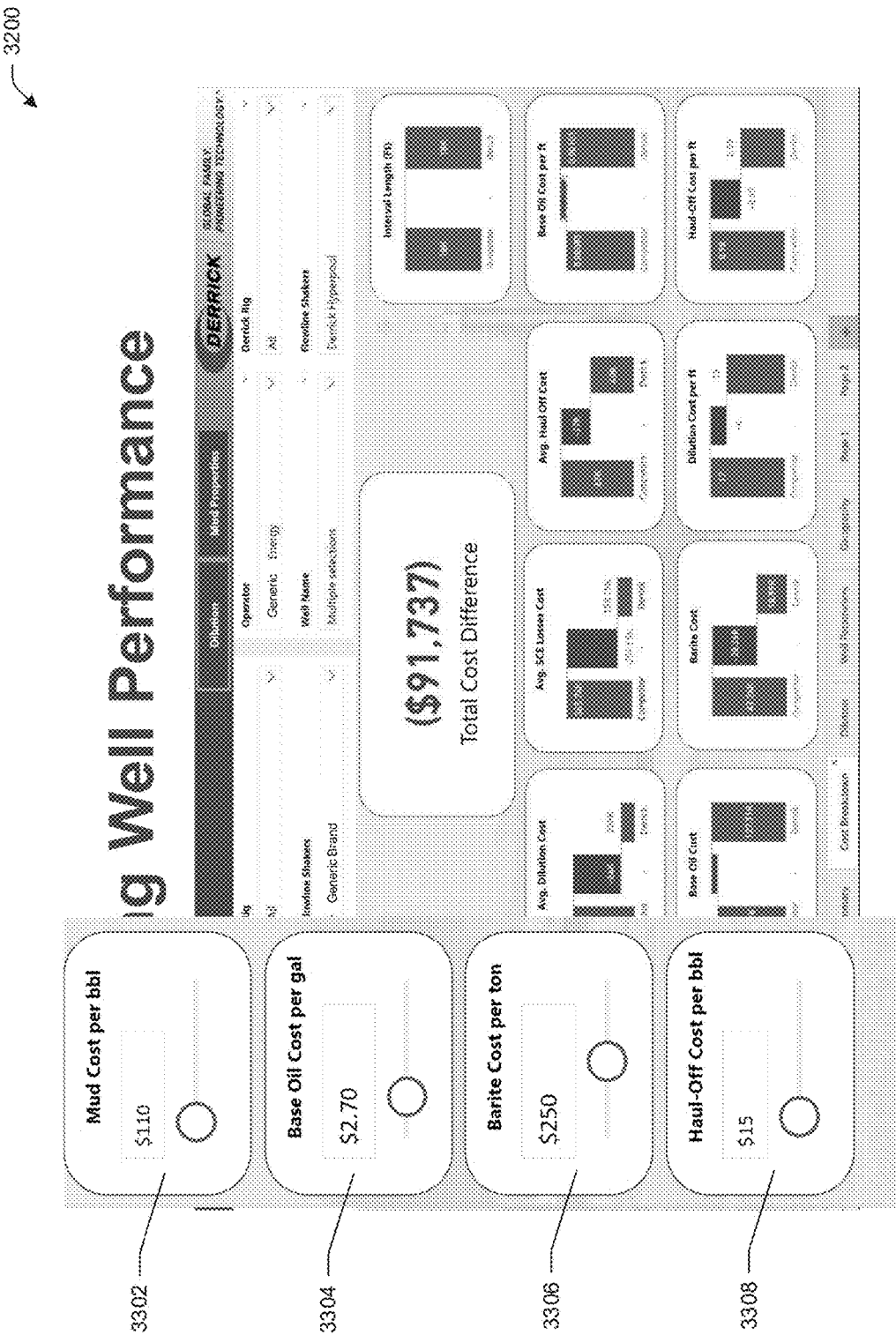
FIG. 33 illustrates an example user interface for an improved solids control system, in accordance with some embodiments.

FIG. 33 illustrates an example user interface 3200 showing a cost difference between the selected wells based upon the solids control systems employed at the selected wells. As a comparison, wells are selected for comparison using Generic Brand flowline shakers and a proprietary flowline shaker manufactured and sold by Derrick Equipment Company. A series of variable inputs allow a user to input actual values, such as for mud cost per bbl 3302, base oil cost 3304, barite cost 3306, and haul-of cost per bbl 3308. Based upon these variable values in combination with the acquired mud report data, the system is able to display, through the user interface, a total cost difference between the selected wells. The total cost difference may be based at least upon differences in dilution cost, SCE losses, Haul off costs, Base oil cost, Interval length, Barite cost, and others. Thus, the system is able to display a financial change based upon changing well drilling equipment and operation parameters.

In some embodiments, the system receives inputs from one or more sensors associated with the solid-liquid separation system, such as any of the inputs listed in FIGS. 5-7, or Tables 1-6. Additionally or alternatively, the system receives inputs via manual input, which may include any of the aforementioned inputs. In some cases, one or more inputs are acquired from sensor data, and one or more inputs are acquired via manual input.

Figure 34:
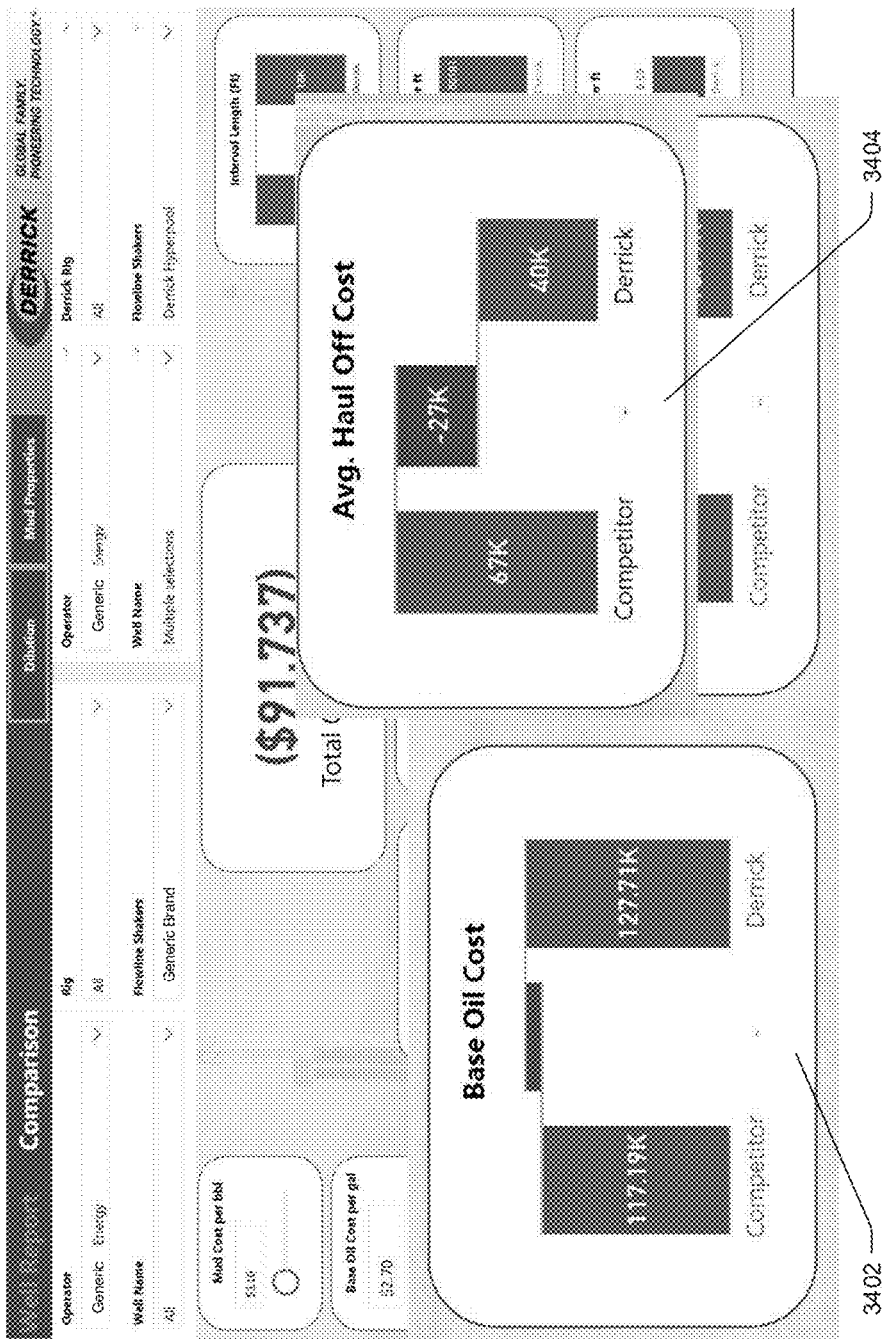
FIG. 34 illustrates an example user interface for an improved solids control system, in accordance with some embodiments.

FIG. 34 illustrates another example user interface 3200 showing how a particular operators wells are performing in comparison with third party operated wells. The user interface 3200 may retrieve historical data from the datastore that may populated with mud report, daily drilling reports, and other information pertaining to well operation and performance. In some instances, the user interface 3200 will show a comparison of various costs, for example a base oil cost 3402 and an average haul off cost 3404. The wells may be compared, such as for equipment, equipment operating parameters, solids controls, and the user may receive recommendations on how to improve the performance on the selected wells.

Figure 35:
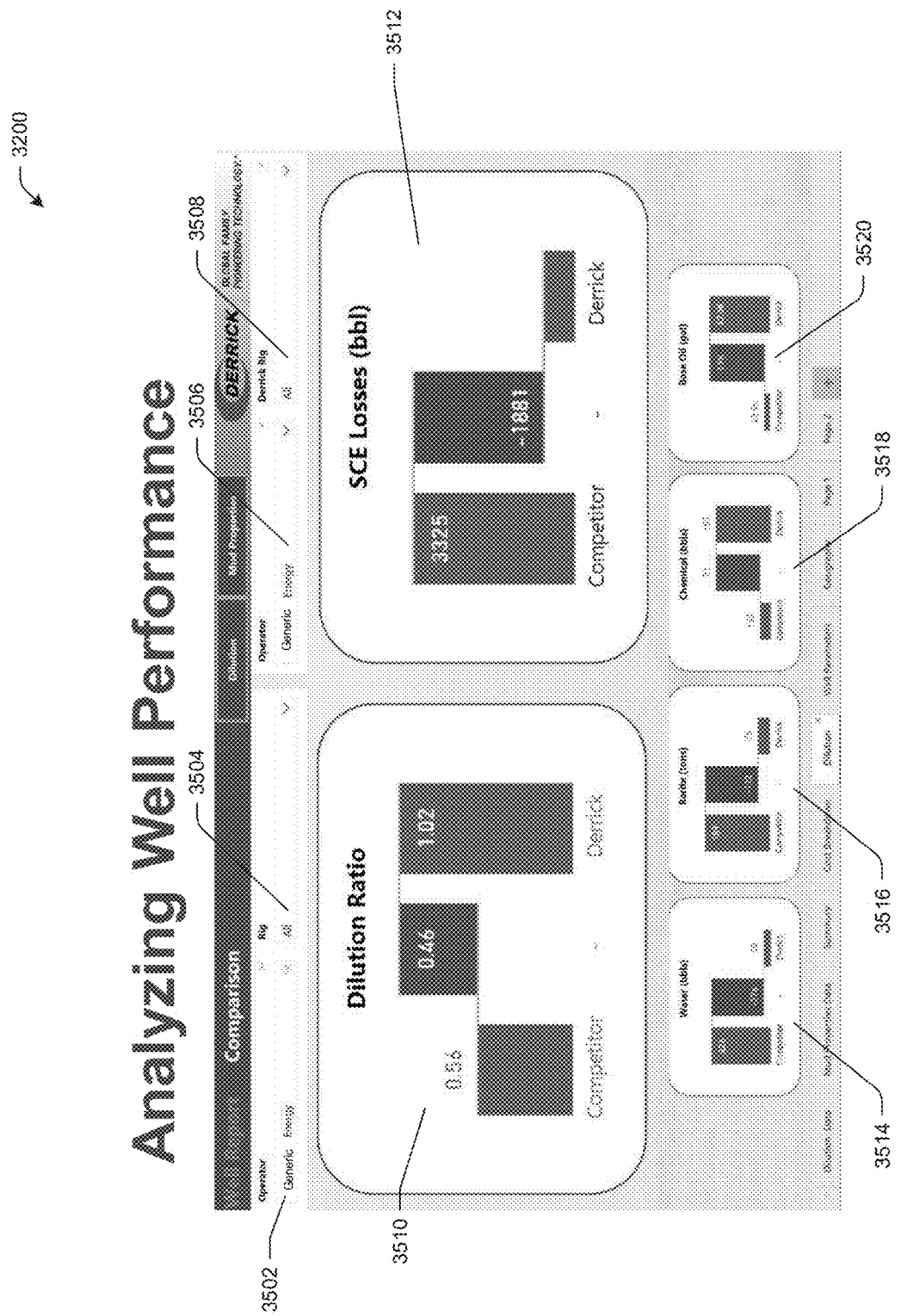
FIG. 35 illustrates an example user interface for an improved solids control system, in accordance with some embodiments.

FIG. 35 illustrates an example user interface 3200 that compared dilution between selected wells. For example, a user may select all the rigs for a given operator and compare those with different rigs being run by the same, or a different, operator. In the illustrated example, a first operator selector 3502 allows the user to select an operator and a first rig selector 3504 may be used to select one or more rigs. A comparison panel allows an operator to make a selection in a second operator selector 3506 and a second rig selector 3508. As illustrated, the selectors have used to select a comparison between a proprietary rig and third-party rigs.

Embodiments described herein improve the technology of oil drilling, and in particular, some embodiments are designed to specifically improve solids control in drilling mud. The systems may acquire mud reports which may be parsed, tagged, stored, and analyzed by any of a number of machine learning algorithms. The machine learning algorithms may analyze the stored data for trends, cause and effect relationships, and determine ways to improve the solids control on one or more drilling rigs. This improvement in well efficiency by relying on artificial intelligence results in lower environmental impacts, less waste, less power required, increased production, more efficient well operation, and substantial cost savings. The described systems provide a feedback loop to detect and compare fluid and waste disposal metrics, mud properties, and differentiate solids control setups.

The disclosure sets forth example embodiments and, as such, is not intended to limit the scope of embodiments of the disclosure and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of systems, apparatus, devices, and techniques that may provide control and optimization of separation equipment. It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Those skilled in the art will appreciate that, in some implementations, the functionality provided by the processes and systems discussed above may be provided in alternative ways, such as being split among more software programs or routines or consolidated into fewer programs or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-controlled method for operating a solid-liquid separation system for a target well drilling site, the solid-liquid separation system including at least one vibratory screening machine that receives cuttings and well drilling fluid removed from a well at the target well drilling site and that separates the cuttings from the well drilling fluid, the method comprising:
    obtaining historical solid-liquid separation system data for a plurality of well drilling sites, the data including, for each well drilling site, settings at which vibratory screening machines operated, an amount of cuttings and well drilling fluid that was removed from the well during well drilling operations and that was processed by the solid-liquid separation system per unit of time, an amount of well drilling fluid that was added during drilling operations per unit of time and an amount of waste solids that were removed and discarded during well drilling operations per unit of time;
    conducting a financial analysis of the obtained historical solid-liquid separation system data to identify the well drilling site that provided the lowest operating costs for the solid-liquid separation system per unit of volume of cuttings and well drilling fluid processed by the solid-liquid separation system;
    establishing the settings at which the vibratory screening machines operated at the well drilling site that was identified as providing the lowest operating costs as target vibratory screening machine settings;
    causing one or more adjustments to be made to the settings of the at least one vibratory screening machine at the target well drilling site until the settings of the at least one vibratory screening machine approximate the target vibratory screening machine settings.

2. The method of claim 1, wherein the obtaining step comprises obtaining historical solid-liquid separation system data for a plurality of well drilling sites that are within the same geographic basin as the target well drilling site.

3. The method of claim 1, wherein the obtaining step comprises obtaining historical solid-liquid separation system data for a plurality of well drilling sites that are of the same well type as the target well drilling site.

4. The method of claim 1, wherein the obtaining step comprises obtaining historical solid-liquid separation system data for a plurality of well drilling sites that are operated by the same operator as the operator of the target well drilling site.

5. The method of claim 1, wherein the obtaining step comprises obtaining historical solid-liquid separation system data for a plurality of well drilling sites that are operated by one or more operators that are different from the operator of the target well drilling site.

6. The method of claim 1, wherein settings at which vibratory screening machines are operated within the historical solid-liquid separation system data includes one or more settings in the group consisting of screen angle, shape of vibratory motion, amplitude of vibratory motion, frequency of vibratory motion, screen aperture size and flow rate of cuttings and well drilling fluid being processed per unit of time.

7. The method of claim 1, wherein causing adjustments to be made to the settings of the at least one vibratory screening machine at the target well drilling site comprises causing an adjustment to be made to the screen angle of the at least one vibratory screening machine.

8. The method of claim 1, wherein causing adjustments to be made to the settings of the at least one vibratory screening machine at the target well drilling site comprises causing an adjustment to be made to a shape of vibratory motion of the at least one vibratory screening machine.

9. The method of claim 1, wherein causing adjustments to be made to the settings of the at least one vibratory screening machine at the target well drilling site comprises causing an adjustment to be made to an amplitude of vibratory motion of the at least one vibratory screening machine.

10. The method of claim 1, wherein causing adjustments to be made to the settings of the at least one vibratory screening machine at the target well drilling site comprises causing an adjustment to be made to a frequency of vibratory motion of the at least one vibratory screening machine.

11. The method of claim 1, wherein causing adjustments to be made to the settings of the at least one vibratory screening machine at the target well drilling site comprises causing an adjustment to be made to a screen aperture size of the at least one vibratory screening machine.

12. The method of claim 1, wherein causing adjustments to be made to the settings of the at least one vibratory screening machine at the target well drilling site comprises causing an adjustment to be made to a flow rate of cuttings and drilling fluid per unit of time being processed by the at least one vibratory screening machine.

13. The method of claim 1, wherein the obtained historical solid-liquid separation system data includes, for each well drilling site, one or more physical characteristics of the solids components that result after cuttings and well drilling fluid has been processed by vibratory screening machines of the solid-liquid separation system at the well drilling site.

14. The method of claim 13, wherein the establishing step comprises establishing the one or more physical characteristics of the solids component that result after cuttings and well drilling fluid have been processed by vibratory screening machines of the solid-liquid separation system of the well drilling site that was identified as providing the lowest operating costs as part of the target vibratory screening machine settings.

15. The method of claim 14, wherein the causing step comprises causing adjustments to be made to the settings of the at least one vibratory screening machine at the target well drilling site until the one or more physical characteristics of the solids component that result after cuttings and well drilling fluid have been processed by the at least one vibratory screening machines at the target well drilling site approximate the target vibratory screening machine settings.

16. The method of claim 15, wherein the one or more physical characteristics of the solids component that result after cuttings and well drilling fluid have been processed by a vibratory screening machine comprises a moisture content of the solids component.

17. The method of claim 15, wherein the one or more physical characteristics of the solids component that result after cuttings and well drilling fluid have been processed by a vibratory screening machine comprises a density of the solids component.

18. The method of claim 15, wherein the one or more physical characteristics of the solids component that result after cuttings and well drilling fluid have been processed by a vibratory screening machine comprises a rheology of the solids component.

* * * * *